US012725285B2

(12) United States Patent
Mcvey et al.

(10) Patent No.: US 12,725,285 B2
(45) Date of Patent: Sep. 1, 2026

(54) SYSTEMS AND METHODS FOR MACHINE VISION

(71) Applicant: Nautilus Subsidiary, Inc., Seattle, WA (US)

(72) Inventors: Kevin Mcvey, Seattle, WA (US); Pierre Indermuhle, Berkeley, CA (US)

(73) Assignee: Nautilus Subsidiary, Inc., Seattle, WA (US)

( * ) Notice: Subject to any disclaimer, the term of this patent is extended or adjusted under 35 U.S.C. 154(b) by 281 days.

(21) Appl. No.: 18/670,575

(22) Filed: May 21, 2024

(65) Prior Publication Data

US 2024/0394902 A1 Nov. 28, 2024

Related U.S. Application Data

(60) Provisional application No. 63/643,881, filed on May 7, 2024, provisional application No. 63/504,116, filed on May 24, 2023.

(51) Int. Cl.
*G06T 7/35* (2017.01)

(52) U.S. Cl.
CPC ...... *G06T 7/35* (2017.01); *G06T 2207/30072* (2013.01)

(58) Field of Classification Search
CPC ............ G06T 7/35; G06T 2207/30072; G01N 21/6458; G01N 21/6452
See application file for complete search history.

(56) References Cited

U.S. PATENT DOCUMENTS

| | | | | |
|---|---|---|---|---|
| 8,945,830 | B2 | 2/2015 | Heil et al. | |
| 11,505,796 | B2 | 11/2022 | Aksel et al. | |
| 2020/0011800 | A1 * | 1/2020 | Vieceli ............... | G01N 21/6456 |

* cited by examiner

*Primary Examiner* — Edward Park
*Assistant Examiner* — Alexander Joseph Vaughn
(74) *Attorney, Agent, or Firm* — Morgan, Lewis & Bockius LLP

(57) ABSTRACT

Methods and systems are provided for determining a parameter of a detector model for a detection device that translates between two spatial dimensions (image coordinates) and three spatial dimensions (real coordinates). Methods for determining a parameter of a detector model utilize detected patterns of detection events to provide a basis for parametrization.

20 Claims, 26 Drawing Sheets

P = 54.55%
Light-ups can be localized.
Largest sub-graph of adjacent light-ups
reaches boundaries of triangular grid P = 18.18%
Light-ups cannot be localized.
Largest sub-graph of adjacent light-ups
does not reach boundaries of triangular grid

1600

SYSTEMS AND METHODS FOR MACHINE VISION

CROSS REFERENCE TO RELATED PATENT APPLICATION

The present application claims priority to U.S. Provisional Patent Application No. 63/504,116, entitled "Systems and Methods for Machine Vision," filed May 24, 2023; and U.S. Provisional Patent Application No. 63/643,881, entitled "Systems and Methods for Machine Vision," filed May 7, 2024, each of which is hereby incorporated by reference.

BACKGROUND

Machine vision can refer to the use of computational analysis to interpret sensed spatial data, for example using photon-based or electron-based sensors. Such sensors typically produce a two-dimensional image regardless of the spatial dimensionality of an imaged system. Accordingly, machine vision analysis often includes a step of translating two-dimensional image data into three-dimensional data (e.g., assigning a z-axis coordinate to data displayed in the x- and y-axes). Translation between two-dimensional image data and three-dimensional data can be important for interpreting both two- and three-dimensional systems. Even if a subject of imaging is substantially two-dimensional, a sensing system can introduce three-dimensional error (e.g., discrepancy between an imaged objects sensed position and true position) due to the components and configuration of the imaging system. For example, optical lenses may inherently produce one or more forms of aberration in optical images. Likewise, electron-shaping devices such as quadrupoles can produce aberration in electro-sensed imaging. Proper translation of images between two-dimensional and three-dimensional data can enhance the accuracy of image-related processes, such as auto-focusing and image registration.

Arrays can be an advantageous format for spatially arranging molecules, such as biomolecules, nanoparticles, and small molecules, for assay. Arrays can be configured as substrates containing discrete sites, in which the sites are configured to couple analytes. Arrays can be formed in a fashion that produces predictable spatial locations for array sites, for example, due to repetition in the spatial pattern of the sites. Arrays may be formed in a clustered format, in which each site is configured to contain a plurality of analytes, or a single-analyte format, in which each site is configured to contain one and only one analyte. Single-analyte arrays may be advantageous for facilitating individual interrogation of analytes. Arrays may be sensed by numerous methods, such as optical microscopy, fluorescence microscopy, and electron microscopy.

SUMMARY

In an aspect, provided herein is a method, comprising: a) providing an array comprising a plurality of sites, wherein individual sites of the plurality of sites are each optically resolvable, and wherein sites of the plurality of sites comprise signal sources, b) detecting on a detection device signals from the signal sources at sites of the plurality of sites, thereby forming an image comprising detection events, c) identifying within a field of view having N sides a pattern of detection events of the image, wherein each individual side of the N sides is contacted by a detection event of the pattern of detection events, and d) based upon the pattern of detection events, determining a parameter of a direct linear transform detector model.

In another aspect, provided herein is a method of calibrating a detection device, comprising: a) providing to a first detection device an array comprising a plurality of sites, wherein each individual site of the plurality of sites is optically resolvable, and wherein sites of the plurality of sites comprise signal sources, b) identifying on the array a pattern of signals from the signal sources with the first detection device, c) based upon the pattern of signals from the signal sources, determining a parameter of a first detector model, d) after determining the parameter of the first detector model, identifying on the array the pattern of signals from the signal sources on a second detection device, and e) based upon the pattern of signals from the signal sources, determining a parameter of a second detector model.

In another aspect, provided herein is a system, comprising: a) an array comprising a plurality of sites, wherein individual sites of the plurality of sites are each optically resolvable, and wherein sites of the plurality of sites comprise signal sources, b) a detection device configured to acquire signals from the signal sources at sites of the plurality of sites, thereby forming an image comprising detection events, and c) a computer processor programmed to: (i) identify within a field of view having N sides a pattern of detection events of the image, wherein each individual side of the N sides is contacted by a detection event of the pattern of detection events, and (ii) output a parameter of a direct linear transform detector model based upon the pattern of detection events.

In another aspect, provided herein is a method, comprising: a) providing to an optical detection system comprising a detector: i) a first array of sites, wherein each individual site of the first array of sites comprises an individual optically-detectable moiety, wherein each individual site of the first array of sites is optically resolvable from each other site of the first array of sites, wherein a first subregion of the first array of sites has a signal occupancy of at least 50%, and wherein a second subregion of the first array of sites has a signal occupancy of no more than 10%, and ii) a second array of sites, wherein each individual site of the second array of sites is optically resolvable from each other site of the second array of sites, wherein each individual site of the second array of sites comprises one and only one individual analyte of a plurality of analytes immobilized to the second array of sites, b) detecting a first spatial arrangement of signals from optically-detectable moieties of the first subregion of the first array of sites, c) based upon the first spatial arrangement of signals from the first subregion of the first array of sites, determining a parameter of a detector model of the detector, d) after determining the parameter of the detector model, detecting a second spatial arrangement of signals from a first subregion of the second array of sites, and detecting a third spatial arrangement of signals from a second subregion of the second array of sites, and e) registering a signal of the second spatial arrangement of signals to a signal of the third spatial arrangement of signals, wherein the signal of the second spatial arrangement of signals and the signal of the third spatial arrangement of signals are emitted at a same site of the second array of sites.

In another aspect, provided herein is a method, comprising: a) providing to an optical detection system comprising a detector an array of sites, wherein each individual site of the array of sites comprises an individual optically-detectable moiety, wherein each individual site of the array of sites is optically resolvable from each other site of the array of sites, wherein a first subregion of the array of sites has a signal occupancy of at least 50%, and wherein a second subregion of the array of sites has a signal occupancy of no more than 10%, b) detecting a first spatial arrangement of signals from optically-detectable moieties of the first subregion of the array of sites, c) based upon the first spatial arrangement of signals from the first subregion of the array of sites, determining a first value of a parameter of a detector model of the detector, d) detecting a second spatial arrangement of signals from optically-detectable moieties of the second subregion of the array of sites, e) based upon the second spatial arrangement of signals from the second subregion of the array of sites, determining a second value of the parameter of the detector model of the detector, and f) determining a consensus value of the parameter of the detector model based upon the first value of the parameter and the second value of the parameter.

In an aspect, provided herein is a method, comprising: a) providing to an optical detection system comprising a detector a solid support, wherein the solid support comprises: i) a calibration target comprising a first array of sites, wherein each individual site of the first array of sites comprises an individual optically-detectable moiety, wherein each individual site of the first array of sites is optically resolvable from each other site of the first array of sites, wherein a first subregion of the first array of sites has a signal occupancy of at least 50%, and wherein a second subregion of the first array of sites has a signal occupancy of no more than 10%, and ii) a second array of sites, wherein each individual site of the second array of sites is optically resolvable from each other site of the second array of sites, wherein each individual site of the second array of sites comprises one and only one individual analyte of a plurality of analytes immobilized to the second array of sites, b) determining from the calibration target a detector model of the detector, c) after determining the detector model of the detector, detecting on the detector a spatial arrangement of signals of a subregion of the second array of sites, d) based upon the detector model of the detector, spatially correcting the spatial arrangement of signals of the subregion of the second array of sites, and e) determining a focal quality parameter of the spatially corrected spatial arrangement of signals of the subregion of the second array of sites.

INCORPORATION BY REFERENCE

All publications, items of information available on the internet, patents, and patent applications cited in this specification are herein incorporated by reference to the same extent as if each individual publication, patent, or patent application was specifically and individually indicated to be incorporated by reference. To the extent publications, items of information available on the internet, patents, or patent applications incorporated by reference contradict the disclosure contained in the specification, the specification is intended to supersede and/or take precedence over any such contradictory material.

Figure 1A:
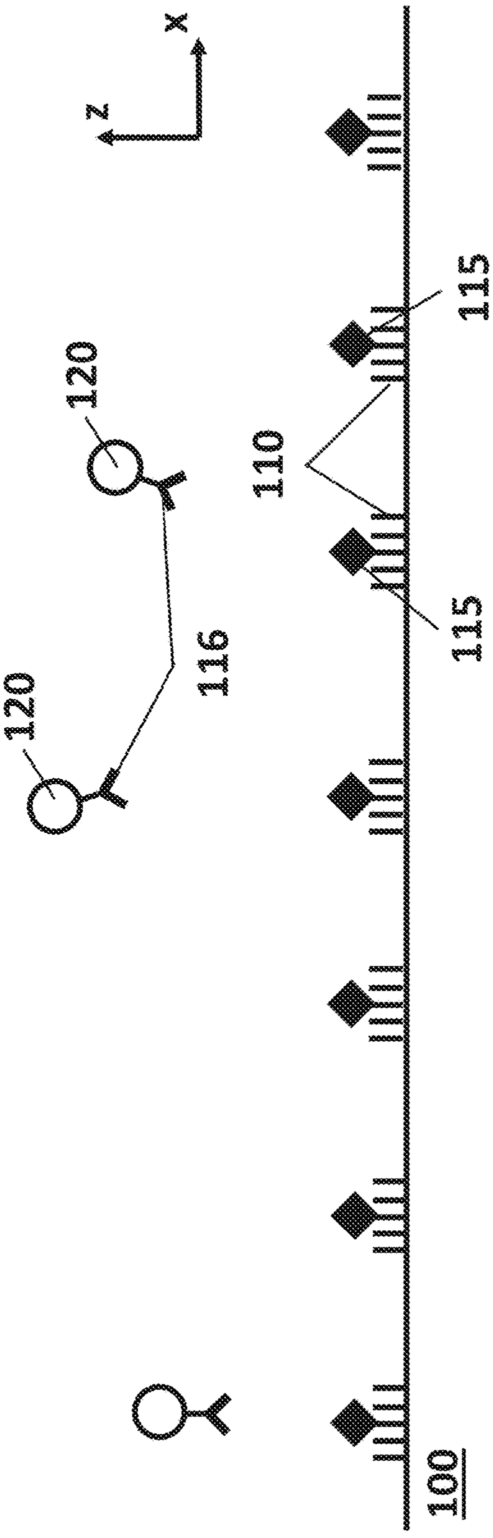
FIGS. 1A, 1B, 1C, 1D, 1E, and 1F depict methods for forming arrays of signal sources that provide patterns of signals, in accordance with some embodiments.

For figures containing reference axes (i.e., x-axis, y-axis, z-axis), the z-axis direction can refer to a direction normal to a substantially planar surface of a solid support. Alternatively, the z-axis direction can refer to a direction normal to a surface of a detector of an optical detection system. When referring to a substantially planar surface of a solid support, the x-axis and y-axis directions can refer to substantially orthogonal directions in the plane of the surface of the solid support. For a solid support having a non-planar surface, the x-axis and y-axis directions can refer to substantially orthogonal axes in an imaginary plane, in which the imaginary plane is oriented orthogonal to the z-axis direction (e.g., an imaginary plane parallel to a surface of a detector). For figures containing simulated or actual images of signals detected on a surface of a solid support, the x-axis and y-axis directions can refer to substantially orthogonal axes in the plane of an imaginary two-dimensional field-of-view formed by the detection of signals from a two-dimensional or three-dimensional signal source by a detector.

DETAILED DESCRIPTION

Arrays can be used to perform various interrogations of analytes in a spatially separated format. Array-based systems often incorporate a detection device that facilitates sensing of individual array sites. A suitable detection device for array sensing can provide measurement of a physical characteristic of an analyte present at an array site with sufficient spatial resolution to distinguish the sensed array site from adjacent array sites. For example, optical microscopy and scanning electron microscopy of array sites can each produce two-dimensional images that suggest the physical morphology of the array sites and/or analytes attached to the array sites via the reflection of light or electrons, respectively. In another example, fluorescence microscopy of array sites can produce images that suggest physical properties of array sites and/or analytes attached to the array sites (e.g., the presence or absence of fluorophores bound at an array site, and in some cases a quantity of fluorophores bound at the array site).

Although arrays of analytes are often presented in a substantially planar format, the arrays cannot be assumed to be perfectly planar, spatially or temporally. Manufacturing errors and manufacturing feedstock variability can introduce spatial variance in morphology of planar substrates. Variability can be understood with respect to a cartesian coordinate system, wherein variability that occurs in the plane of the array introduces spatial variance in the x and/or y dimensions and spatial variance along the detection axis (e.g. focal axis in an optical system) occurs along the z dimension. Variability in one or more of these dimensions can produce more significant sensing error as the resolution of a detection device increase. For example, nanometer-scale spatial variability may produce relative minor imaging error when imaging at the millimeter- or even micron-scale but can be a more significant source of imaging error when imaging at the submicron-scale (e.g. nanometer-scale). Moreover, spatial and/or temporal variance in temperature can produce expansion or contraction effects that alter the spatial morphology of an array or produce positional offset in a detection device between an initial location and a location at an intermediate time.

Detector calibration (e.g., camera calibration) can include any suitable method that parameterizes a model by which two-dimensional (2-D) data from a detector can be translated into three-dimensional (3-D) data. Direct linear transform is a common model that is utilized to facilitate the translation between two-dimensional image data and three-dimensional real-world data. The direct linear transform model can be expressed as:

$$P_i = K\langle R \mid t\rangle P_w \qquad (1)$$

where $P_i$ is a point location in a 2-D image, Pw is the point location in 3-D, K is a matrix of intrinsic parameters (e.g., focal length, optical axis offsets, skew), and <R|t> is a matrix of extrinsic parameters (i.e., translation and/or rotation of a detector along all axes). The direct linear transform model shown in Equation 1 may be further modified to include a measure of image distortion. In some cases, an image calibration process may include a step of determining one or more parameters of a transform model, such as an intrinsic parameter, an extrinsic parameter, or a distortion model parameter.

To perform a detector calibration, it is advantageous to provide a reference with a known 3-D geometry that can facilitate the parameterization of the transform model. For example, in optical detector calibration, a reference pattern can be provided, such as a checkerboard that facilitates simple and rapid parameterization of the transform model. As the imaging system complexity increases, for example by incorporating high spatial resolution (e.g., nanoscale imaging) and/or fluorescence imaging, so too does the complexity of spatial calibration increase. It can be difficult to provide patterned nanoscale reference features that are formed with sufficient accuracy to facilitate detector calibration. For single-analyte array processes and other array-based processes that are configured for high sensitivity or resolution, the arrays are often provided as a disposable or consumable item (e.g., a disposable flow cell), so the relative cost of forming a sufficiently accurate, nanoscale calibration region may be prohibitive. Moreover, applications like fluorescent detection may require incorporation of substantial quantities of expensive reagents.

In some cases, it may be possible to utilize an array of analytes itself to provide a calibration region for detector calibration. If an array image containing a critical quantity of detection events at array sites can be combined with an external knowledge of the array site geometry (e.g., based upon a priori or a posteriori knowledge), there may be sufficient information to parameterize a transform model of a detector of a detection device. A possible approach to forming useful arrays may be provided by Percolation Theory. This theory holds that, provided a grid of random, independent binary events represented by an individual probability, P, of being "true" (for example, a presence of a detected signal from a signal source at an array site) and 1−P of being "false" (for example, an absence of a detected signal from a signal source at an array site), there is a critical probability Pc where any P≥Pc ensures a 100% chance that the grid contains at least one infinitely long path that can be drawn between adjacent "true" events.

In some cases in which there is a finite grid, such as an array of analytes, the critical probability, Pc, can be interpreted to mean that there is a 100% chance of finding a graph of adjacent "true" events that reach every boundary of the finite grid. Accordingly, a full 3-D location of every single event can be determined during or after sensing without occupying every single array site. Further, for high-resolution sensing in which a field-of-view of a detector is smaller than the area of an array, a complete array image may be formed by stitching together a plurality of fields-of-view. In this case, percolation theory may be interpreted to mean that there exists a field-of-view in which there is a 100% chance of finding a graph of adjacent "true" events that reach every boundary of the field-of-view. Given sufficient knowledge of array site geometry or patterning, sufficient information may exist to calibrate a detection device based upon detection of a partially-occupied array. Methods set forth herein may be advantageous for minimizing a quantity of detectable reagents utilized on an array.

The identification of contiguous graphs of detection events, as utilized in percolation theory, can provide information over the entirety of a detector's field-of-view. A graph of contiguous, adjacent detection events which reaches all sides of an image or a field-of-view facilitate identification of real-world spatial coordinates of each light-up in the graph. The boundary of an image defines a detector coordinate system and every adjacent detection event can be defined in reference to neighboring detection events and the coordinate system defined by the boundary of the image. Accordingly, every detection event in an image has one and only one possible location.

Proper calibration of detectors may be particularly important for detection of arrays with low signal occupancy (e.g., less than 25% of sites having a detectable signal relative to a total quantity of sites detected in the field-of-view of an image). At low signal occupancy, it may be difficult to identify a spatial arrangement, pattern, or gridding of array sites. When capturing images of an array with an optical detection system having some amount of optical distortion or aberration, the location of signals in an uncorrected or raw image may be significantly displaced from their actual location on the array. Accordingly, registering of an identical site between images of two differing fields-of-view containing the site may be difficult unless the images are spatially-corrected to remove any distortion or aberration. Methods set forth herein may be especially useful for calibrating optical detection systems utilized to detect array-based process such as affinity agent binding that can produce low signal occupancy during detection events.

Provided herein are methods of forming arrays that may be useful for the calibration of array detection devices, such as optical cameras or microscopes. In some cases, arrays may be formed with distributions of fiducial elements that facilitate detector calibration. In other cases, arrays may be formed in which analytes or other array site components may be utilized to facilitate detector calibration. Further provided herein are methods of calibrating a detection device utilizing detection events at array sites. Further provided herein are methods of utilizing a calibrated detection device for an array-based sensing process.

Definitions

Terms used herein will be understood to take on their ordinary meaning in the relevant art unless specified otherwise. Several terms used herein and their meanings are set forth below.

As used herein, the term "detection device" refers to an apparatus or system that is configured to receive an array containing signal sources and measure at least one physical characteristic of the signal sources in a spatially resolvable manner. A detection device can include a detector that is configured to measure the at least one physical characteristic, as well as additional components such as an array holder, motion control devices for the array and/or detector (e.g. translation in one or more of x, y or z in a Cartesian system, wherein sites of the array are spatially separated from each other in x and y), environmental regulation components (e.g., temperature regulation devices, devices for fluid delivery or withdrawal), and structural components that physically secure and/or orient components of the detection device.

As used herein, the term "detector" refers to a component of a detection device that measures a physical characteristic of a signal source in a spatially resolvable manner. A detector can include a sensor that provides a quantitative or qualitative measure of a signal from a signal source based upon collection and detection of the signal. A detector can further include signal collection devices (e.g., objective lenses, apertures, etc.) and signal-shaping devices (e.g., tube lenses, mirrors, quadrupoles, amplifiers, etc.). Exemplary detectors include microscopes, laser distance sensors, and cameras. As used herein, the term "sensor" refers to a device that collects a signal from a signal source and converts the signal into a measurable physical property (e.g., an electrical voltage). A sensor may contain one or more sensing elements. For example, a sensor may comprise an array of sensing elements (e.g., a pixel-based array). In another example, a sensor may comprise a single pixel that is translated across a detectable area. Exemplary sensing elements include charge-coupled devices (CCDs) and complementary metal-oxide on semiconductor devices (CMOS). As used herein, the term "pixel," when used in reference to a sensor, refers to a single sensing element that collects a signal from a signal source and converts the signal into a measurable physical property (e.g., converting photons into electrical voltages). Coaxial alignment of a pixel with an array address, in which the axis of alignment is orthogonal to the array address, can provide a measure of a presence or absence of a signal source at the array address.

As used herein, the term "image" refers to a dataset that provides measurements of a physical property or a plurality thereof according to spatial address on an array of each measurement. An image can be one-dimensional (1-D), two-dimensional (2-D), three-dimensional (3-D), or have a higher dimensionality (e.g., incorporating a time component). An image may be a visual representation of a dataset (e.g., a picture, a graph), or may be a stored in a tabular format (e.g., a data matrix), such as in a computer-readable medium. An image can be composed of a plurality of pixels, in which each pixel represents a physical measurement at an array address. As used herein, the term "pixel," when used in reference to an image, refers to a discrete data unit of the image for an array address. A pixel can represent a discrete area of an array as determined by the spatial resolution of a detector that produces a pixelated image. For example, if array sites are spaced at about 1 micron and each array site is detected by four sensing elements (a 2×2 set of sensing elements), each pixel of a pixelated image would correspond to about a 500 nanometer by 500 nanometer region of the array.

As used herein, the term "field-of-view," as used in reference to an image, refers to a portion or region of an image that is analyzed. A field-of-view may include the entire area of an image. A field-of-view may include less than the entire area of an image. A field-of-view may include information from two or more concatenated or joined images. A field-of-view may be defined by a boundary. Optionally, the boundary may have a number of sides, N, that delineate the area of image analysis from regions excluded from image analysis. For example, a triangular field-of-view will have N=3 sides, a rectangular field-of-view will have N=4 sides, a hexagonal field-of-view will have N=6 sides, etc. Sides can be straight lines or curved. The boundary for a field-of-view need not have a discrete number of sides. For example, as a boundary becomes quasi-ellipsoid or quasi-circular the number of sides can be considered to approach infinity. A field-of-view can have an irregular boundary. A curved side or boundary may be approximated as a set of shorter straight line segments that follow the path of the curved side or boundary.

As used herein, the term "signal" refers to a physically measurable phenomena that is, optionally, transmitted or received by a signal source. A signal may comprise a quantity of transmitted photons or particles (e.g., electrons, neutrons, alpha particles). A signal may comprise a quantity of received photons or particles (e.g., infrared or UV-Vis absorption). The term "signal" is not intended to be construed as requiring detection of a transmitted or received phenomena. For example, a fluorescent moiety will inherently transmit a photon signal regardless of whether the emission is detected. As used herein, the term "detection event," when used in reference to an image, refers to the display of a measurement at an array address that corresponds to the presence of a signal from a signal source at the array address. For example, in a visual image collected by a fluorescent microscope, a detection event may appear as a light area within a dark background. A detection event can occur at an address corresponding to an array site. As used herein, the term "vacancy," when used in reference to an image, refers to the display of a measurement at an array address that corresponds to the absence of a significant signal from a signal source at the array address. A vacancy can occur at an address corresponding to an array site.

As used herein, the term "signal source" refers to a molecule, particle, or moiety that generates a signal, transmits a signal, is configured to generate a signal or is configured to transmit a signal. A signal source can comprise one or more than one detectable label that generates, transmits, is configured to generate or is configured to transmit a signal. Exemplary detectable labels can include fluorophores, luminophores, and radiolabels. A signal source may be formed by binding a detectable label to a molecule, particle, or moiety. A detectable label may be covalently or non-covalently coupled to a molecule, particle, or moiety to form a signal source. A signal source may be uncoupled (e.g., not bound to an array site or other surface) or coupled (e.g., bound at an array site or other surface). A signal source may comprise an affinity agent or a plurality thereof. A signal source may comprise a nanoparticle (e.g., a nucleic acid nanoparticle, a quantum dot, a fluorescently-labeled polymer nanoparticle, etc.). A signal source may comprise an analyte. A signal source may be coupled to an analyte.

As used herein, the term "analyte" refers to a molecule, particle, or complex of molecules or particles that is coupled to an array site or an anchoring moiety. An analyte may comprise a target for an analytical method (e.g., sequencing, identification, quantification, etc.) or may comprise a functional element such as a binding ligand or a catalyst. An analyte may comprise a biomolecule, such as a polypeptide, polysaccharide, nucleic acid, lipid, metabolite, enzyme cofactor or a combination thereof. An analyte may comprise a non-biological molecule, such as a polymer, metal, metal oxide, ceramic, semiconductor, mineral, or a combination thereof. As used herein, the term "sample analyte" refers to an analyte derived from a sample collected from a biological or non-biological system. A sample analyte may be purified from at least one, some or all other substances, such as substances found in its native milieu, or unpurified from other substances, such as substances found in its native milieu. As used herein, the term "standard analyte" refers to a known or characterized analyte that is provided as a physical or chemical reference to a process. A standard analyte may comprise the same type of analyte as a sample analyte, or may differ from a sample analyte. For example, a polypeptide analyte process may utilize a polypeptide standard analyte with known characteristics. In another example, a polypeptide analyte process may utilize a non-polypeptide standard analyte with known characteristics.

As used herein, the term "single-analyte resolution," when used in reference to a single-analyte array, refers to detection of a single-analyte under the conditions that: 1) the single-analyte is detected by a signal with a magnitude that exceeds the magnitude of background signals for the detection system, and 2) the single-analyte is detected by a signal at a location that is spatially separated from the location of a signal corresponding to a different single-analyte (i.e., a spatial minimum of signal magnitude exists between a first single-analyte and a second single-analyte for the two single-analytes to be spatially resolved). In some cases, a signal corresponding to a first single-analyte may be considered spatially resolved from a signal corresponding to a second single-analyte if a signal minimum occurs between the locations of the two single-analytes with a magnitude that is substantially less than an average or peak signal maximum of one or both signal maxima corresponding to the first and second single analytes. For example, a signal minimum between two signal maxima corresponding respectively to a first single analyte and a second single analyte may have a magnitude that is no more than about 95%, 90%, 80%, 70%, 60%, 50%, 40%, 30%, 20%, 10%, 5%, 1%, or less than 1% of an average or peak signal maximum of the two signal maxima. In some cases, signals corresponding to two or more analytes may be considered spatially resolved if a spatial resolution criterion is achieved, such as the Rayleigh Criterion. A signal magnitude (peak or average) corresponding to a single-analyte may have a signal-to-noise ratio relative to an average background signal of at least about 1.1:1, 1.5:1, 2:1, 2.5:1, 3:1, 4:1, 5:1, 10:1, 20:1, 50:1, 100:1 or more than 100:1.

As used herein, the term "nucleic acid nanoparticle," refers to a single- or multi-chain polynucleotide molecule comprising a compacted three-dimensional structure. The compacted three-dimensional structure can optionally have a characteristic tertiary structure. An exemplary nucleic acid nanostructure is a structured nucleic acid particle (SNAP). A SNAP can be configured to have an increased number of interactions between regions of a polynucleotide strand, less distance between the regions, increased number of bends in the strand, and/or more acute bends in the strand, as compared to the same nucleic acid molecule in a random coil or other non-structured state. Alternatively or additionally, the compacted three-dimensional structure of a nucleic acid nanostructure can optionally have a characteristic quaternary structure. For example, a nucleic acid nanostructure can be configured to have an increased number of interactions between polynucleotide strands or less distance between the strands, as compared to the same nucleic acid molecule in a random coil or other non-structured state. In some configurations, the tertiary structure (i.e. the helical twist or direction of the polynucleotide strand) of a nucleic acid nanostructure can be configured to be more dense than the same nucleic acid molecule in a random coil or other non-structured state. Nucleic acid nanostructures may include deoxyribonucleic acid (DNA), ribonucleic acid (RNA), peptide nucleic acid (PNA), other nucleic acid analogs, and combinations thereof. Nucleic acid nanostructures may have naturally-arising or engineered secondary, tertiary, or quaternary structures. A structured nucleic acid particle can contain at least one of: i) a moiety that is configured to couple an analyte to the nucleic acid nanostructure, ii) a moiety that is configured to couple the nucleic acid nanostructure to another object such as another SNAP, a solid support or a surface thereof, iii) a moiety that is configured to provide a chemical or physical property or characteristic to a nucleic acid nanostructure, or iv) a combination thereof.

Exemplary SNAPs may include nucleic acid nanoballs (e.g. DNA nanoballs), nucleic acid nanotubes (e.g. DNA nanotubes), and nucleic acid origami (e.g. DNA origami). A SNAP may be functionalized to include one or more reactive handles or other moieties. A SNAP may comprise one or more incorporated residues that contain reactive handles or other moieties (e.g., modified nucleotides).

As used herein, the term "array" refers to a population of sites that provide spatial separation of molecules, moieties, or analytes that are resolved such that the sites can be distinguished from each other. Accordingly, molecules, moieties or analytes at one site of an array can be resolved from molecules, moieties or analytes at other sites of the array. The sites can function as unique identifiers and/or the sites can be attached to unique identifiers. The term "array of analytes" refers to an array with a population of sites, in which a plurality of sites of the population of sites is occupied by analytes.

As used herein, the term "unique identifier" refers to a solid support (e.g., particle or bead), spatial address in an array, tag, label (e.g., luminophore), or barcode (e.g., nucleic acid barcode) that is attached to an analyte and that is distinct from other identifiers, throughout one or more steps of a process. The process can be an analytical process such as a method for detecting, identifying, characterizing or quantifying an analyte. Attachment to a unique identifier can be covalent or non-covalent (e.g., ionic bond, hydrogen bond, van der Waals forces etc.). A unique identifier can be exogenous to the analyte, for example, being synthetically attached to the analyte. Alternatively, a unique identifier can be endogenous to the analyte, for example, being attached or associated with the analyte in the native milieu of the analyte. An array can include different analytes that are each attached to different unique identifiers. For example, an array can include different molecules or analytes that are each located at different addresses on a solid support. Alternatively, an array can include separate solid supports each functioning as an address that bears a different molecule or analyte, where the different molecules or analytes can be identified according to the locations of the solid supports on a surface to which the solid supports are attached, or according to the locations of the solid supports in a liquid such as a fluid stream. The molecules or analytes of the array can be, for example, nucleic acids such as SNAPs, polypeptides, proteins, peptides, oligopeptides, enzymes, ligands, or receptors such as antibodies, functional fragments of antibodies or aptamers. The addresses of an array can optionally be optically observable and, in some configurations, adjacent addresses can be optically distinguishable when detected using a method or apparatus set forth herein.

As used herein, the terms "array site" and "site," when used in reference to an array, refer to a location in an array where a particular molecule or analyte is bound or configured to be bound. A site can contain only a single molecule or analyte, or it can contain a population of several molecules or analytes of the same species (i.e. an ensemble of the molecules). Alternatively, a site can include a plurality of molecules or analytes that are different species. Sites of an array are typically discrete. Sites can be optically resolvable. The discrete sites can be contiguous, or they can have interstitial spaces between each other. An array useful herein can have, for example, sites that are separated by less than 100 microns, 10 microns, 1 micron, 500 nm, 100 nm, 10 nm or less. Alternatively or additionally, an array can have sites that are separated by at least 10 nm, 100 nm, 500 nm, 1 micron, 5 microns, 10 microns, 50 microns, 100 microns or more. The sites can each have an area of less than 1 square millimeter, 500 square microns, 100 square microns, 25 square microns, 1 square micron or less. An array can include at least about $1\times10^4$, $1\times10^5$, $1\times10^6$, $1\times10^8$, $1\times10^{10}$, $1\times10^{12}$, or more sites.

As used herein, the term "address," when used in reference to an array or a solid support thereof, refers a spatial location on the array. An address of an array may be located at an array site. An address of an array may be located at an interstitial region between array sites. An address may be represented by a coordinate system, such as a two-dimensional coordinate system (e.g., x-axis and y-axis coordinates) or a three-dimensional coordinate system (e.g., x-axis, y-axis, and z-axis coordinates).

As used herein, the term "solid support" refers to a substrate that is insoluble in aqueous liquid. Optionally, the substrate can be rigid. The substrate can be non-porous or porous. The substrate can optionally be capable of taking up a liquid (e.g., due to porosity) but will typically, but not necessarily, be sufficiently rigid that the substrate does not swell substantially when taking up the liquid and does not contract substantially when the liquid is removed by drying. A nonporous solid support is generally impermeable to liquids or gases. Exemplary solid supports include, but are not limited to, glass and modified or functionalized glass, plastics (including acrylics, polystyrene and copolymers of styrene and other materials, polypropylene, polyethylene, polybutylene, polyurethanes, Teflon™, cyclic olefins, polyimides etc.), nylon, ceramics, resins, Zeonor™, silica or silica-based materials including silicon and modified silicon, carbon, metals, metal oxides (e.g., zirconia, titania, alumina, etc.), inorganic glasses, optical fiber bundles, gels, and polymers.

As used herein, the terms "group" and "moiety" are intended to be synonymous when used in reference to the structure of a molecule. The terms refer to a component or part of the molecule. The terms do not necessarily denote the relative size of the component or part compared to the rest of the molecule, unless indicated otherwise. A group or moiety can contain one or more atom. As used herein, the term "coupling moiety" refers to a component or part of a molecule or particle that is configured to couple the molecule or particle to a second molecule or particle, or that couples the molecule or particle to the second molecule or particle. A coupling moiety may couple a molecule or particle to a second molecule or particle reversibly or irreversibly. A coupling moiety may couple a molecule or particle to a second molecule or particle covalently or non-covalently.

As used herein, the terms "affinity reagent" and "affinity agent" refer to a molecule or other substance that is capable of specifically or reproducibly binding to a binding partner or other substance. Binding can optionally be used to identify, track, capture, alter, or influence the binding partner. The binding partner can optionally be larger than, smaller than or the same size as the affinity reagent. An affinity reagent may form a reversible or irreversible interaction with a binding partner. An affinity reagent may bind with a binding partner in a covalent or non-covalent manner. An affinity reagent may be configured to perform a chemical modification (e.g., ligation, cleavage, concatenation, etc.) that produces a detectable change in the larger molecule, thereby permitting observation of the interaction that occurred. Affinity reagents may include chemically reactive affinity reagents (e.g., kinases, ligases, proteases, nucleases, etc.) and chemically non-reactive affinity reagents (e.g., antibodies, antibody fragments, aptamers, DARPins, peptamers, etc.). An affinity reagent may comprise one or more known and/or characterized binding components or binding sites (e.g., complementarity-defining regions) that mediate or facilitate binding with a binding partner. Accordingly, an affinity reagent can be monovalent or multivalent (e.g. bivalent, trivalent, tetravalent, etc.). An affinity reagent is typically non-reactive and non-catalytic, thereby not permanently altering the chemical structure of a substance it binds in a method set forth herein.

As used herein, the terms "protein" and "polypeptide" are used interchangeably to refer to a molecule or analyte comprising two or more amino acids joined by a peptide bond. A polypeptide may refer to a peptide (e.g., a polypeptide with less than about 200, 150, 100, 75, 50, 40, 30, 20, 15, 10, or less than about 10 linked amino acids). A polypeptide may refer to a naturally-occurring molecule, or an artificial or synthetic molecule. A polypeptide may include one or more non-natural, modified amino acids, or non-amino acid linkers. A polypeptide may contain D-amino acid enantiomers, L-amino acid enantiomers or both. A polypeptide may be modified naturally or synthetically, such as by post-translational modifications.

As used herein, the term "label" or "detectable label" refers to a moiety of an affinity reagent or other substance that provides a detectable characteristic. The detectable characteristic can be, for example, an optical signal such as absorbance of radiation, luminescence or fluorescence emission, luminescence or fluorescence lifetime, luminescence or fluorescence polarization, or the like; Rayleigh and/or Mie scattering; binding affinity for a ligand or receptor; magnetic properties; electrical properties; charge; mass; radioactivity or the like. A label component can be a detectable chemical entity that is conjugated to or capable of being conjugated to another molecule or substance. Exemplary molecules that can be conjugated to a label component include an affinity reagent or a binding partner. A label component may produce a signal that is detected in real-time (e.g., fluorescence, luminescence or radioactivity). A label component may produce a signal that is detected off-line (e.g., a nucleic acid barcode) or in a time-resolved manner (e.g., time-resolved fluorescence). A label component may produce a signal with a characteristic frequency, intensity, polarity, duration, wavelength, sequence, or fingerprint. Exemplary labels include, without limitation, a fluorophore, luminophore, chromophore, nanoparticle (e.g., gold, silver or carbon nanotubes), heavy atom, radioactive isotope, mass label, charge label, spin label, receptor, ligand, nucleic acid barcode, polypeptide barcode, polysaccharide barcode, or the like.

As used herein, the term "nucleic acid origami" refers to a nucleic acid construct comprising an engineered secondary, tertiary or quaternary structure. A nucleic acid origami may include DNA, RNA, PNA, LNAs, other nucleic acid analog, modified or non-natural nucleic acids, or combinations thereof. A nucleic acid origami may comprise a plurality of oligonucleotides that hybridize via sequence complementarity to produce the engineered structuring of the origami particle. A nucleic acid origami may comprise sections of single-stranded or double-stranded nucleic acid, or combinations thereof. A nucleic acid origami may comprise one or more tertiary structures of a nucleic acid, such as A-DNA, B-DNA, C-DNA, L-DNA, M-DNA, Z-DNA, etc. A nucleic acid origami may comprise single-stranded nucleic acid, double-stranded nucleic acid, multi-stranded nucleic acid, or combinations thereof. Exemplary nucleic acid origami structures may include nanotubes, nanowires, cages, tiles, nanospheres, blocks, and combinations thereof.

As used herein, the term "nucleic acid nanoball" refers to a globular or spherical nucleic acid structure. A nucleic acid nanoball may comprise a concatemer of oligonucleotides that arranges in a globular structure. A nucleic acid nanoball may comprise one or more oligonucleotides, including oligonucleotides comprising self-complementary nucleic acid sequences. A nucleic acid nanoball may comprise a palindromic nucleic acid sequence. A nucleic acid nanoball may include DNA, RNA, PNA, LNAs, other nucleic acid analog, modified or non-natural nucleic acids, or combinations thereof.

As used herein, the term "oligonucleotide" refers to a molecule comprising two or more nucleotides joined by a phosphodiester bond or analog thereof. An oligonucleotide may comprise DNA, RNA, PNA, LNAs, other nucleic acid analog, modified nucleotides, non-natural nucleotides, or combinations thereof. An oligonucleotide may include a limited number of bonded nucleotides, such as, for example, less than about 10000, 8000, 6000, 5000, 4000, 3000, 2000, 1000, 750, 500, 400, 300, 250, 200, 190, 180, 170, 160, 150, 140, 130, 120, 110, 100, 90, 80, 70, 60, 50, 40, 30, 25, 20, 15, 10, or less than 5 nucleotides. An oligonucleotide may include a linking group or linking moiety at a terminal or intermediate position. For example, an oligonucleotide may comprise two nucleic acid strands that are joined by an intermediate PEG molecule. In another example, an oligonucleotide may comprise a cleavable linker (e.g., a photocleavable linker, an enzymatically-cleavable linker, a restriction site, etc.) that joins two portions of the oligonucleotide. The terms "polynucleotide" and "nucleic acid" are used herein synonymously with the term "oligonucleotide."

As used herein, the term "binding specificity" refers to the tendency of an affinity reagent to preferentially interact with a binding partner, affinity target, or target moiety relative to other binding partners, affinity targets, or target moieties. An affinity reagent may have a calculated, observed, known, or predicted binding specificity for any possible binding partner, affinity target, or target moiety. Binding specificity may refer to selectivity for a single binding partner, affinity target, or target moiety in a sample over at least one other analyte in the sample. Moreover, binding specificity may refer to selectivity for a subset of binding partners, affinity targets, or target moieties in a sample over at least one other analyte in the sample.

As used herein, the terms "attached" or "coupled" refer to the state of two things being joined, fastened, adhered, connected or bound to each other. Attachment can be covalent or non-covalent. For example, a particle can be attached or coupled to a protein by a covalent or non-covalent bond. Similarly, a first nucleic acid can be attached or coupled to a second nucleic acid via hybridization or Watson-Crick base pairing. A covalent bond is characterized by the sharing of pairs of electrons between atoms. A non-covalent bond is a chemical bond that does not involve the sharing of pairs of electrons and can include, for example, hydrogen bonds, ionic bonds, van der Waals forces, hydrophilic interactions, adhesion, adsorption, and hydrophobic interactions.

As used herein, the term "anchoring moiety" refers to a molecule or particle that serves as an intermediary attaching an analyte to a surface (e.g., on a solid support or a microbead). An anchoring moiety may be covalently or non-covalently attached to a surface and/or a polypeptide. An anchoring moiety may be a biomolecule, polymer, particle, nanoparticle, or any other entity that is capable of attaching to a surface or analyte. In some cases, an anchoring moiety may be a nucleic acid nanoparticle such as a SNAP.

As used herein, the term "unbound," when used in reference to a molecule, particle or moiety that is contacted with an array, refers to the molecule, particle, or moiety not being attached or bound to an analyte at an array site in an initial configuration. An unbound assay agent may include a molecule, particle, or moiety that is solvated, suspended, or otherwise mobile within a fluidic medium. As used herein, the term "bound" when used in reference to a molecule, particle or moiety that is contacted with an array, refers to the molecule, particle, or moiety being attached or coupled to an analyte at an array site. A bound molecule, particle, or moiety may be covalently or non-covalently coupled to an array site.

As used herein, the term "optically resolvable distance" refers to a distance on an array or a surface thereof at which two separate objects can be optically distinguished with respect to each other. The threshold for an optically resolvable distance can vary based upon a mechanism of detection and/or the physical apparatus used to perform an optical detection as well as a detectable species utilized for detection (e.g., single fluorophores, multiple fluorophores, nanoparticles, intercalated dyes, etc.). For example, when detecting two fluorescent objects on a surface via optical microscopy, an optically resolvable distance may depend upon an excitation wavelength of fluorophores, an emission wavelength of fluorophores, and optical characteristics of an optical microscope utilized to image the objects. An optically resolvable distance may be at least about 1 nanometer (nm), 5 nm, 10 nm, 25 nm, 50 nm, 75 nm, 100 nm, 125 nm, 150 nm, 200 nm, 300 nm, 400 nm, 500 nm, or more than 500 nm. Alternatively or additionally, an optically resolvable distance may be no more than about 500 nm, 400 nm, 300 nm, 200 nm, 150 nm, 125 nm, 100 nm, 75 nm, 50 nm, 25 nm, 10 nm, 5 nm, 1 nm, or less than 1 nm. In some cases, an optically resolvable distance may be determined with respect to a detection method (e.g., a pixel-based sensor). For example, two objects may be considered to be separated by an optically resolvable distance if a sensor-based detection produces two optical signal intensity maxima (corresponding to the two objects) and an optical signal intensity minimum between the two maxima, in which the optical signal intensity minimum has a magnitude that is no more than half of the average signal-to-noise ratio of the two optical signal intensity maxima. As used herein, the term "optically non-resolvable distance" refers to a distance on an array or a surface thereof which is less than an optically resolvable distance, as set forth herein. An optically non-resolvable distance may be a distance at which an optical signal from a first object can not be distinguished from an optical signal from a second object. For example, a first optical signal from a first object may be optically non-resolvable from a second optical signal from a second object if the first optical signal and the second optical signal are respectively detected by adjacent pixels of a pixel-based sensor.

The term "comprising" is intended herein to be open-ended, including not only the recited elements, but further encompassing any additional elements.

As used herein, the term "each," when used in reference to a collection of items, is intended to identify an individual item in the collection but does not necessarily refer to every item in the collection. Exceptions can occur if explicit disclosure or context clearly dictates otherwise.

The embodiments set forth below and recited in the claims can be understood in view of the above definitions.

Methods of Detector Calibration

In an aspect, provided herein is a method of determining a parameter of a detector model, comprising: a) providing an array comprising a plurality of sites, wherein each individual site of the plurality of sites is optically resolvable, and wherein sites of the plurality of sites comprise signal sources, b) detecting on a detection device signals from the signal sources at sites of the plurality of sites, thereby forming an image comprising detection events, c) identifying within a field of view having N sides a pattern of detection events of the image, wherein each individual side of the N sides is contacted by a detection event of the pattern of detection events, and d) based upon the pattern of detection events, determining the parameter of the detector model.

A method of determining a parameter of a detector model can comprise providing an array. Any array that is configured to provide a quantity of detection events above a critical quantity of detection events during a detection process may be useful for a method set forth herein. A detection event may be produced by a signal source at an array site. A detection event may be detected on a detection device by interrogation of a signal source at an array site. For example, illumination of a fluorescent signal source at an array site may cause a detectable signal comprising emitted light at the array site. The emitted light may be absorbed by a sensor pixel (e.g., a CCD pixel, a CMOS pixel), thereby increasing an accumulated electrical charge within the pixel that may be converted into a signal magnitude for the pixel.

Suitable signal sources for producing detection events on an array can include: i) a detectable particle, molecule, or moiety that is coupled to an array site, ii) a detectable analyte that is coupled to an array site, iii) a detectable particle, molecule, or moiety that is coupled to an analyte at an array site, or iv) combinations thereof. A signal source may comprise one or more detectable labels (e.g., a fluorophore, a luminophore, a radiolabel) that are configured to produce a detectable signal. A detectable label may be chosen based upon a detection band of a sensor. For example, a fluorophore with an emission wavelength between 400 nanometers (nm) and 700 nm may be selected for use in a system containing a pixel-based sensor that absorbs light in the visible region of the electromagnetic spectrum. A detectable label may be covalently coupled to a signal source (e.g., covalent coupling of fluorophores to analytes or other nanoparticles). A detectable label may be non-covalently coupled to a signal source (e.g., intercalation dyes, coupling of a labeled probe to an analyte).

A signal source may comprise a fluorescent or luminescent particle. A signal source may comprise a nanoparticle, such as a nucleic acid nanoparticle, a polymer nanoparticle (e.g., a fluorescently-labeled polymer nanoparticle such as a ThermoFisher Fluosphere), a semiconductor nanoparticle (e.g., a quantum dot), or a combination thereof. In some cases, a signal source may comprise a biomolecule (e.g., a peptide, a nucleic acid, a polysaccharide, a lipid, etc.). In some cases, a sample analyte may be provided as a signal source. For example, a detectable label may be coupled to a sample analyte before or after the sample analyte is coupled to an array. In some cases, a signal source may comprise a detectable probe that is configured to bind to an array component (e.g., an analyte or an affinity tag that is located at an array site). A detectable probe may comprise one or more of: i) an affinity agent or a plurality thereof, ii) a detectable label or a plurality thereof, and iii) a retaining component or a plurality thereof (e.g., a nanoparticle, a nucleic acid nanoparticle) that couples an affinity agent to a detectable label.

Figure 1B:
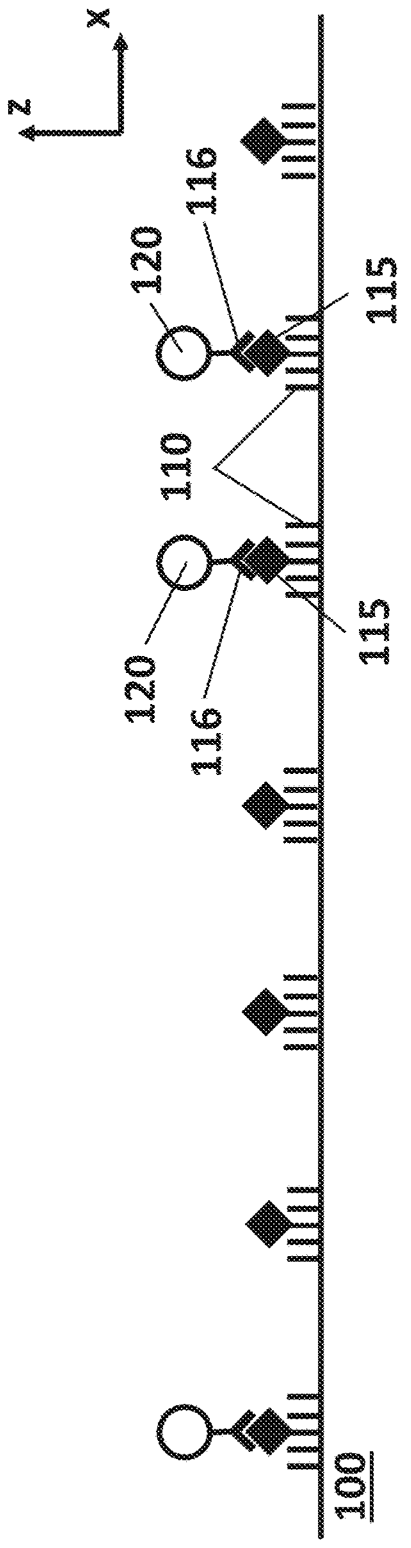

Signal sources for a detector calibration process can be provided by numerous methods. FIGS. 1A-1F depict examples of methods of forming arrays of signal sources for a detector calibration process. FIGS. 1A and 1B depict a method of forming an array of detectable particles by coupling detectable particles 120 to array sites 110 of a solid support 100. FIG. 1A depicts an initial array configuration in which a solid support 100 comprising a plurality of array sites 110 is contacted with a plurality of detectable particles 120. Each array site comprises an array site coupling moiety 115. Each detectable particle 120 comprises a detectable particle coupling moiety 116 that is complementary to the array site coupling moiety 115. FIG. 1B depicts a second configuration in which detectable particles 120 of the plurality of detectable particles 120 have coupled to array sites 110 of the plurality of array sites 110 by coupling of detectable particle coupling moieties 116 to array site coupling moieties 115. Depending upon the deposition conditions, the array may have a less than complete array site occupancy (i.e., less than 100% of array sites 110 occupied by a detectable particle 120).

Figure 1C:
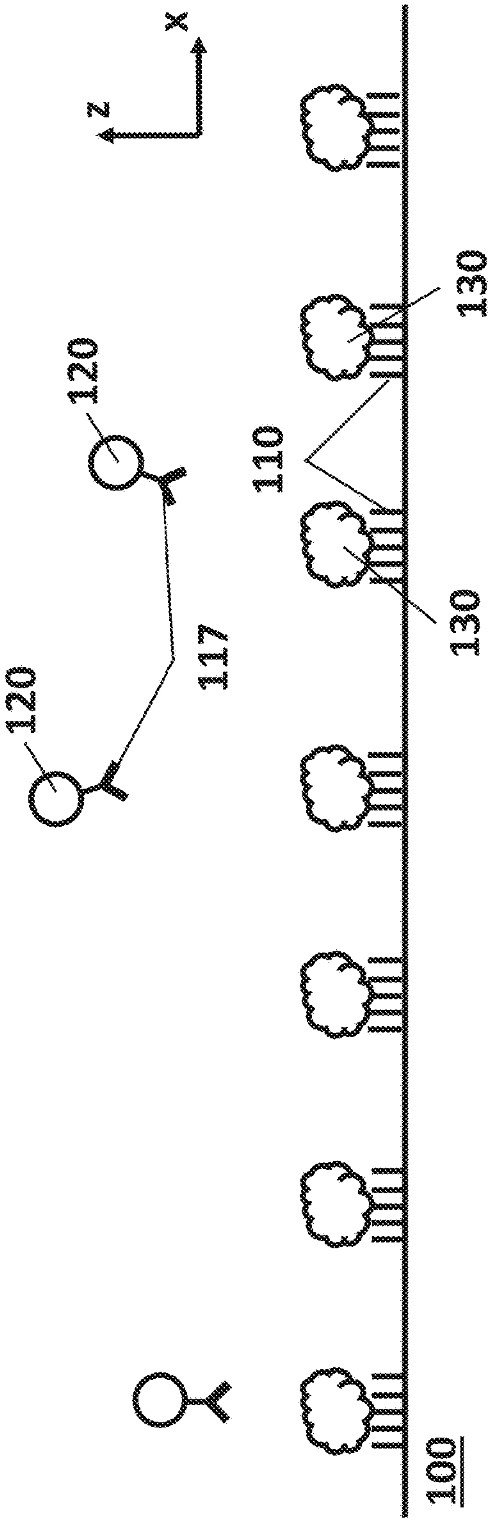
Figure 1D:
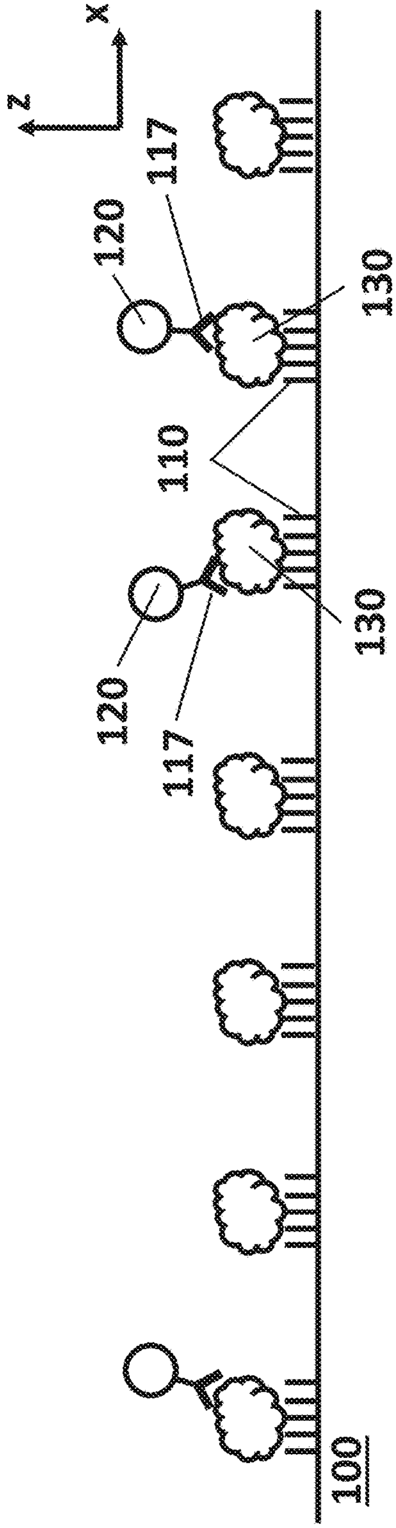

FIGS. 1C and 1D depict a method of forming an array of detectable particles 120 coupled to analytes 130 of an array of analytes 130. FIG. 1C depicts a solid support 100 comprising a plurality of array sites 110, in which each array site 110 comprises a coupled analyte 130 of a plurality of analytes 130. The array is contacted with a plurality of detectable particles 120. Each detectable particle 120 comprises a binding reagent 117 that has a binding specificity for an analyte 130. FIG. 1D depicts a second configuration in which detectable particles 120 of the plurality of detectable particles 120 have coupled to analytes 130 at array sites 110 by binding of binding reagents 117 to analytes 130. Depending upon the deposition conditions, the array may have a less than complete array site occupancy (i.e., less than 100% of array sites 110 occupied by a detectable particle 120 coupled to an analyte 130).

Figure 1E:
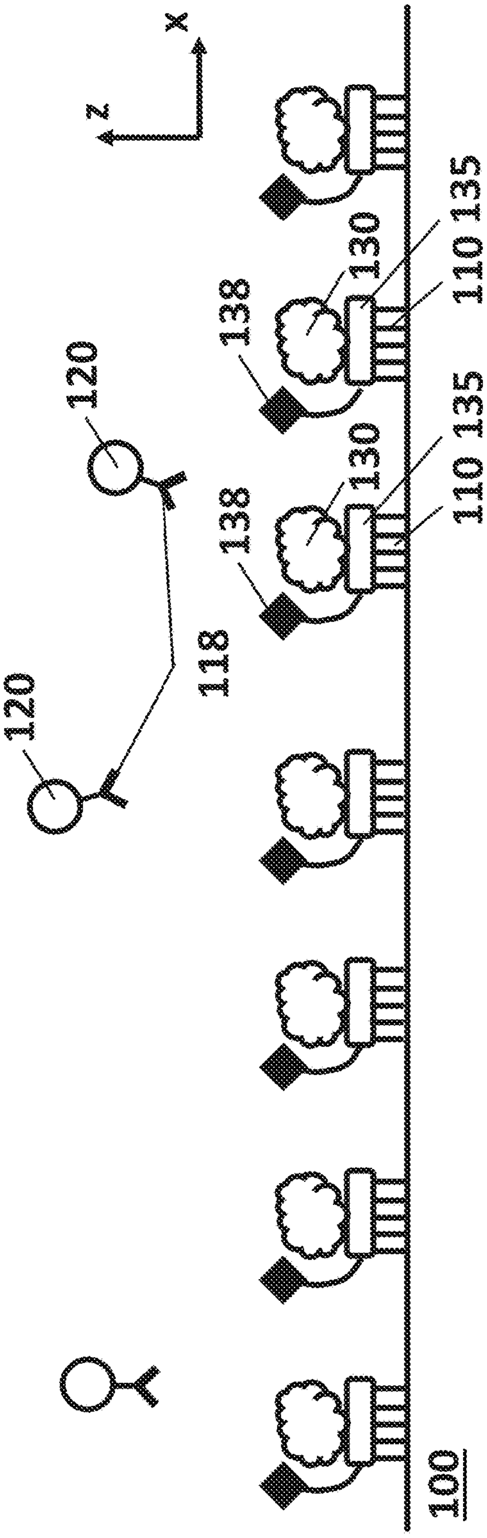
Figure 1F:
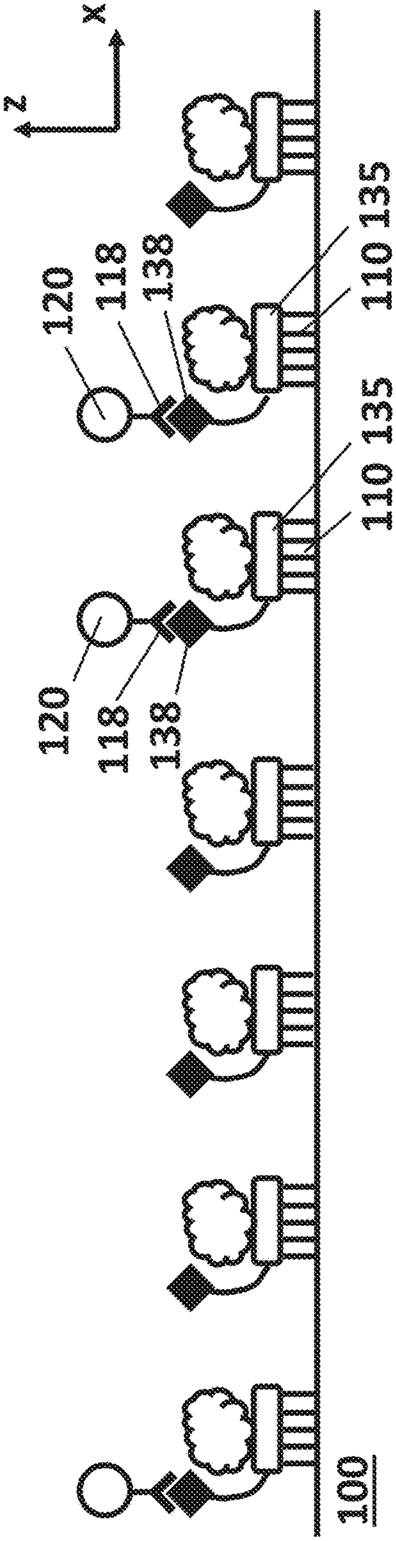

FIGS. 1E and 1F depict an alternative method of forming an array of detectable particles 120 coupled to array sites 110. FIG. 1E depicts a solid support 100 comprising a plurality of array sites 110. Each array site 110 comprises an analyte 130 of a plurality of analytes 130 that is coupled to the array site 110 by an anchoring moiety 135 (e.g., a nucleic acid nanoparticle, a non-nucleic acid nanoparticle). Each anchoring moiety 135 comprises an affinity tag 138. A suitable affinity tag 138 may include a peptide, a nucleic acid, or a component of a receptor-ligand pair. The array is contacted with a plurality of detectable particles 120. Each detectable particle 120 comprises a binding reagent 118 that has a binding specificity for an affinity tag 138. FIG. 1F depicts a second configuration in which detectable particles 120 of the plurality of detectable particles 120 have coupled to affinity tags 138 at array sites 110 by binding of binding reagents 118 to affinity tags 138. Depending upon the deposition conditions, the array may have a less than complete array site occupancy (i.e., less than 100% of array sites 110 occupied by a detectable particle 120 coupled to an affinity tag 138).

The skilled person will recognize innumerable variations of the above-described methods of forming arrays of signal sources. For example, analytes may be utilized as signal sources whether attached to detectable or used instead of detectable particles. If less than complete occupancy of signal sources is preferable, a mixture of labeled and unlabeled analytes may be deposited on the array to provide signal sources at a subset of array sites. Alternatively, array sites may be labeled, for example with fluorophores, to provide signal sources directly incorporated into the array sites. Additional aspects of arrays, array formation, and signal sources are described in U.S. Pat. Nos. 11,203,612 and 11,505,796, U.S. Patent Publication Nos. 20220162684A1 and 20230314324A1, each of which is herein incorporated by reference in its entirety.

Figure 2A:
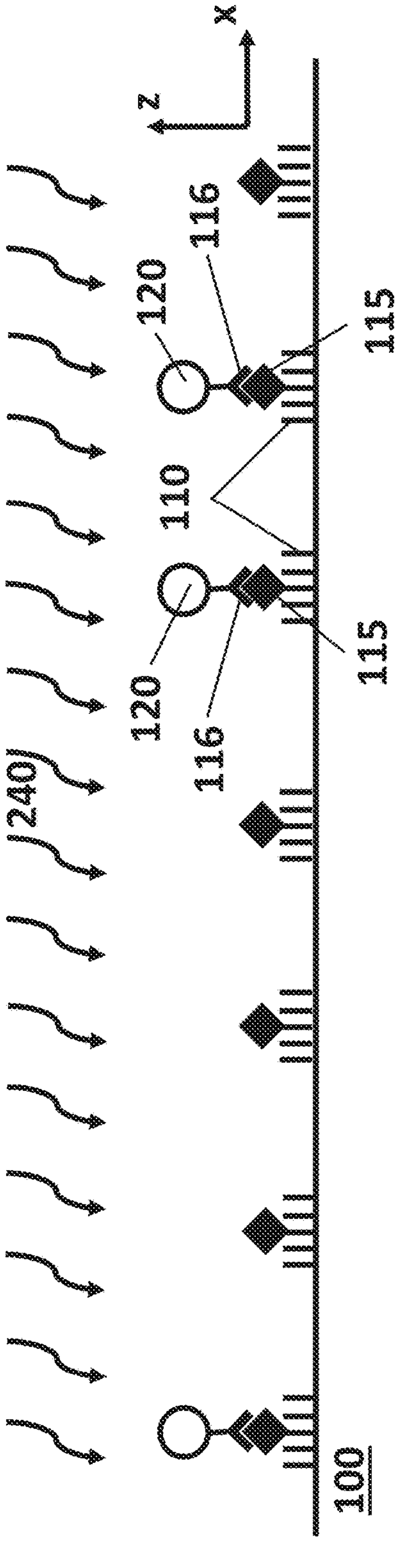
FIGS. 2A and 2B display a method of detecting signals from signal sources, in accordance with some embodiments.
Figure 2B:
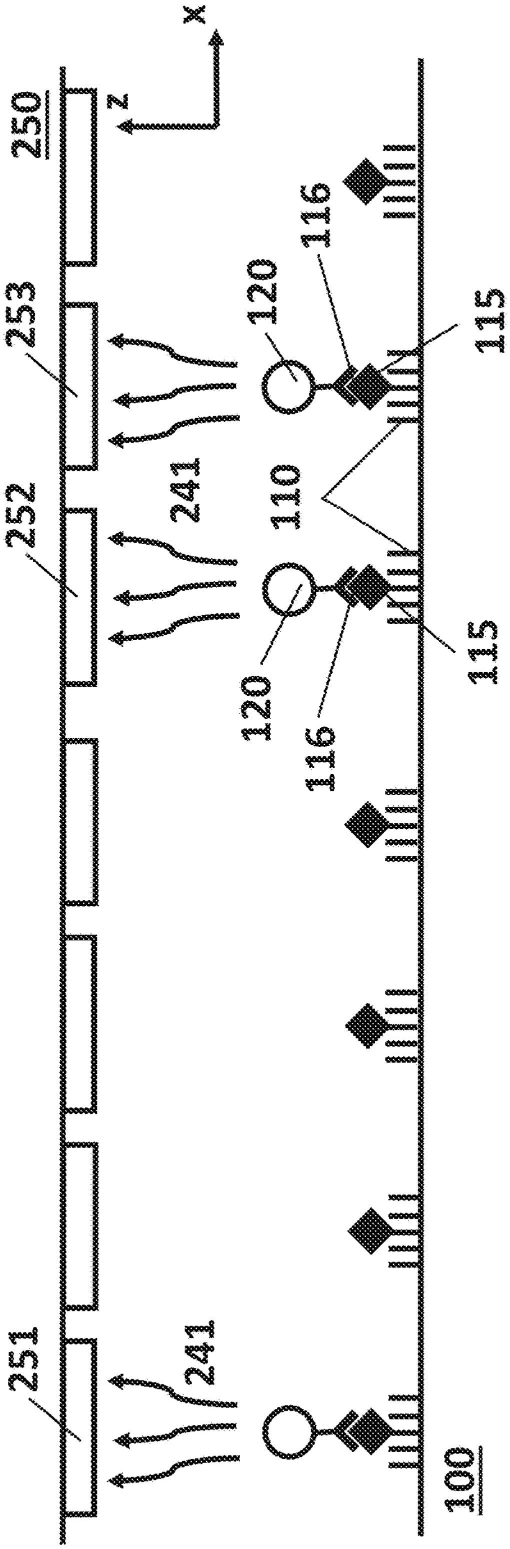

Turning to FIGS. 2A and 2B, a method of forming an image of an array of signal sources is depicted. FIG. 2A depicts a configuration that is similar to the array depicted in FIG. 1B. The array containing detectable particles 120 coupled to array sites 110 is illuminated by a light field 240 that comprises light of an excitation wavelength of the detectable particles 120. FIG. 2B depicts a second configuration, in which fluorescent excitation of the detectable particles 120 by light field 240 produces fluorescent light emission 241 from the detectable particles 120. A sensor comprising a solid support 250 comprising pixels or sets of pixels disposed upon the solid support 250 is positioned such that each pixel or set of pixels is aligned with a position relative to an address of the array. Accordingly emitted light 241 from individual array sites 110 is collected at specific pixels or pixel sets that correspond to array addresses. Because the array is not occupied at each array site 110, emitted light 241 is sensed at pixel or pixel sets 251, 252, and 253. Accordingly, an image formed by the sensor displaying accumulated light would show signals from the detectable particles 120 at addresses corresponding to pixel or pixel sets 251, 252, and 253, and minimal or indistinguishable signals (e.g., relative to a background signal) at addresses corresponding to other pixels or pixel sets. In some cases, additional areas of the array could be imaged by a similar method and images combined to form a complete picture of the array. Although FIGS. 2A-2B exemplify image formation with respect to fluorescence detection, the skilled person will readily recognize that, depending upon a signal source, signals may be produced by other stimulated or spontaneous mechanisms.

An array that is useful for detector calibration may not require complete array site occupancy. Alternatively, an array that is useful for detector calibration may not produce a detection event at each array site within a field-of-view of a detector. Accordingly, providing an array comprising a plurality of signal sources may comprise providing an array, a subarray, or a region of an array with a signal source occupancy rate of at least about 10%, 15%, 20%, 25%, 30%, 35%, 40%, 45%, 50%, 55%, 60%, 65%, 70%, 75%, 80%, 85%, 90%, 95%, 99%, 99.9%, or more than 99.9%. Alternatively, providing an array comprising a plurality of signal sources may comprise providing an array, a subarray, or a region of an array with a signal source occupancy rate of no more than about 99.9%, 99%, 95%, 90%, 85%, 80%, 75%, 70%, 65%, 60%, 55%, 50%, 45%, 40%, 35%, 30%, 25%, 20%, 15%, 10%, or less than 10%.

Figure 3:
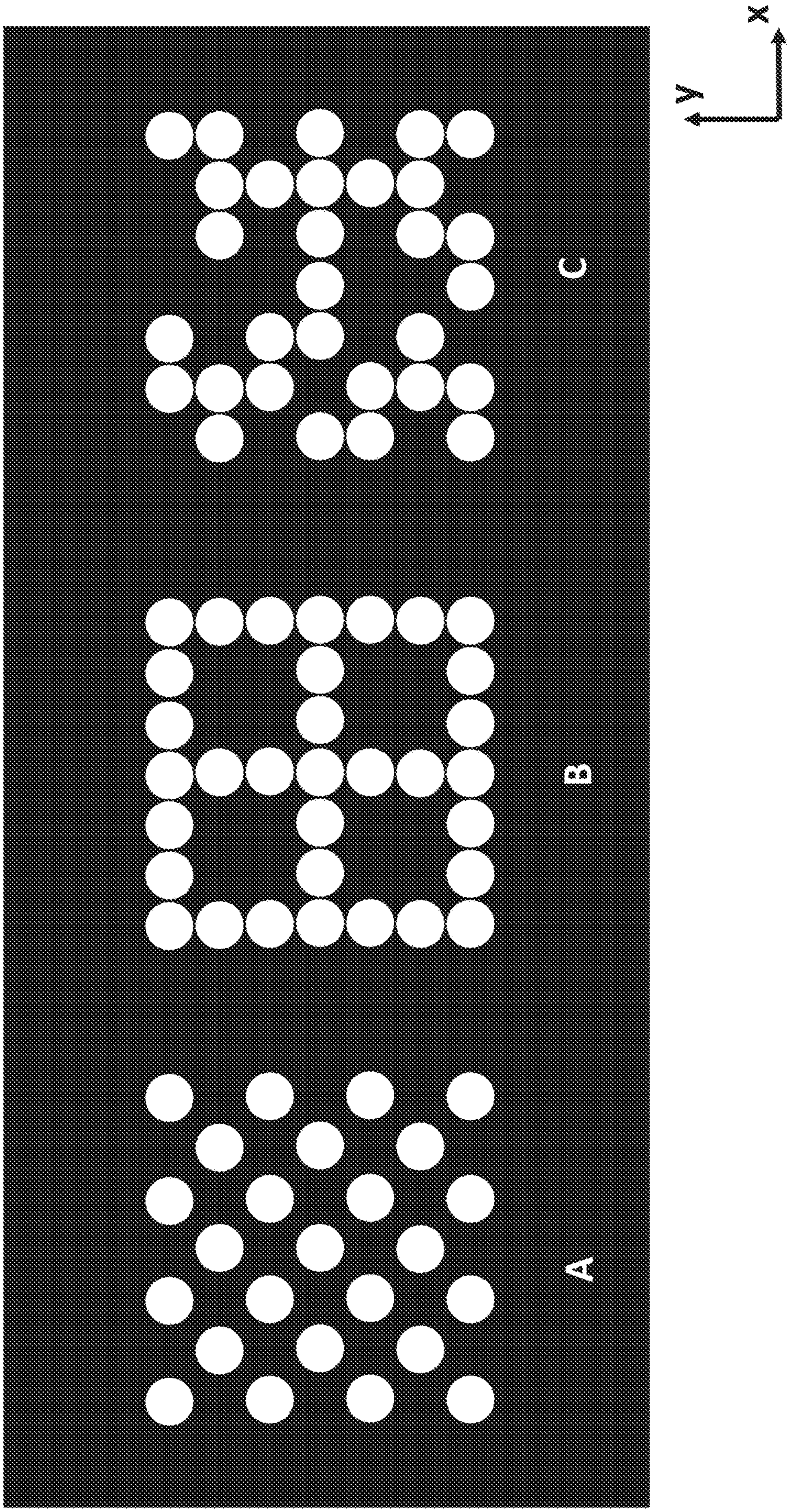
FIG. 3 shows patterns of detection events based upon images of arrays comprising signal sources, in accordance with some embodiments.

A plurality of signal sources on an array may have an ordered or non-random spatial distribution. A plurality of signal sources on an array may have a random spatial distribution. FIG. 3 illustrates non-random and random spatial distributions of signal sources on an array, as identified through detection of the signal sources at respective array sites. White circles represent array sites where a signal from a signal source is detected by a detection device. Detection event groups A and B are ordered or non-random clusters of detection event due to predictability of spatial locations of detection events and absences of detection events. Detection event groups A and B can be further characterized as comprising one or more axes of symmetry with respect to the spatial distribution of detection events.

Detection event groups A and B can also be characterized as having a repeating pattern of sites. Detection event group C is a random cluster of detection events due to the unpredictability of spatial locations of detection events and absences of detection events, and due to the pattern of sites being non-repeating.

Methods of forming arrays with random or non-random spatial patterning are known in the art. For example, a non-random distribution of signal sources may be formed by lithographically patterning array sites in a desired non-random spatial pattern. After lithography, the non-random spatial pattern of array sites can be provided a surface chemistry that is complementary to the signal sources with respect to binding, thereby facilitating deposition of the signal sources at the non-random spatial pattern of array sites. In another example, a random distribution of array sites may be formed by providing an array in which all array sites have a substantially homogeneous surface chemistry and depositing signal sources at the array sites with a degree of stochasticity.

Figure 10:
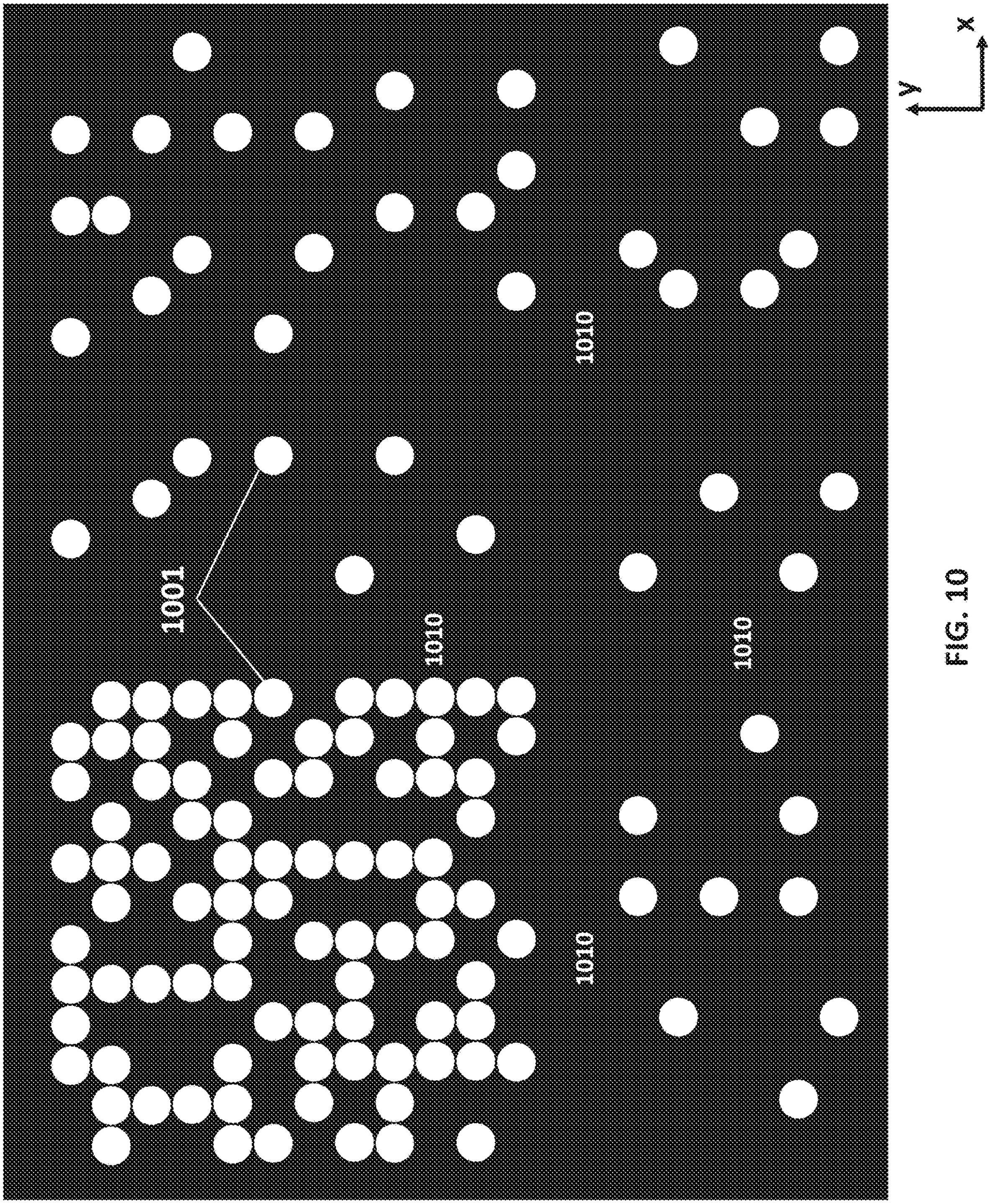
FIG. 10 displays an image of detection events on an array with a detector calibration region and a non-calibration region, in accordance with some embodiments.

In some cases, it may be useful to provide an array with a spatially segregated region for coupling signal sources. A spatially segregated region may provide an advantage of being rapidly located due to an expectation of its location on an array. Additionally, a spatially segregated region of the array may be provided with an alternative surface chemistry that facilitates deposition of signal sources at array sites of the spatially segregated region. FIG. 10 depicts a simulated image of detection events 1001 on a region of an array with a spatially-segregated subarray in the upper left side of the image. The segregated subarray is separated from other subarrays by interstitial regions 1010. Because there is a greater detection event occupancy rate in the spatially segregated subarray, there is a greater likelihood that an image of the spatially-segregated subarray will comprise a useful pattern of detection events for a method of detector calibration, as set forth herein. In some cases, a field-of-view of an image may be reduced to only contain detection events of a spatially-segregated region of an array.

A method of detector calibration can comprise the steps of: i) detecting on a detection device signals from signal sources at sites of a plurality of sites, thereby forming an image comprising the signals from the signal sources, and ii) identifying within a field of view having N sides a pattern of signals from signal sources of the image. An absolute size of a field-of-view of a detector may be chosen based upon a preferred spatial resolution. Spatial resolution may be affected by various characteristics of a detection system, such as signal intensity, optical characteristics (e.g., numerical aperture, magnification, etc.), or sensor characteristics (e.g., quantum efficiency). In some cases, an image may be provided for detector calibration that contains a full field-of-view for a detector. In other cases, an image may be provided for detector calibration that contains a partial or reduced field-of-view for a detector (e.g., a field-of-view that is smaller than the absolute field-of-view of the detector given the detector spatial resolution). An image provided for detector calibration may contain a pattern of signals from signal sources that is sufficient for detector calibration according to a method set forth herein.

Figure 4A:
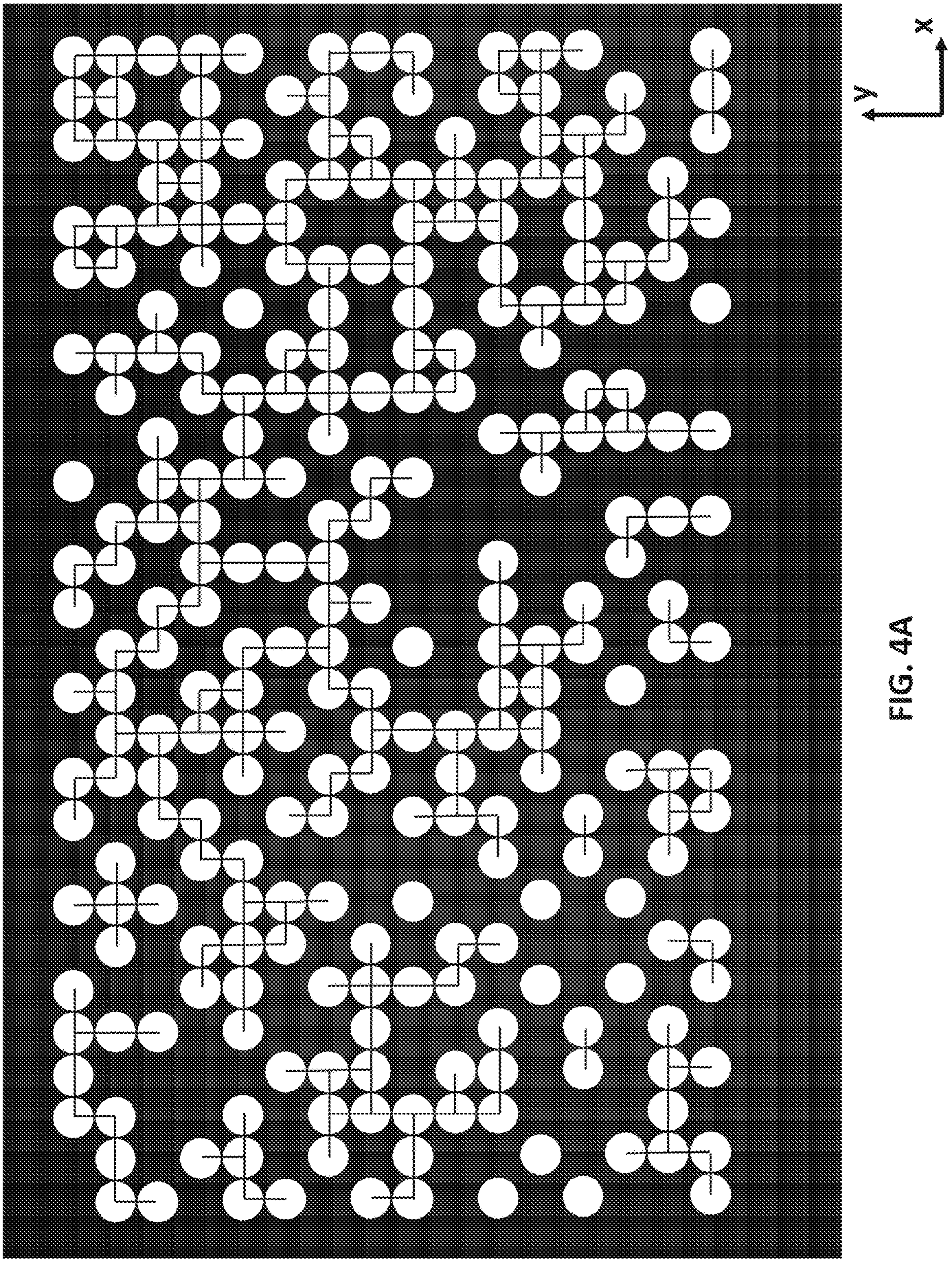
FIGS. 4A, 4B, and 4C illustrate differing image field-of-views and identification of graphs of contiguous detection events within the fields-of-view, in accordance with some embodiments.
Figure 4B:
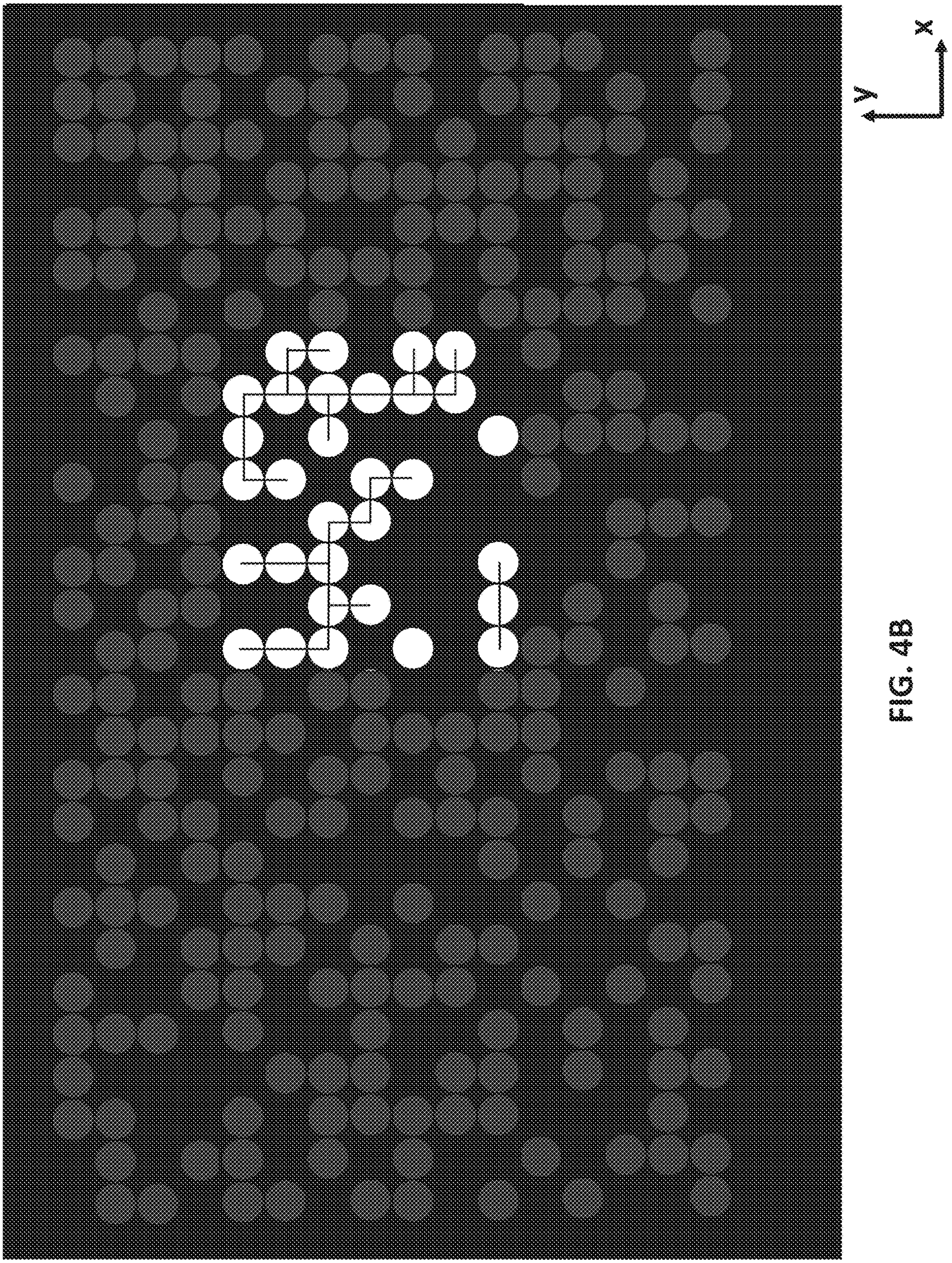
Figure 4C:
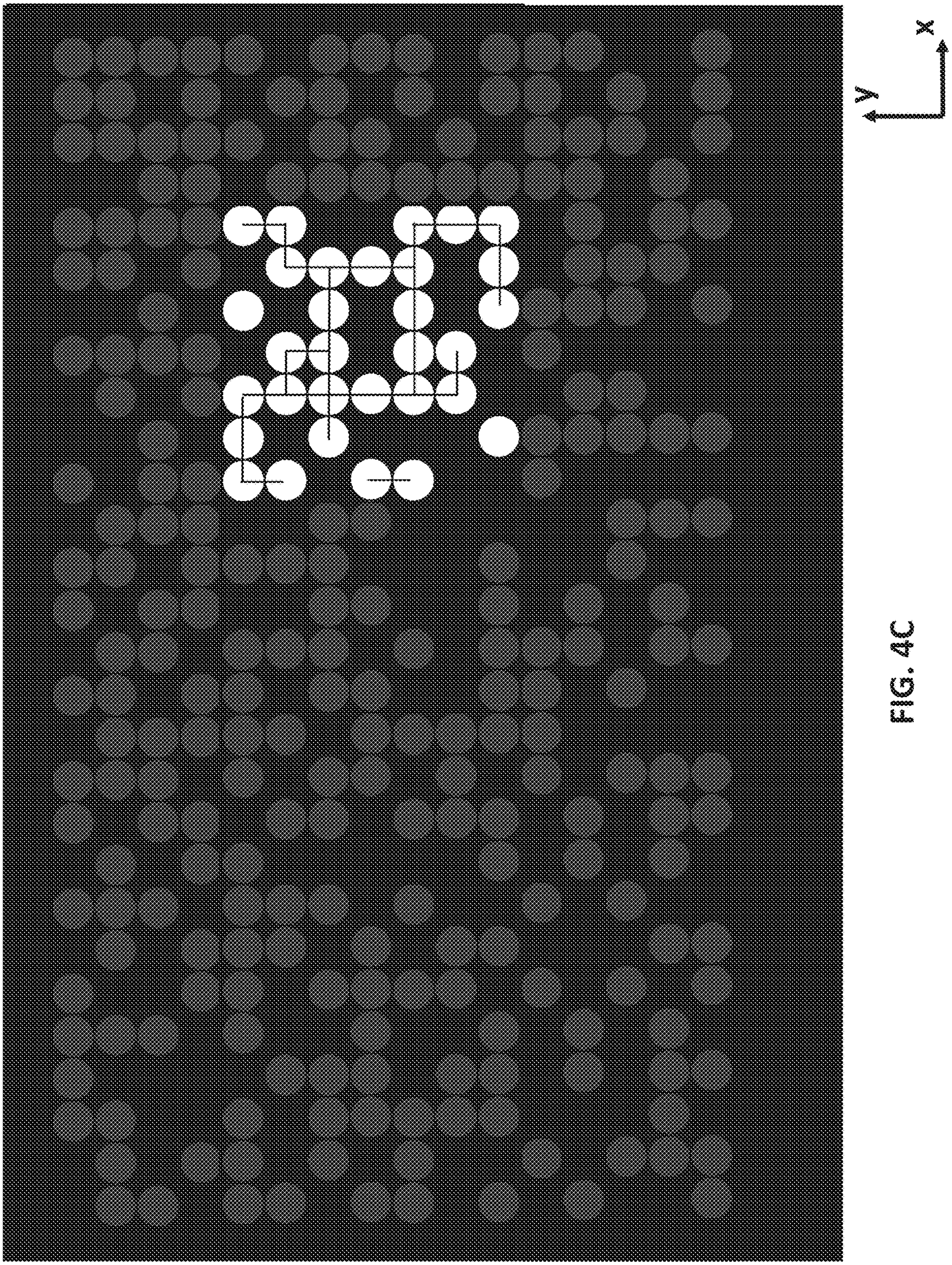

FIGS. 4A-4C illustrate aspects of field-of-view of images formed by detecting signals from signal sources at array sites. FIG. 4A depicts a simulated image of detected signals from signal sources at array sites. The white circles represent addresses of the array where signals were detected by a detection device. The detected signals have a random spatial distribution on the array and the signal source occupancy rate of the array is less than 100%. The image illustrated in FIG. 4A might represent a complete field-of-view of a detector (e.g., displaying data for all pixels of a pixel-based array sensor). The black lines connecting detection events represent pathways along a rectangular grid between contiguous detection events. In the rectangular full field-of-view of FIG. 4A, there is not a continuous pathway that connects detection events at all four sides of the field-of-view. FIG. 4B depicts the simulated image of FIG. 4A with a reduced field-of-view covering an 8×8 grid of array sites (gray detection events have been excluded from the reduced field-of-view). For the reduced field-of-view in the selected location, a continuous pathway connecting detection events at all four sides of the square field-of-view does not exist. FIG. 4C depicts a rightward shift of the reduced field-of-view from the position of FIG. 4B. In the selected location of the field-of-view in FIG. 4C, a continuous pathway connecting detection events at all four sides of the square field-of-view does exist. Such a continuous group of contiguous detection events within a field-of-view may be useful for a method of detector calibration as set forth herein.

An array may comprise signal sources, in which the signal sources have a spatial distribution (e.g., a random spatial distribution, a non-random spatial distribution). An array of sites may be provided such that the sites at which signal sources may bind have a patterned ordering, such as a geometric grid pattern (e.g., a rectangular pattern, a hexagonal pattern, a circular pattern, etc.). Accordingly, an array may be provided in which the spatial addresses of array sites are substantially uniform or predictable, and the spatial addresses containing a signal source are predictable (i.e., a non-random spatial distribution) or unpredictable (i.e., a random spatial distribution).

Sites of a plurality of sites of an array may have an average pitch or inter-site spacing of at least about 10 nanometers (nm), 50 nm, 100 nm, 200 nm, 250 nm, 300 nm, 400 nm, 500 nm, 600 nm, 700 nm, 800 nm, 900 nm, 1 micron (μm), 1.1 μm, 1.2 μm, 1.5 μm, 2 μm, 5 μm, or more than 5 μm. Alternatively or additionally, sites of a plurality of sites of an array may have an average pitch or inter-site spacing of no more than about 5 μm, 2 μm, 1.2 μm, 1.1 μm, 1 μm, 900 nm, 800 nm, 700 nm, 600 nm, 500 nm, 400 nm, 300 nm, 250 nm, 200 nm, 100 nm, 50 nm, 10 nm, or less than 10 nm.

Sites of a plurality of sites of an array may have an average characteristic dimension (e.g., diameter, length, width, height) of at least about 10 nanometers (nm), 20 nm, 30 nm, 40 nm, 50 nm, 75 nm, 100 nm, 125 nm, 150 nm, 175 nm, 200 nm, 250 nm, 300 nm, 400 nm, 500 nm, 600 nm, 700 nm, 800 nm, 900 nm, 1 micron (μm), or more than 1 μm. Alternatively or additionally, sites of a plurality of sites of an array may have an average characteristic dimension of no more than about 1 μm, 900 nm, 800 nm, 700 nm, 600 nm, 500 nm, 400 nm, 300 nm, 250 nm, 200 nm, 175 nm, 150 nm, 125 nm, 100 nm, 75 nm, 50 nm, 40 nm, 30 nm, 20 nm, 10 nm, or less than 10 nm.

Sites of a plurality of sites may have an average site area of at least about 100 square nanometers ($nm^2$), 500 $nm^2$, 1000 $nm^2$, 2500 $nm^2$, 5000 $nm^2$, 10000 $nm^2$, 25000 $nm^2$, 50000 $nm^2$, 100000 $nm^2$, 250000 $nm^2$, 500000 $nm^2$, 1000000 $nm^2$, or more than 1000000 $nm^2$. Alternatively or additionally, sites of a plurality of sites may have an average site area of no more than about 1000000 $nm^2$, 500000 $nm^2$, 250000 $nm^2$, 100000 $nm^2$, 50000 $nm^2$, 25000 $nm^2$, 10000 $nm^2$, 5000 $nm^2$, 2500 $nm^2$, 1000 $nm^2$, 500 $nm^2$, 100 $nm^2$, or less than 100 $nm^2$.

In some cases, an array comprising a plurality of sites may be provided, in which sites of the plurality of sites comprise signal sources, as set forth herein, and in which each individual site of the sites comprising signal sources is substantially devoid of a sample analyte. In other cases, an array comprising a plurality of sites may be provided, in which sites of the plurality of sites comprise signal sources, as set forth herein, and in which each individual site of the sites comprising signal sources comprises a sample analyte. In particular cases, a signal source can be non-covalently coupled to a sample analyte. In other particular cases, a signal source can be covalently coupled to a sample analyte.

An array, as set forth herein, may be sensed by a detection device. In some cases, a detection device can comprise a magnification device, such as an atomic force microscope, an optical microscope such as a fluorescence microscope, or an electron microscope. A detection device (e.g., a magnification device) may further comprise additional components such as an objective lens, a tube lens, an aperture, a mirror, a beam-splitter, etc. A detection device may further comprise a pixel-based sensor, in which the pixel-based sensor comprises a plurality of pixels. Pixel-based sensors (e.g., CCD sensors, CMOS sensors) are commonly provided as arrays of pixels that are arranged in a gridded pattern (e.g., a rectangular grid).

A method of determining a parameter of a detector model may comprise one or more steps of: i) aligning a pixel of a plurality of pixels with a site of a plurality of sites, and ii) collecting with the pixel a signal from the site. In some cases, aligning a pixel with the site can comprise aligning a pixel set with the site. A pixel set may comprise a plurality of pixels, such as a 2×2, 3×3, 4×4, or 5×5 set of pixels. In some cases, a pixel set may comprise a non-square pixel set (e.g., a 2×3 set of pixels, a 1×3 line of pixels, etc.). In some cases, collecting with a pixel a signal from a site comprises collecting the signal with the pixel set. In some cases, a signal may be distributed over a pixel set with a homogeneous signal intensity (e.g., each pixel collecting a substantially same quantity of signals). In other cases, a signal may be distributed over a pixel set with a heterogeneous signal intensity (e.g., a central pixel accumulating a greater quantity of signals, a signal with a non-symmetrical signal distribution over the pixel set).

An image provided for a detector calibration method may comprise at least about 10, 50, 100, 200, 300, 400, 500, 1000, 5000, 10000, 50000, 100000, 500000, 1000000, or more than 1000000 detection events. Alternatively or additionally, an image provided for a detector calibration method may comprise no more than about 1000000, 500000, 100000, 50000, 10000, 5000, 1000, 500, 400, 300, 200, 100, 50, 10 or less than 10 detection events. A field-of-view of an image provided for a detector calibration method may comprise at least about 10, 50, 100, 200, 300, 400, 500, 1000, 5000, 10000, 50000, 100000, 500000, 1000000, or more than 1000000 detection events. Alternatively or additionally, a field-of-view of an image provided for a detector calibration method may comprise no more than about 1000000, 500000, 100000, 50000, 10000, 5000, 1000, 500, 400, 300, 200, 100, 50, 10 or less than 10 detection events.

An image provided for a detector calibration method may encompass a region of an array comprising at least about 10, 50, 100, 200, 300, 400, 500, 1000, 5000, 10000, 50000, 100000, 500000, 1000000, or more than 1000000 array sites. Alternatively or additionally, an image provided for a detector calibration method may encompass a region of an array comprising no more than about 1000000, 500000, 100000, 50000, 10000, 5000, 1000, 500, 400, 300, 200, 100, 50, 10 or less than 10 array sites.

A chosen field-of-view for an image of detection events may be chosen based upon a shape of a sensor or a shape or patterning of an array of sites. For example, a rectangular field-of-view (i.e., N=4) may be chosen when utilizing a rectangular pixel array, or detecting an array with a rectangular patterning of array sites. Likewise, triangular fields-of-view (i.e., N=3) may be chosen when detecting an array with a triangular or hexagonal patterning of array sites. In some cases, a circular or quasi-circular (e.g., a polygon with N of at least about 50, 100, 200, 500, 1000, or more than 1000.) field-of-view may be utilized. In other cases, a quasi-linear field-of-view (e.g., a rectangular field of view with an aspect ratio of at least 20:1, 50:1, 100:1, 500:1, 1000:1, or more than 1000:1) may be utilized. A field-of-view may be utilized with an N of at least about 3, 4, 5, 6, 7, 8, 9, 10, 11, 12, 13, 14, 15, 16, 17, 18, 19, 20, 25, 30, 35, 40, 45, 50, 100, 200, 500, 1000, or more than 1000. Alternatively or additionally, a field-of-view may be utilized with an N of no more than about 1000, 500, 200, 100, 50, 45, 40, 35, 30, 25, 20, 19, 18, 17, 16, 15, 14, 13, 12, 11, 10, 9, 8, 7, 6, 5, 4, or less than 4.

Figure 5B:
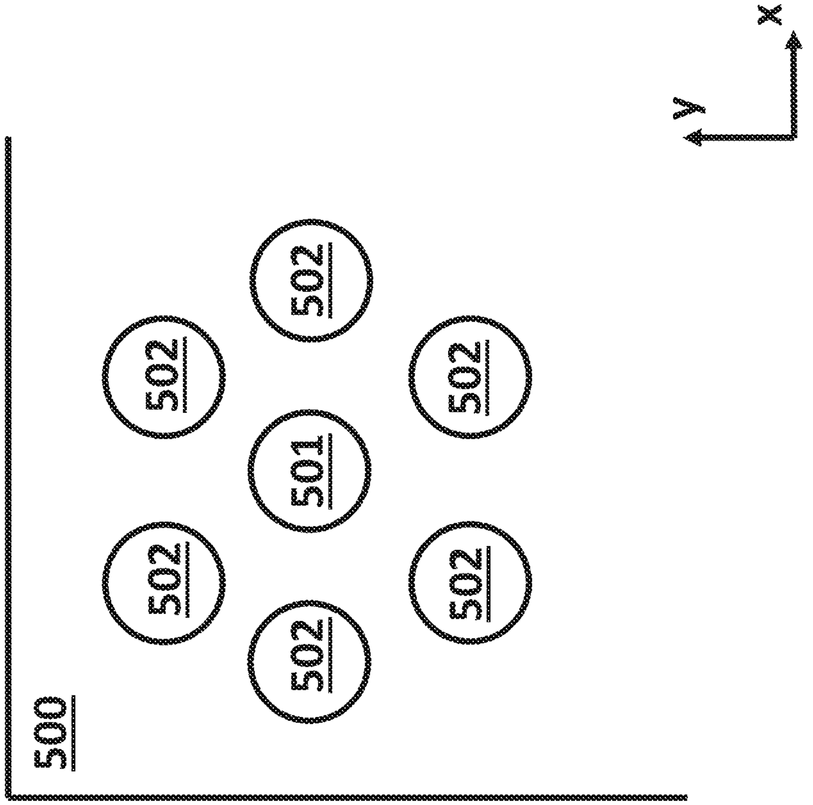
FIGS. 5A and 5B depict aspects of array site contiguity, in accordance with some embodiments.
Figure 5A:
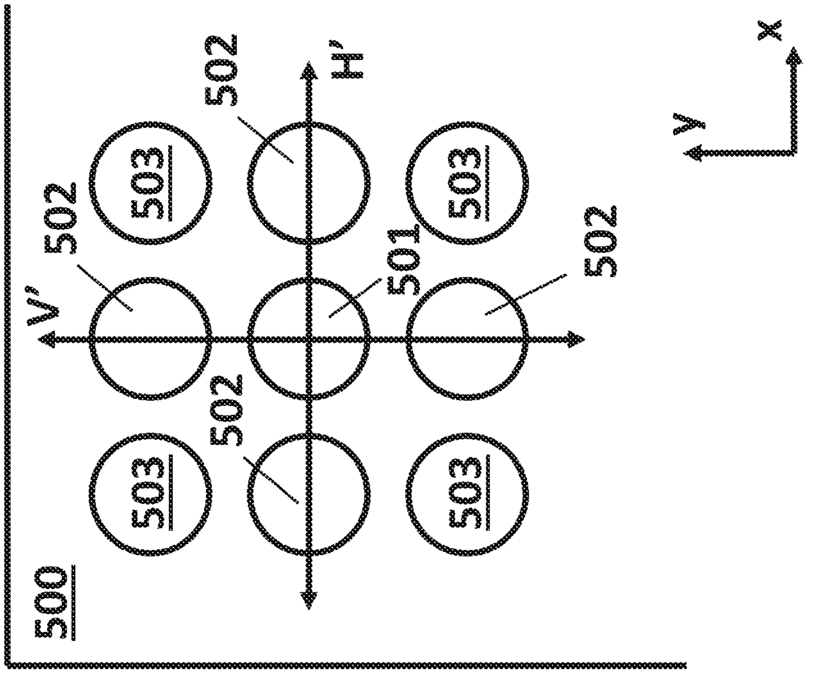

An image of an array or a region thereof may be formed by detecting signals from signal sources at array sites. An image of an array or a region, in which the array sites have a signal source occupancy of less than 100%, can produce an image containing a combination of detection events at addresses corresponding to signal sources at array sites, and vacancies at addresses corresponding to array sites without signal sources. An image of an array or a region thereof may comprise two or more detection events that are spatially contiguous. An image of an array or a region thereof may comprise two or more vacancies that are spatially contiguous. Contiguity with respect to a given array site, detection event, or vacancy can refer to array sites, detection events, or vacancies that are i) adjacent to the given array site, detection event, or vacancy, and ii) proximal to the given array site, detection event, or vacancy. FIGS. 5A and 5B illustrate aspects of contiguity with respect to rectangular and hexagonal patterned array sites, respectively. FIG. 5A depicts an array on a solid support 500 with a plurality of array sites in a rectangular pattern. Relative to array site 501, array sites 502 and 503 are all adjacent to array site 501 (i.e., a straight line can be drawn from site 501 to any of sites 502 or 503 without passing through another array site). However, array sites 502 are proximal to array site 501, while array sites 503 are distal to array site 501. Accordingly, array sites 502 may be considered contiguous to array site 501, while array sites 503 may be considered non-contiguous. FIG. 5B depicts an array on a solid support 500 with a plurality of array sites in a hexagonal pattern. Relative to array site 501, array sites 502 are all adjacent to array site 501. Additionally, array sites 502 are all equally proximal to array site 501. Accordingly, all array sites 502 of the hexagonal pattern of array sites may be considered contiguous to array site 501.

An array, as set forth herein, or an image thereof may comprise a first array site, detection event, or vacancy of a plurality of array sites, detection events, or vacancies and a second array site, detection event, or vacancy of a plurality of array sites, detection events, or vacancies that are spatially contiguous. An array, as set forth herein, or an image thereof may comprise a first array site, detection event, or vacancy of a plurality of array sites, detection events, or vacancies and a second array site, detection event, or vacancy of a plurality of array sites, detection events, or vacancies that are spatially non-contiguous. An array, as set forth herein, or an image thereof may comprise an array site, detection event, or vacancy that is spatially non-contiguous with all adjacent array sites, detection events, or vacancies.

Figure 6B:
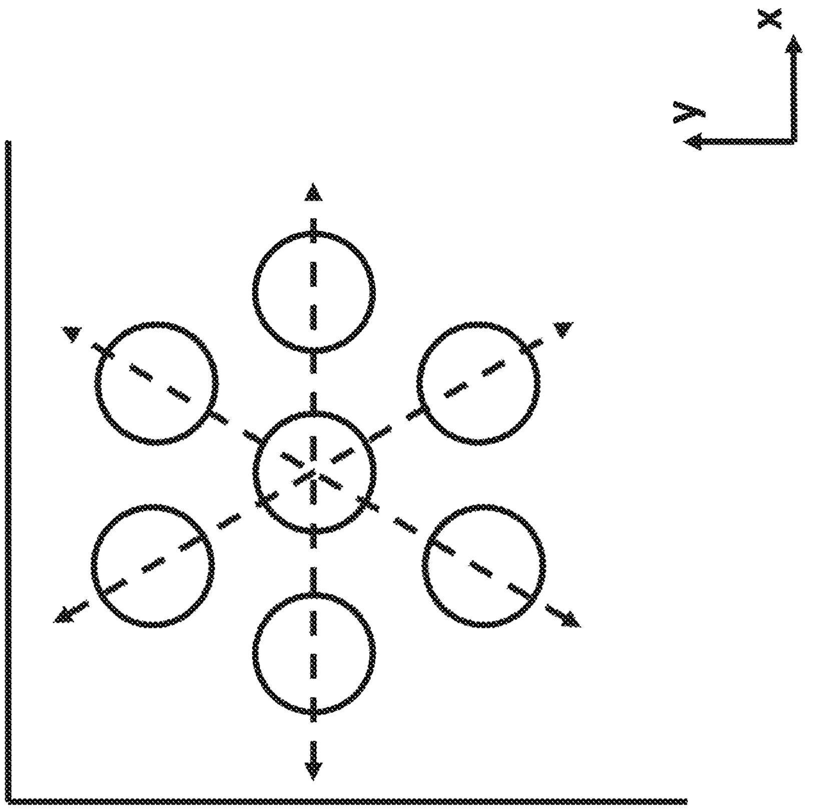
FIGS. 6A and 6B display aspects of array site gridding, in accordance with some embodiments.
Figure 6A:
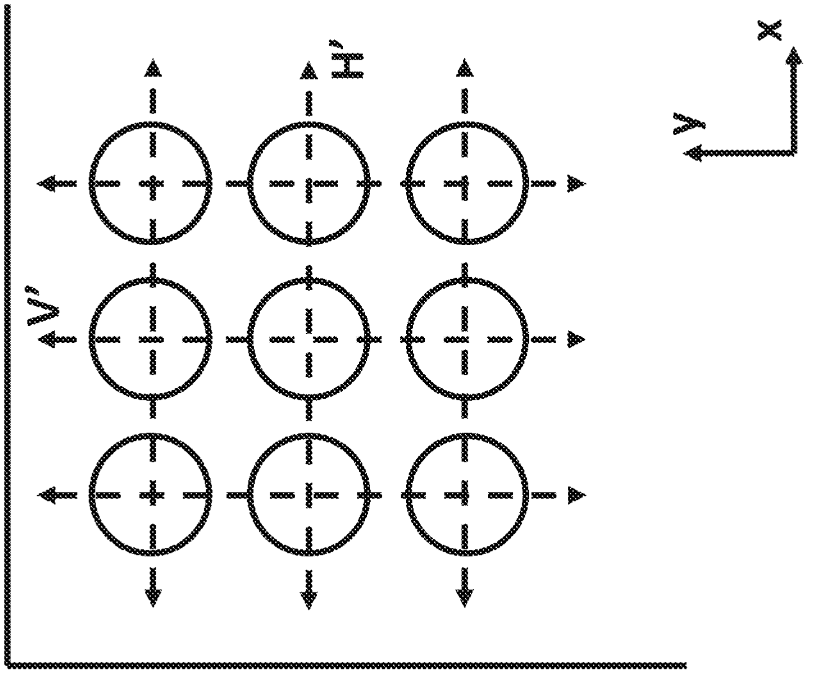

A method of determining a parameter of a detector model may comprise a step of identifying a pattern of detection events in a detected image of an array. Identifying a pattern of detection events in a detected image of an array may further comprise a step of providing a grid to the image of the array. A grid may be provided that matches a known or anticipated patterning of array sites of the array. For example, with respect to a given array site, contiguous array sites of a rectangular-gridded array typically lie on or near orthogonal axes that are aligned through centerpoints of proximal array sites relative to the given array site. Accordingly, an image of a rectangular array may be gridded with a grid whose lines are substantially parallel to the orthogonal axes of the given array site. FIG. 6A depicts an example of a gridding for a cluster of array sites with a rectangular patterning. Likewise, with respect to a given array site, contiguous array sites of a hexagonal-gridded array typically lie on or near three axes that are aligned through centerpoints of proximal array sites relative to the given array site. FIG. 6B depicts an example of gridding for a cluster of array sites with a hexagonal patterning.

Figure 7:
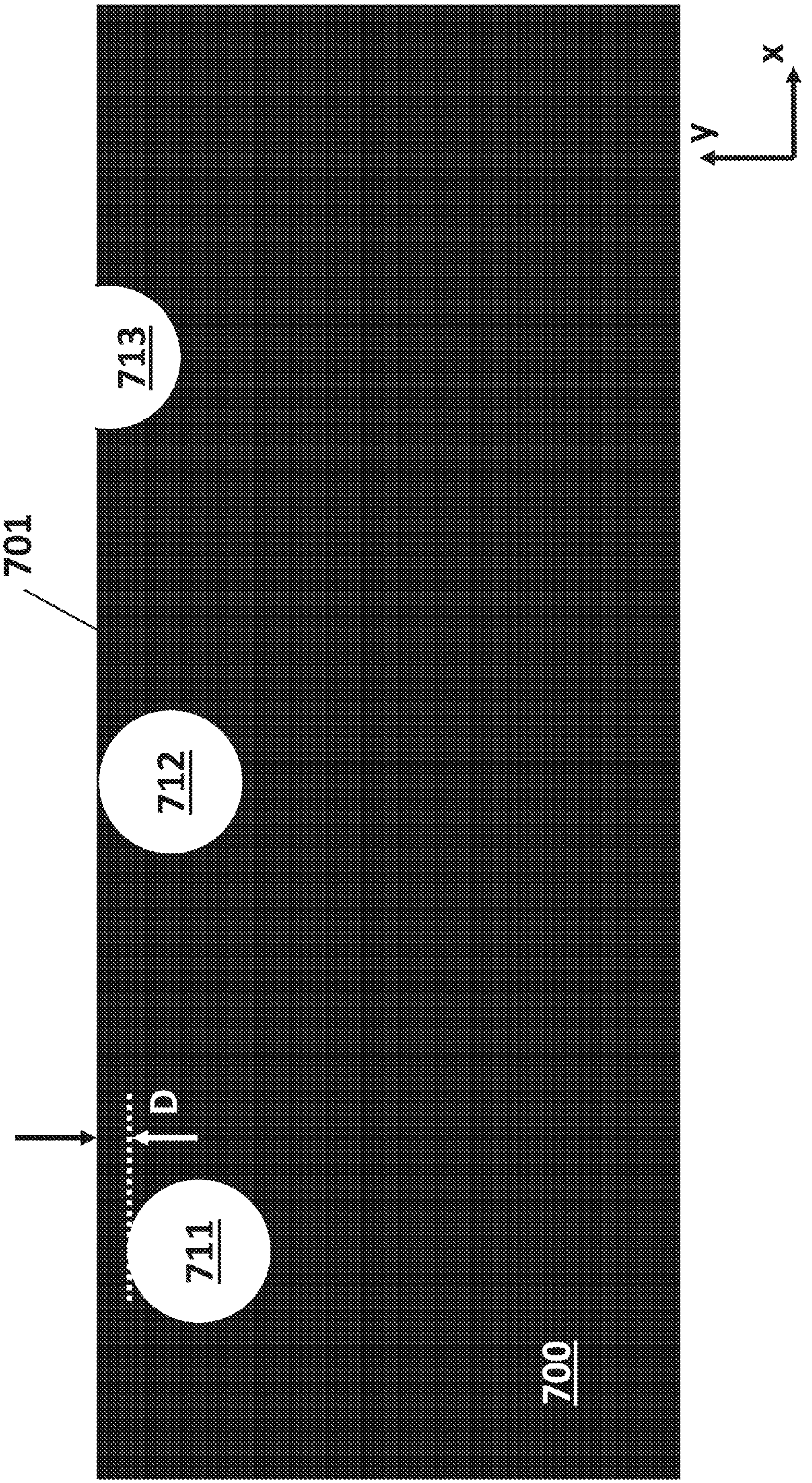
FIG. 7 shows aspects of detection event adjacency in image field-of-views, in accordance with some embodiments.

A useful image for determining a parameter of a detector model may comprise a pattern of detection events, in which the pattern of detection events comprises a set of detection events, in which i) each detection event of the pattern of detection events is contiguous to at least one other detection event of the set of detection events, and ii) each individual side of an image field-of-view having N sides is contacted by at least one detection event of the set of detection events. A detection event may be considered to contact a side of a field-of-view of an image if the detection event is adjacent to a boundary that defines the side, is in contact with the boundary that defines the side, or overlaps with the boundary that defines the side. FIG. 7 illustrates examples of detection events that may be considered to be contacted to a side of a field-of-view 700 of an image. A field-of-view or a portion thereof 700 is shown with a side that is defined by the linear boundary 701. Detection events 711, 712, and 713 are contacted to the side. Detection event 711 is adjacent to the side. A gap of distance D exists between the edge of the detection event and the boundary 711. The detection event may be considered contacted to the boundary if the gap D is less than an average diameter of a detection event. Detection event 712 is contacted to boundary 701 such that there is a single point of contact between the boundary 701 and the edge of the detection event 712 (i.e., no gap D or overlap between the detection event 712 and the boundary 701). Detection event 713 overlaps the boundary 701 such that only part of the detection event is imaged within the field-of-view 700. Detection event 713 may be considered contacted if a sufficient amount of signal is detected within the boundaries of the field-of-view.

FIGS. 4A-4C provide examples of patterns of contiguous signals for an image of an array with a rectangular array site patterning. A useful pattern of signals on an image may be defined by a pathway that can be traced between contiguous detection events along lines that define a gridding of the image. A pathway may include one or more branches. For example, FIG. 4C depicts a pathway connecting contiguous detection events of an image that begins near the upper left corner of the field-of-view and continues through the lower right corner of the field-of-view of the image. There are two smaller branches of the pathway that connect to the longest continuous branch.

In some cases, identifying within a field of view having N sides a pattern of detection events of an image may further comprises realigning the field of view to include a differing set of detection events until the pattern of detection events is identified. FIGS. 4B and 4C illustrate an example of adjusting a field-of-view to identify a useful pattern of detection events. In some cases, a method may comprise one or more steps of: i) defining a field-of-view that is smaller than an area of an image, ii) aligning the field-of-view to a grid pattern of the image, and ii) iterating through positions of the field-of-view until a useful pattern of detection events is identified.

A useful pattern of detection events may have a site occupancy (on a fractional basis) of at least about 0.1, 0.2, 0.3, 0.4, 0.45, 0.5, 0.55, 0.6, 0.65, 0.7, 0.75, 0.8, 0.85, 0.9, 0.95, 0.99, or more than 0.99. Alternatively or additionally, a useful pattern of detection events may have a site occupancy (on a fractional basis) of no more than about 0.99, 0.95, 0.9, 0.85, 0.8, 0.75, 0.7, 0.65, 0.6, 0.55, 0.5, 0.45, 0.4, 0.3, 0.2, 0.1, or less than 0.1. In some cases, a minimum site occupancy for detection events may be predicted by a mathematical model such as percolation theory. An image of an array may contain a useful pattern of detection events if the image has a site occupancy (on a fractional basis) of at least about 0.1, 0.2, 0.3, 0.4, 0.45, 0.5, 0.55, 0.6, 0.65, 0.7, 0.75, 0.8, 0.85, 0.9, 0.95, 0.99, or more than 0.99. Alternatively or additionally, an image of an array may contain a useful pattern of detection events if the image has a site occupancy (on a fractional basis) of no more than about 0.99, 0.95, 0.9, 0.85, 0.8, 0.75, 0.7, 0.65, 0.6, 0.55, 0.5, 0.45, 0.4, 0.3, 0.2, 0.1, or less than 0.1. In some cases, a minimum site occupancy for detection events in an image may be predicted by a mathematical model such as percolation theory.

In some cases, identifying within a field of view having N sides a pattern of detection events of an image can further comprise providing the image to a processor comprising an image analysis process. An image analysis process may perform one or more steps of: i) receiving one or more images of an array, ii) combining two or more images of the array into a larger image, iii) identifying detection events and/or vacancies of an image of the array, iv) aligning a grid to an image of the array, v) determining a field-of-view of the image of the array, vi) iterating through positions of the field-of-view, vii) identifying a location of the field of view that contains a useful pattern of detection events, viii) receiving one or more parameters regarding detector extrinsic properties, detector intrinsic properties, or detector distortion properties, and ix) based upon one or more parameters regarding detector extrinsic properties, detector intrinsic properties, or detector distortion properties, determining a parameter of a detector model.

In some cases, a method of determining a parameter of a detector model may comprise selecting a field of view of an image from a plurality of fields of view. Numerous fields-of-view may be conceivable by varying the fields-of-view with respect to one or more of: field size, number of sides (N), number of array sites or detection events encompassed, aspect ratio, and degree of symmetry (e.g., shape skew or other measure of asymmetry).

A detector model (e.g., a direct linear transform model or a variant thereof) may comprise one or more matrices that transform image address data into real-world address data. For example, one-dimensional (1-D) image data may be converted into 2-D data by a detector model, or 2-D data may be converted into 3-D data by a detector model. A detector model may comprise 1, 2, 3, or more than 3 unique matrices that compose the detector model (e.g., an intrinsic matrix, extrinsic matrix, and distortion matrix). Each matrix of a detector model may comprise one or more parameters. For example, a model for converting 1-D image data to 2-D data may comprise a 3×2 matrix (i.e., a four parameter matrix). Likewise, a model for converting 2-D image data to 3-D data may comprise a 4×3 matrix (i.e., a nine parameter matrix). A method set forth herein may comprise deriving a parameter of a matrix of a detector model. A method set forth herein may comprise deriving two or more parameters of a matrix of a detector model. A method set forth herein may comprise deriving each parameter of a matrix of a detector model.

Methods for determining one or more parameters of a detector model are known in the art. A parameter or a matrix of parameters may be solved by a linear or non-linear optimization solver. Alternatively, extrinsic parameters may be determined through a Perspective-n-Point method (where n is a number of points). For example, P3P, a version of PnP which utilizes exactly 3 points, is a problem which reduces to a system of two quadratic equations which can be solved directly. PnP can be paired with an outlier detection algorithm called RANSAC (RANdom SAmple Consensus). This method comprises randomly picking points from a set, using them to build a camera model, then scoring the model's reproduction error using all of the other points. After performing sufficient iterations and selecting the lowest score, a camera model can be determined. In some cases, a method of determining a parameter of a detector model may comprise a bundle adjustment process to minimize reprojection error.

Determining a parameter of a detector model may require knowledge of the real-world (e.g., 2-D, 3-D) locations of array sites or signal sources that are captured as vacancies or detection events during array imaging. In some cases, real-world locations of array sites and/or signal sources can be provided by an a priori method. For example, array sites may be designed with a chosen pitch and site dimension, and manufactured to such a specification within an acceptable tolerance. Accordingly, locations of detection events in an image of such an array can be inferred to have a spacing of about the specified site pitch. Random errors of site location due to manufacturing variability or manufacturing error may be accounted for during detector model parameterization, for example through a bundle adjustment method.

Alternatively, real-world locations of array sites and/or signal sources may be proved by an a posteriori method. A method may comprise a step of providing unique addresses for each individual site of a plurality of sites. Providing unique addresses for each individual site of a plurality of sites may further comprise identifying a signal from a signal source at each unique address for each individual site of the plurality of sites. For example, array site locations may be mapped prior to depositing signal sources at array sites. Mapping may be accomplished by a technique such as scanning electron microscopy. Alternatively, mapping may be accomplished by depositing fluorescent or luminescent moieties at each array site and detecting signals from each individual array site.

Figure 8:
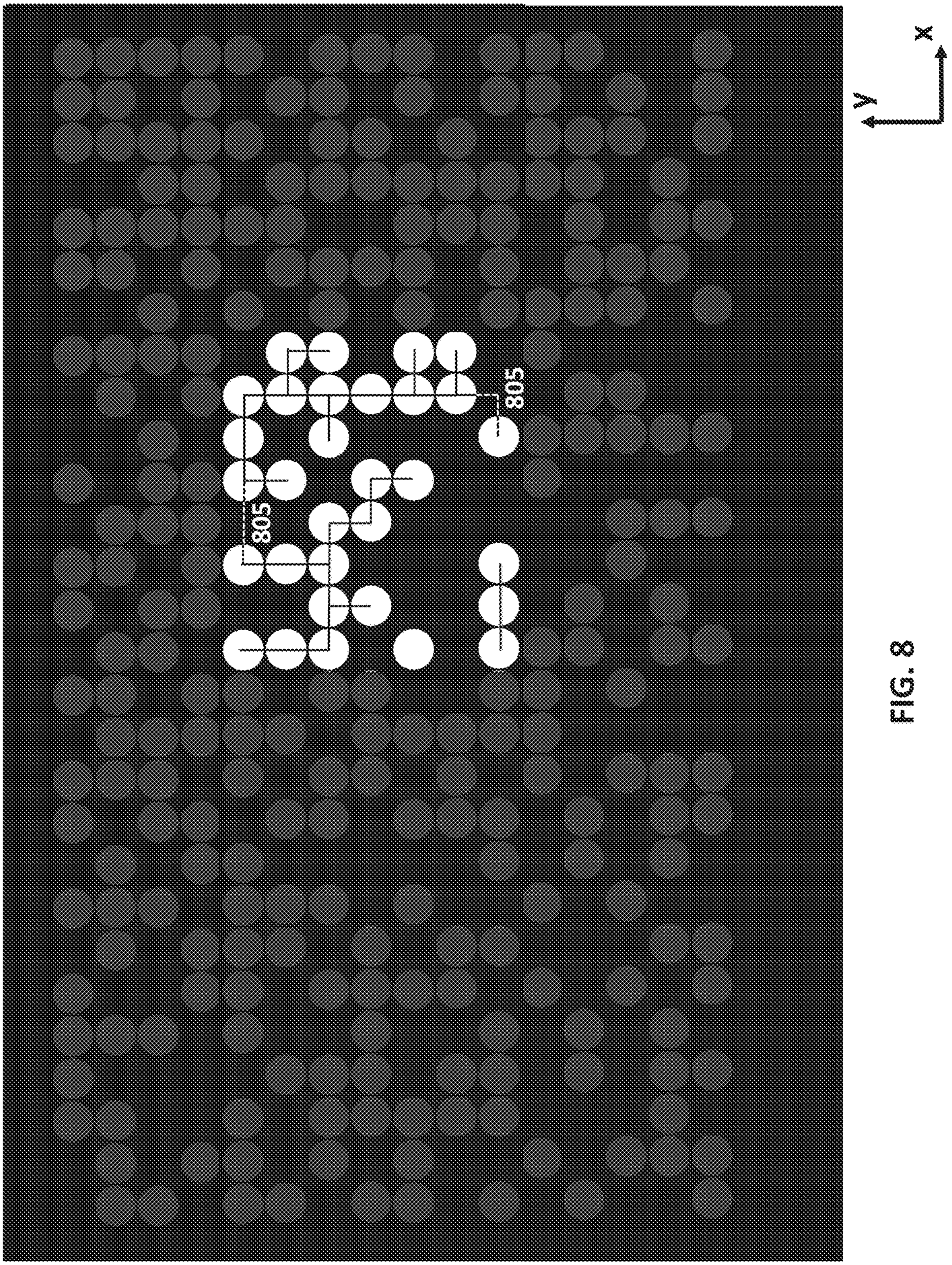
FIG. 8 illustrates a graph of detection events that passes through at least one vacancy, in accordance with some embodiments.

In some cases, a useful pattern of detection events in an image for a method set forth herein can be spatially non-contiguous. In other words, a pattern of detection events may still be useful if there is not a continuous pathway between contiguous detection events, provided the pattern of detection events contacts each of N sides of a field-of-view. One approach can be to specify a sub-critical detection event occupancy for a pattern of detection events. Provided the occupancy of a pattern of detection events exceeds the sub-critical detection event occupancy, the pattern of detection events may still be useful for a method set forth herein. For example, FIG. 4B depicts a pattern of detection events that does not have a continuous pathway through contiguous detection events that contact all 4 sides of the field-of-view. However, a continuous pathway can be formed by passing through gaps containing only a single vacancy. FIG. 8 depicts an example pathway that can form by passing through vacancies 805. Patterns of detection events comprising larger gaps (e.g., 2, 3, 4, 5, or more than 5 vacancies) of vacancies may be utilized for a method set forth herein. If a large quantity of detection events and/or a large field-of-view is utilized, utilizing a non-contiguous pathway may introduce less reprojection error during parameter estimation.

Alternatively, multiplexing signal sources may facilitate detector calibration. This approach may be advantageous in systems with two or more detectors (e.g., a two-camera optical system). In some cases, an array comprising signal sources may be provided, in which the signal sources comprise a first plurality of signal sources and a second plurality of signal sources, wherein a first emission wavelength of the first plurality of signal sources differs from a second emission wavelength of the second plurality of signal sources. A method of determining a parameter of a detector model may comprise detecting on a detection device an image comprising detection events of the signal sources, in which the detecting comprises the steps of: i) detecting on the detection device a first image comprising detection events of the first plurality of signal sources, ii) detecting on the detection device a second image comprising detection events of the second plurality of signal sources, and iii) combining the detection events of the first image and the detection events of the second image to form a composite image comprising detection events from the signal sources. In some cases, the first image comprising detection events of the first plurality of signal sources or the second image comprising detection events may not contain a useful pattern of detection events. In some cases, the first image comprising detection events of the first plurality of signal sources and the second image comprising detection events may not contain a useful pattern of detection events. In some cases, the method may further comprise determining by a method set forth herein a parameter of a detector model for a first detector or a parameter of a detector model for a second detector based upon the first image, the second image, or the composite image.

Figure 9:
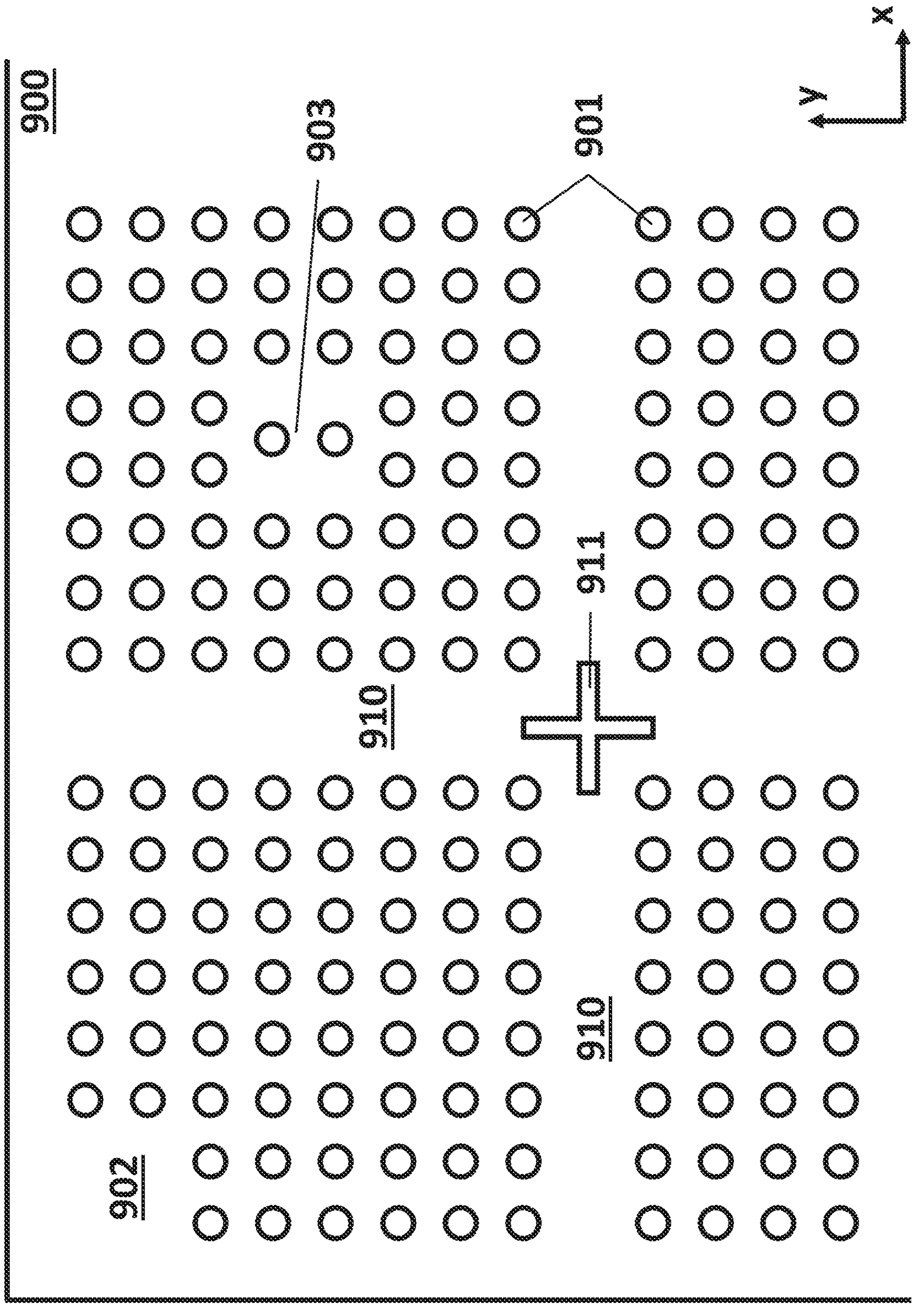
FIG. 9 depicts array features that provide reference points for image alignment, in accordance with some embodiments.

It may be advantageous to provide a reference address on an array that facilitates alignment of detector data from multiple detectors, or facilitates alignment of detector data collected from a single detector at differing times (e.g., comparing pre-calibration and post-calibration images). A reference address may be provided by providing an array with a fiducial element (e.g., an etched, formed, or deposited feature). For optical detection, it may be advantageous to provide a reflective coating on the fiducial feature to increase light collection from the fiducial feature. A fiducial feature may be provided in an interstitial region adjacent to one or more array sites. A reference address may also be provided by a landmarking feature. A landmarking feature may be provided by, for example, a disruption in patterning or symmetry of array sites. FIG. 9 illustrates examples of array features that may be useful for providing a reference address for aligning images. A portion of a solid support 900 comprising an array of sites 901 is shown. The sites 901 are arranged into subarrays separated by interstitial regions 910 with a rectangular patterning of the sites 901. A fiducial marker 911 is provided in an interstitial region 910 that provides a reference address adjacent to the corner of the four subarrays. The upper left subarray comprising a region 902 with an absence of array sites, thereby providing a landmarking feature that may facilitate alignment of images of the subarray. The upper right subarray comprises a region 903 with a disruption of the patterning symmetry, thereby providing a landmarking feature that may facilitate alignment of images of the subarray. A method set forth herein may comprise a step of aligning a first image and a second image with respect to a common reference address.

A detection device can comprise a first detector and a second detector. A detection device may be provided for various purposes, such as: 1) obtaining two frames of reference for the same array or features thereof, 2) performing multiplexed sensing (e.g., sensing of two or more signal sources with differing emission wavelengths), and 3) obtaining two or more types of physical measurements (e.g., electron scattering and photon emission).

In some cases, a method may comprise detecting on a detection device an image comprising detection events from signal sources, wherein the detecting comprises: i) detecting on a first detector a first plurality of signals from the signal sources, thereby forming a first image, and ii) detecting on a second detector a second plurality of signals from the signal sources, thereby forming a second image. A method may further comprise: i) based upon the first image, determining a first parameter for a detector model of the first detector, and ii) based upon the second image, determining a second parameter for a detector model of the second detector.

In some cases, a first image from a first detector may comprise a first plurality of detection events and a second image from a second detector may comprise a second plurality of detection events, in which the first plurality of detection events and the second plurality of detection events have a substantially similar spatial distribution of detection events. For example, signal sources comprising two or more fluorophores (e.g., multi-color fluorescently-labeled polymer nanoparticles such as ThermoFisher TetraSpeck beads) may be deposited at array sites with a random spatial distribution. Images of an array containing the signal sources would be expected to display near-identical spatial distributions of detection events.

Alternatively, an array may be provided with a first plurality of signal sources and a second plurality of signal sources, wherein the first plurality of signals sources has a first spatial distribution and the second plurality of signal sources has a second spatial distribution, wherein the first spatial distribution differs from the second spatial distribution. In some cases, signal sources of a first plurality of signal sources may have a first emission wavelength, signal sources of a second plurality of signal sources may have a second emission wavelength, in which the first emission wavelength differs from the second emission wavelength. Accordingly, a first image of the first plurality of signal sources may comprise a first spatial distribution of detection events, and a second image of the second plurality of signal sources would comprise a second spatial distribution of detection events, in which the first spatial distribution of detection events differs from the second spatial distribution of detection events.

An array that is utilized to calibrate a first detection device may be further utilized to calibrate a second detection device. Once a useful pattern of detection events is identified in an image of an array, the corresponding spatial addresses on the array containing the array sites of the signal sources that produce the pattern of detection events can be more rapidly identified in subsequent detector calibration processes. Accordingly, a characterized array containing a plurality of signal sources may become a reference array for calibrating additional detectors.

In another aspect, provided herein is a method of calibrating a detection device, comprising: a) providing to a first detection device an array comprising a plurality of sites, wherein each individual site of the plurality of sites is optically resolvable, and wherein sites of the plurality of sites comprise signal sources, b) identifying on a first image of the array a spatial pattern of detection events with the first detection device, c) based upon the spatial pattern of detection events, determining a parameter of a first detector model, d) after determining the parameter of the first detector model, identifying in a second image of the array the pattern of detection events with a second detection device, and e) based upon the pattern of detection events, determining a parameter of a second detector model.

In some cases, a first detector model of a first detection device may differ from a second detector model of a second detection device. In some cases, a parameter of a first detector model of a first detection device may differ from a parameter of a second detector model of a second detection device. In some cases, a first detector model may differ from the second detector model with respect to an intrinsic parameter. In some cases, a first detector model may differ from the second detector model with respect to an extrinsic parameter. In some cases, a first detector model may differ from the second detector model with respect to an optical distortion parameter.

Configurations of arrays that may be useful for calibration of a detection device are put forth herein. In some cases, an array, as set forth herein, may be configured exclusively for the implementation of a method set forth herein (e.g., parameterization of a detector model). In other cases, an array, as set forth herein, may be further utilized to perform an assay or other interrogation of entities bound to the array. Arrays may be utilized, for example, to perform polypeptide assays (e.g., peptide sequencing, peptide identification, peptide characterization), nucleic acid assays (e.g., nucleic acid sequencing, nucleic acid identification), polysaccharide assays (e.g., polysaccharide sequencing, polysaccharide identification), and other nanoparticle characterizations. Methods of utilizing arrays for certain polypeptide assays are described herein in the section titled "Polypeptide Assays." The skilled person will readily recognize additional applications for arrays and methods set forth herein.

Figure 16:
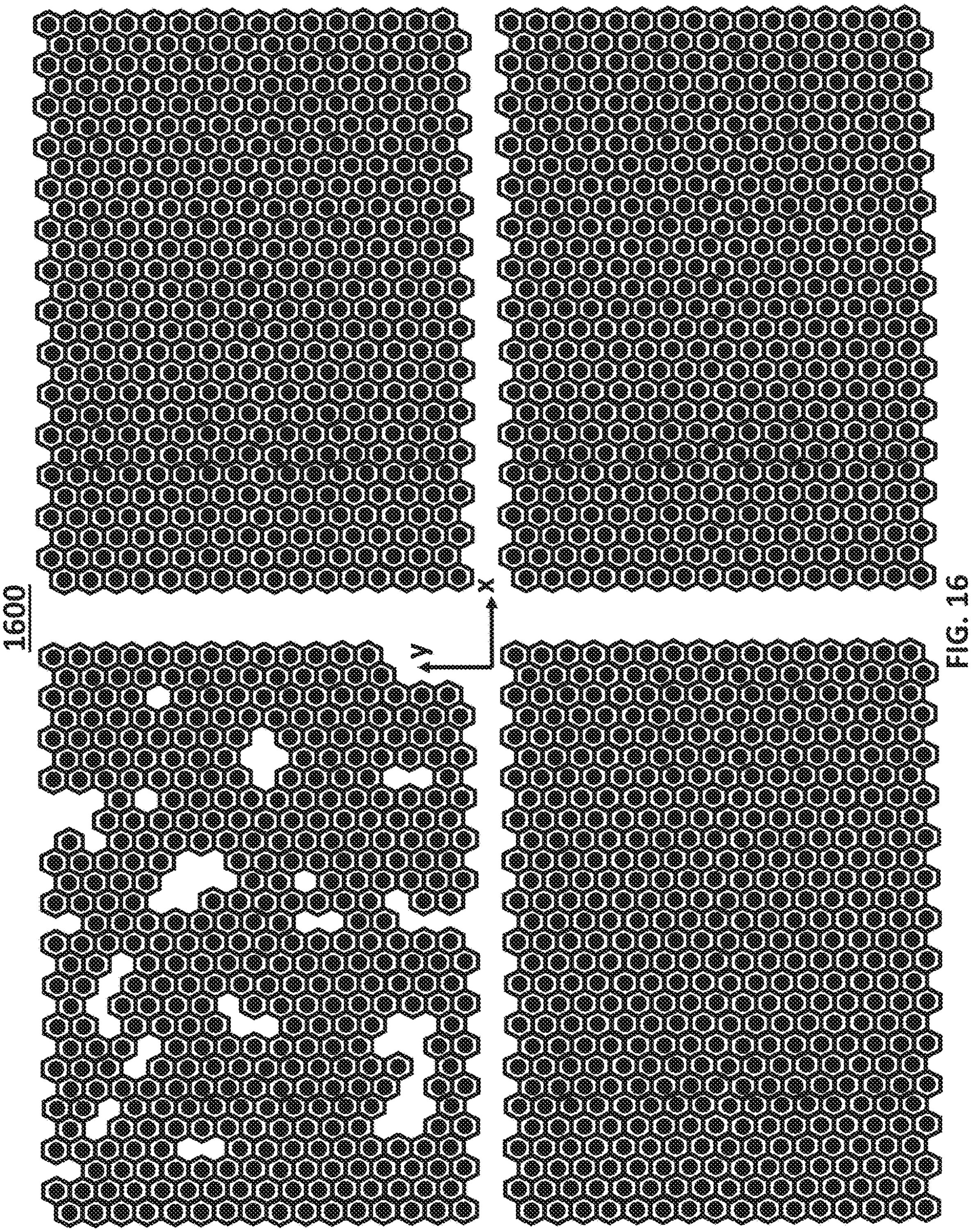
FIG. 16 illustrates a portion of a solid support comprising a calibration target and subarrays containing analyte-binding sites, in accordance with some embodiments.

An array may be provided on a solid support, in which the array comprises a first plurality of sites and a second plurality of sites, in which the first plurality of sites is configured to attach analytes, and in which the second plurality of sites is configured to attach detectable particles that may be utilized for calibrating a detection device. In some cases, an array may be provided on a solid support, in which the array comprises a first plurality of sites and a second plurality of sites, in which the first plurality of sites is configured to attach analytes, in which the second plurality of sites is configured to attach detectable particles that may be utilized for calibrating a detection device, in which the first plurality of sites and the second plurality of sites are confined to non-overlapping regions of a surface of the solid support. For example, FIG. 16 illustrates a top-down view of a surface of a solid support 1600 containing four subarrays of sites arranged in hexagonal patterns, in which the upper left subarray is configured for a method of calibrating a detection device, as set forth herein, and in which the other three subarrays are configured to attach to a plurality of analytes and/or fiducial elements.

Alternatively, an array may be provided on a solid support, in which the array comprises a first plurality of sites and a second plurality of sites, in which the first plurality of sites is configured to attach analytes, in which the second plurality of sites is configured to attach detectable particles that may be utilized for calibrating a detection device, in which the first plurality of sites and the second plurality of sites disposed within the same region of a surface of the solid support. For example, an array may be formed by randomly depositing analytes or fiducial elements (e.g., fluorescent beads or particles) at sites of the array, in which a first spatially random set of sites contains the analytes and in which a second spatially random set of sites contains the fiducial elements.

In a particularly useful configuration, a plurality of sites may be formed on a region of a solid support, in which the plurality of sites is distributed in a spatially unique or random pattern. The upper left subarray depicted in FIG. 16 depicts a region with a unique pattern of sites with randomly distributed vacancies (i.e., addresses corresponding to centerpoints for the hexagonal grid pattern that do not contain a site). The sites of the region of the solid support may be configured to attach to particles that facilitate a method of calibrating a detection device, as set forth herein, such as fiducial elements (e.g., fluorescent beads or particles), or fluorescently-labeled anchoring moieties. Such a region may be formed by a lithographic method such as photolithography, in which an irregular pattern of wells is formed in a photoresist, thereby producing the pattern of sites and vacancies when the array sites are formed after lithography. It may be useful to provide a pre-patterned region of an array for detector calibration as the spatial location of each site of the pattern of sites may be known before the array is provided to a detection device.

In some cases, a method may comprise one or more steps of: i) forming on a region of a solid support a first plurality of sites, in which individual sites of a first set of the first plurality of sites are located at regular or patterned addresses on the solid support, and in which at least one site of a second set of the first plurality of sites is at an irregular address or at least one address contains an absence of a site; ii) attaching to each individual site of the first plurality of sites a detectable moiety (e.g., a fluorescent bead or particle); iii) detecting on a first detection device signals from the detectable moieties attached to the plurality of sites, in which the first detection device has a calibrated detector model; iv) based upon the detected signals, determining a three-dimensional location of each detected signal, thereby forming a spatial map of the region of the solid support; v) attaching to a second plurality of sites of the solid support a plurality of analytes; vi) providing the solid support containing the first region to a second detection device, in which the second detection device does not have a calibrated detector model; vii) providing to the second detection device the spatial map of the region of the solid support; viii) detecting on the second detection device signals from the detectable moieties attached to the plurality of sites; and ix) based upon the detected signals from the region of the solid support and the spatial map of the region of the solid support, determining one or more parameters of a detector model of the second detection device.

Alternatively, a calibration target may be provided to a detection device comprising a detector to facilitate the determining of a detector model for the detector. In some cases, a calibration target may comprise a solid support containing one or more regions that are configured to perform a method of detector calibration, as set forth herein, in which the solid support does not comprise sites configured to attach analytes. In other cases, a calibration target may comprise a solid support containing one or more regions that are configured to perform a method of detector calibration, as set forth herein, in which the solid support comprises sites configured to attach analytes. Accordingly, a method may comprise the steps of: i) providing a calibration target to a detection device comprising a detector, in which the calibration target comprises a region that is configured to facilitate determination of a detector model for the detector; ii) detecting on the detector signals from the region of the calibration target; iii) based upon the signals from the region of the calibration target, determining the detector model of the detector; and iv) performing an optical process on the detection device, in which the optical process, as set forth herein, is performed on an array, as set forth herein, and in which the optical process utilizes the detector model. In some cases, the calibration target may be utilized before performing the optical process. In other cases, the calibration target may be utilized after performing the optical process.

In an aspect, a method may comprise: i) providing to a first detection device containing a first detector a calibration target, as set forth herein; ii) after providing the calibration target to the first detection device, determining one or more parameters of a first detector model for the first detector utilizing the calibration target; iii) providing to a second detection device containing a second detector the calibration target; ii) after providing the calibration target to the second detection device, determining one or more parameters of a second detector model for the second detector utilizing the calibration target, in which the one or more parameters of the first detector model differ from the one or more parameters of the second detector model. The method may further comprise performing a first optical process, as set forth herein, on the first detection device, and performing a second optical process, as set forth herein, on the second detection device. In some cases, the first optical process may be the same as the second optical process. In other cases, the first optical process may differ from the second optical process. In some cases, the first optical process may comprise detecting signals from sites (e.g., signals from binding reagents coupled to analytes) on a first array of analytes, and the second optical process may comprise detecting signals from sites on a second array of analytes.

In an aspect, provided herein is a method, comprising: a) providing to an optical detection system comprising a detector: i) a first array of sites, in which each individual site of the first array of sites comprises an individual optically-detectable moiety, in which each individual site of the first array of sites is optically resolvable from each other site of the first array of sites, in which a first subregion of the first array of sites has a signal occupancy of at least 50%, and in which a second subregion of the first array of sites has a signal occupancy of no more than 10%, and ii) a second array of sites, in which each individual site of the second array of sites is optically resolvable from each other site of the second array of sites, in which each individual site of the second array of sites comprises one and only one individual analyte of a plurality of analytes immobilized to the second array of sites, b) detecting a first spatial arrangement of signals from optically-detectable moieties of the first subregion of the first array of sites, c) based upon the first spatial arrangement of signals from the first subregion of the first array of sites, determining a parameter of a detector model of the detector, d) after determining the parameter of the detector model, detecting a second spatial arrangement of signals from a first subregion of the second array of sites, and detecting a third spatial arrangement of signals from a second subregion of the second array of sites, and e) registering a signal of the second spatial arrangement of signals to a signal of the third spatial arrangement of signals, wherein the signal of the second spatial arrangement of signals and the signal of the third spatial arrangement of signals are emitted at a same site of the second array of sites.

A subregion of an array of sites may comprise a portion of an array of sites detected by a detector of an optical detection system at a given magnification. Detection of a subregion of an array of sites may comprise forming an image of the subregion of the array of sites, in which the image contains a spatial arrangement of signals from optically-detectable moieties at occupied sites of the subregion. Accordingly, a subregion of an array of sites may comprise a field-of-view of an image formed by the detector.

An array of sites may be partitioned into subarrays, in which each individual subarray contains a subset of sites of the array of sites. A first subarray and a second subarray of an array of sites may be equally sized, for example with respect to surface area or footprint on a solid support, edge or boundary length of one or more sides of the first and second subarrays, or total quantity of optically-resolvable addresses for each of the first and second subarrays. A subregion of an array of sites may comprise a subarray. A subregion of an array of sites may comprise one and only one subarray. A subregion of an array of sites may comprise a plurality of subarrays. A subregion of an array of sites may comprise a subarray and a portion of at least one other subarray of a plurality of subarrays.

A method may comprise the steps of: i) detecting signals from optically-detectable moieties of a first subregion of an array of sites, and ii) detecting signals from optically-detectable moieties of a second subregion of an array of sites. In some cases, the first subregion and the second subregion may contain no sites common to both subregions (e.g., a field-of-view of the first subregion does not overlap with a field-of-view of the second subregion). In other cases, the first subregion and the second subregion may contain at least one site common to both subregions (e.g., a field-of-view of the first subregion at least partially overlaps with a field-of-view of the second subregion). In particular cases, the first subregion may comprise a first subarray, and the second subregion may comprise at least a portion of the first subarray (e.g., at least one site of the first subarray). Detecting a subarray or a portion thereof in two or more differing subregions or fields-of-view may be advantageous for optical detection systems having some amount of optical aberration. When spatial arrangement of signals from a subarray are properly spatially-corrected by a detector model to account for the optical aberration, the spatial arrangement of signals should be substantially identical in each unique field-of-view (i.e., sites properly register between each unique field-of-view).

A method may comprise a step of spatially correcting a spatial arrangement of signals detected by a detector of an optical detection system. Spatial correction of a spatial arrangement of signals may comprise transforming a two-dimensional spatial arrangement of signals into a three-dimensional spatial arrangement of signals utilizing a detector model (e.g., a direct linear transform model). A method can further comprise forming a spatially-corrected image of the spatial arrangement of signals by projecting the signals of the three-dimensional spatial arrangement of signals onto an imaginary two-dimensional plane. Spatial correction of a two-dimensional spatial arrangement of signals may produce a spatially-corrected two-dimensional spatial arrangement of signals, in which one or more signals of the spatial arrangement of signals are shifted with respect to one or both dimensions (e.g., shifted with respect to an x-axis and/or y-axis).

Figure 12A:
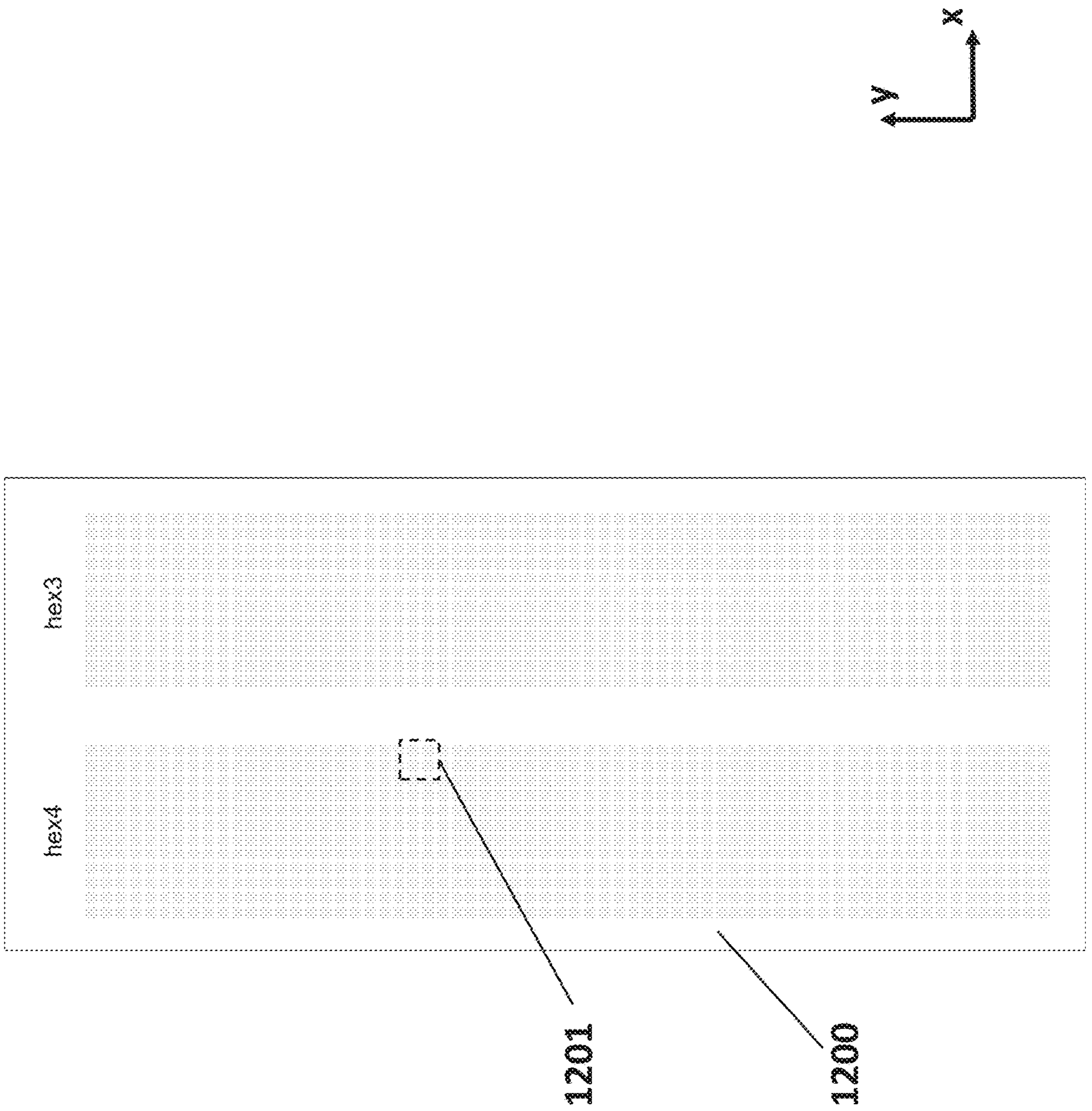
FIG. 12A illustrates a configuration of a calibration target, in accordance with some embodiments.
Figure 12B:
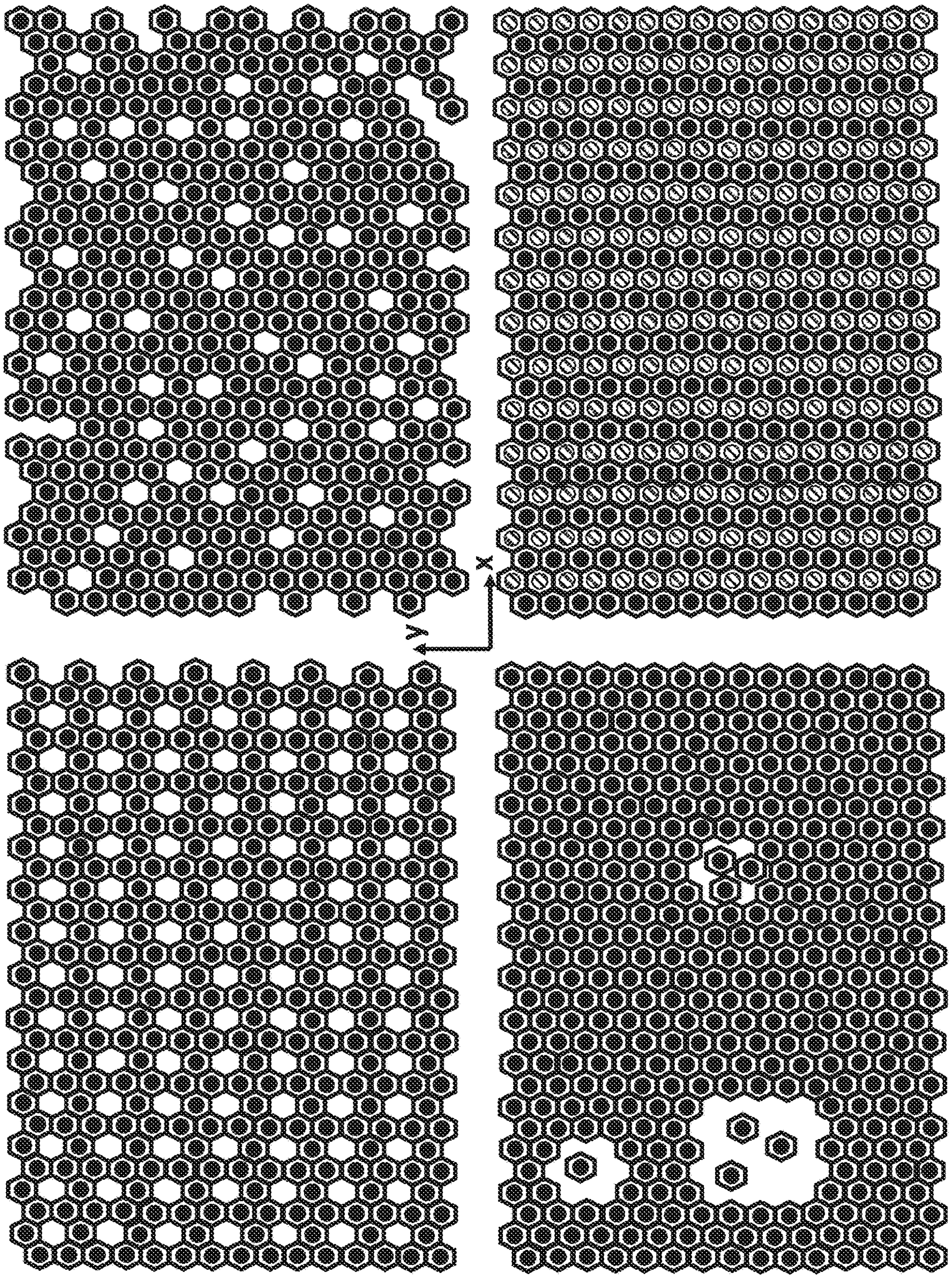
FIG. 12B illustrates a detailed view of a region of a calibration target, in accordance with some embodiments.

FIG. 12A depicts a configuration of a calibration target. The calibration target comprises a solid support 1200 containing two different regions that are each individually configured for detector calibration. The two regions may comprise subregions that contain spatial arrangements of detectable features that are similar to the spatial arrangement of an array of analytes that a detection device is configured to optically interrogate. For example, the region labeled "hex3" may contain a plurality of detectable moieties with inter-moiety spacing such that each detectable moiety would be detected by a 3 pixel by 3 pixel subregion of a detector. Likewise, the region labeled "hex4" may contain a plurality of detectable moieties with inter-moiety spacing such that each detectable moiety would be detected by a 4 pixel by 4 pixel subregion of a detector. It may be preferable to have regions configured for differing optical resolutions to facilitate detection on two or more differing arrays, in which arrays are distinguished by having differing site pitch. FIG. 12B depicts a detailed view of the subregion 1201 of FIG. 12A, in which the subregion comprises multiple subarrays, with each subarray having a differing spatial arrangement of sites or vacancies, in which sites may provide a detectable signal to a detection device, and in which vacancies may have an absence of a detectable signal to the detection device. In the depicted configuration of the subregion, the two upper subarrays have sites (represented by the black dots) arranged in a hexagonal grid pattern. The upper left subarray has sites arranged in a hexagonal grid pattern, with vacancies (represented by an absence of a dot) at regular or repeating intervals. The upper right subarray has sites arranged in a hexagonal grid pattern, with vacancies at irregular or random intervals. The lower right subarray has sites arranged in a hexagonal grid pattern, with a first set of sites containing a first detectable label (represented by the black dots) that produces a first signal, and a second set of sites containing a second detectable label that produces a second signal (represented by the non-solid circles). In the depicted configuration of the lower right subarray, the first set of sites and second set of sites are placed in regular or repeating spatial arrangement, although alternatively the spatial arrangements of the first set of sites and the second set of sites may be random. Such configurations of the lower right subarray (including additional detectable labels beyond the two depicted) may be useful for calibrating multiple detectors. The lower left subarray comprises a plurality of sites arranged in a hexagonal grid pattern, with one or more sites and/or vacancies located at addresses of the solid support 1200 that are not aligned to the grid pattern.

Figure 18B:
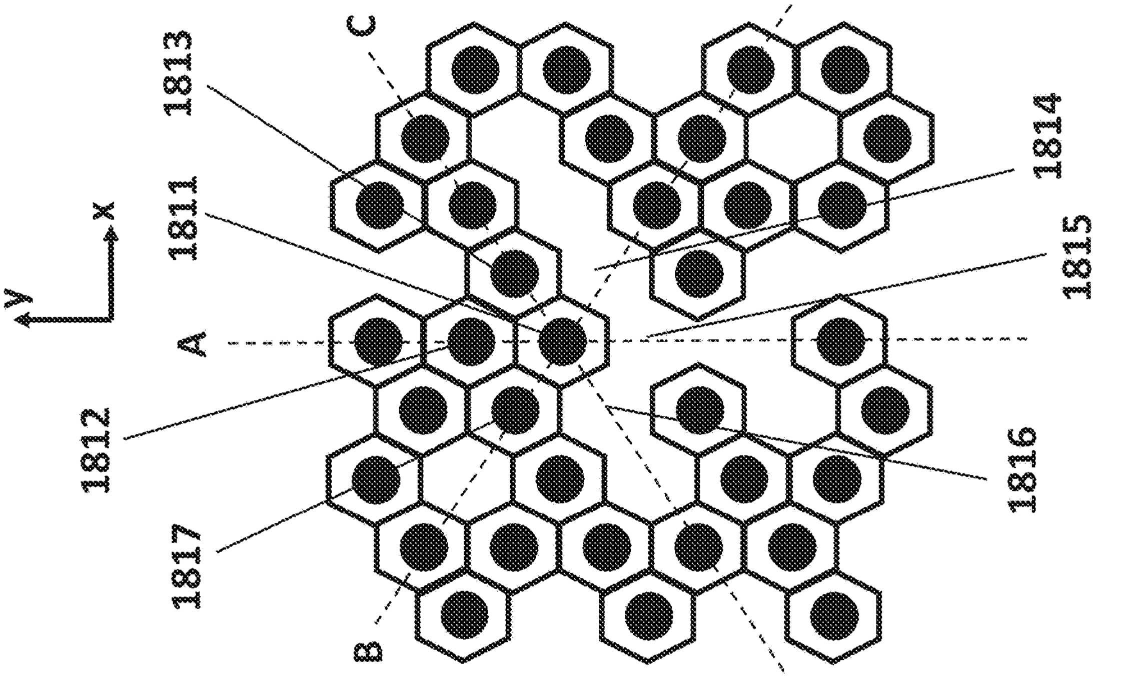
FIGS. 18A and 18B display aspects of geometry for gridded or patterned spatial arrangements of sites and/or vacancies, in accordance with some embodiments.
Figure 18A:
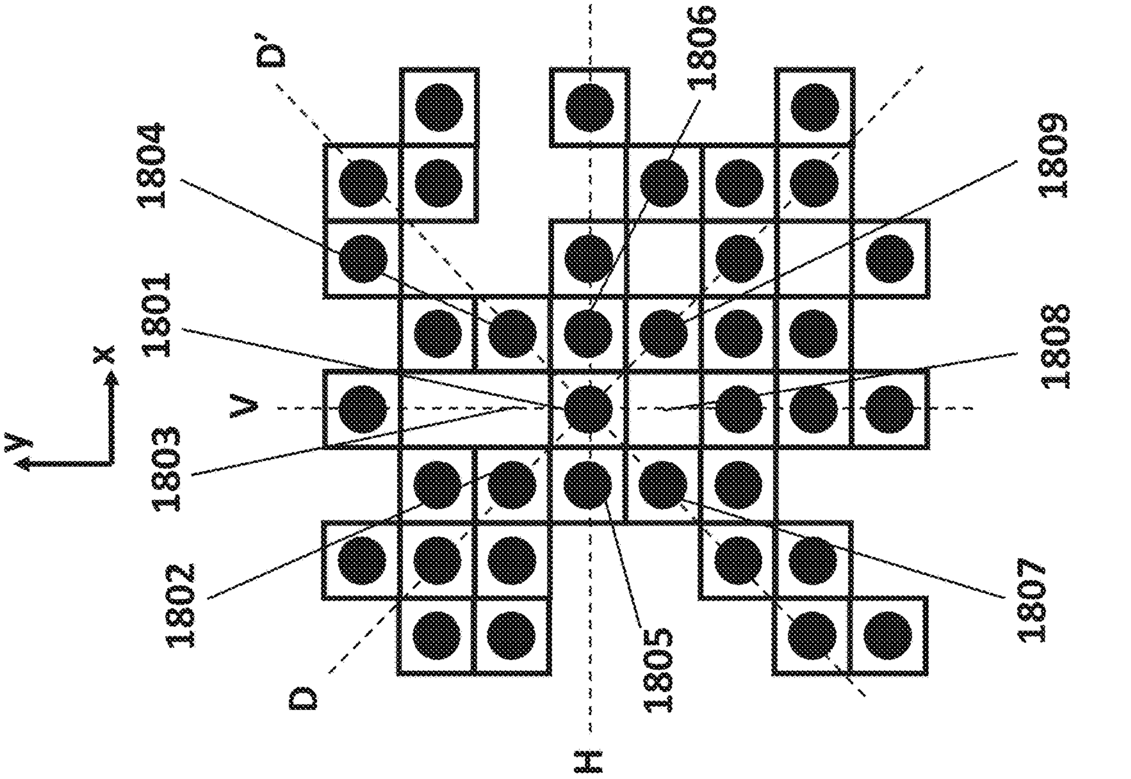

In some cases, a calibration target may comprise a region containing a plurality of subregions, in which each subregion comprises a unique spatial arrangement of detectable moieties. Each subregion may comprise at least one optically-detectable moiety at an address of the solid support. Each subregion may comprise a plurality of optically detectable moieties at addresses of the solid support. Preferably, each individual optically-detectable moiety is resolvable from any other optically-detectable moiety of a subregion of a calibration target. In some cases, optically-detectable moieties may be located on a solid support according to a grid or pattern, in which spatial locations of optically-detectable moieties are predictable. FIGS. 18A-18B illustrate examples of gridded sites (marked by a black dot) and vacancies (marked by absence of a black dot). FIG. 18A depicts a rectangular or square grid. The grid contains a site at address 1801 that is adjacent to eight other addresses (1802, 1803, 1804, 1805, 1806, 1807, 1808, and 1809, respectively). Addresses 1802, 1804, 1805, 1806, 1807, and 1809 contains sites (e.g., addresses containing optically-detectable moieties), and addresses 1803 and 1808 contain vacancies (e.g., addresses having an absence of any optically-detectable moiety). If each address is separated from a nearest neighboring address by a distance N, then addresses along axes V and H will have predictable locations as integer multiples of N (e.g., distances of N, 2N, 3N, 4N, etc. from site 1801), and addresses along axes D and D' will have predictable locations as integer multiples of (Sqrt 2)N (e.g., distances of (Sqrt 2)N, 2(Sqrt 2)N, 3(Sqrt 2)N, 4(Sqrt 2)N, etc. from site 1801) due to the square grid pattern. FIG. 18B depicts a hexagonal grid. The grid contains a site at address 1811 that is adjacent to six other addresses (1812, 1813, 1814, 1815, 1816, and 1817, respectively). Addresses 1812, 1813, and 1817 contain sites (e.g., addresses containing optically-detectable moieties), and addresses 1814, 1815, and 1816 contain vacancies (e.g., addresses having an absence of any optically-detectable moiety). If each address is separated from a nearest neighboring address by a distance N, then addresses along axes A, B, and C will have predictable locations as integer multiples of N (e.g., distances of N, 2N, 3N, 4N, etc. from site 1811). Spatially arranging sites according to a grid or patterning may be useful for a method of camera calibration since addresses of sites or vacancies should be predictable in a two-dimensional image. Accordingly, a detector having a properly parameterized detector model can produce two-dimensional images having signals located at the predictable addresses.

Figure 17:
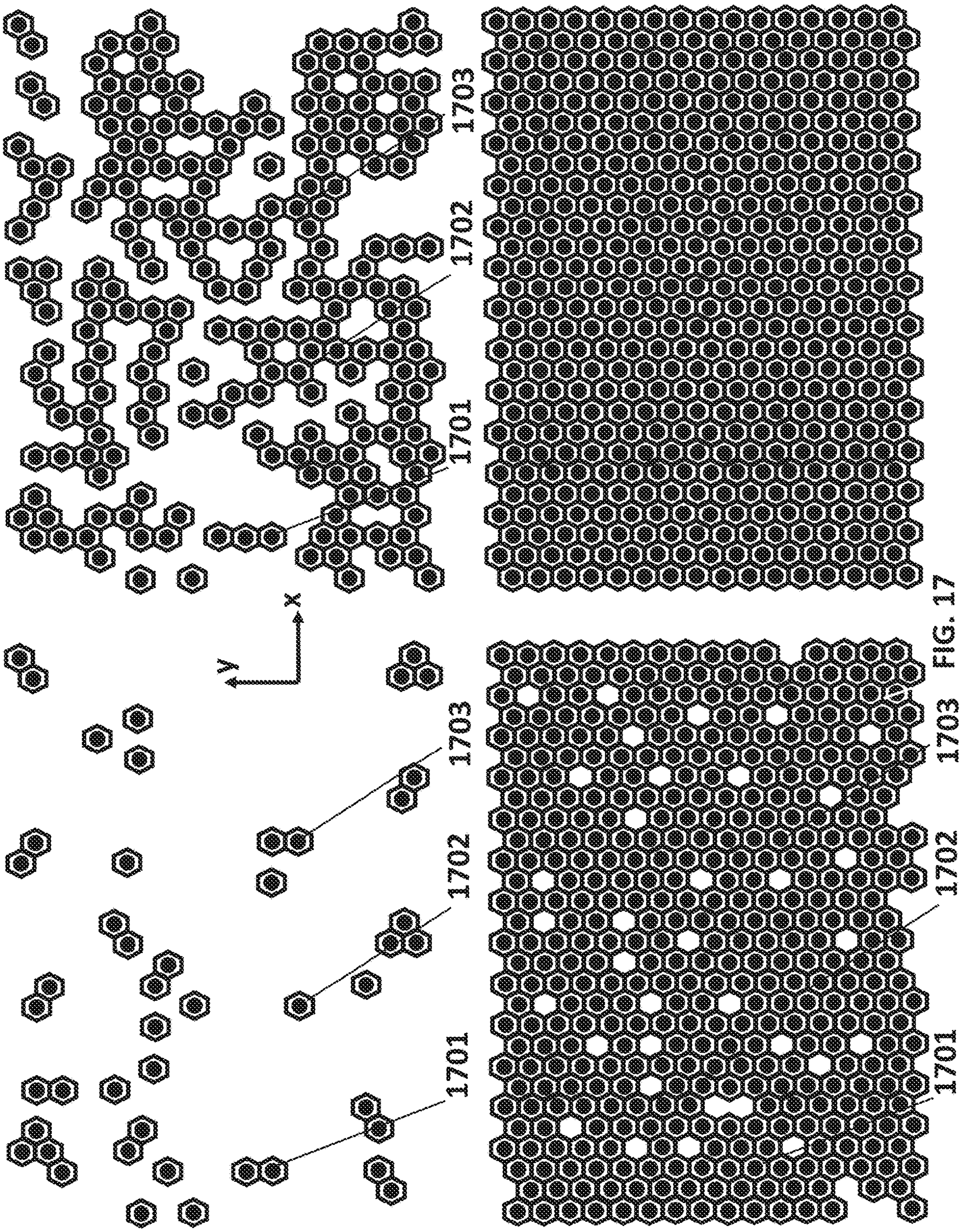
FIG. 17 depicts a portion of a calibration target comprising a plurality of subarrays, in which each subarray has a different total site occupancy, in accordance with some embodiments.

In some cases, a calibration target may comprise a region containing a plurality of subregions, in which each subregion comprises a unique spatial arrangement of detectable moieties. In some cases, a total occupancy of available addresses of each individual subregion may differ from the total occupancy of available addresses of any other subregion of the calibration target. FIG. 17 depicts a region of a calibration target containing four subregions. The lower right subregion has 100% occupancy (i.e., each address of the hexagonal grid contains an optically-detectable moiety). At 100% occupancy, there are 448 sites in the subregion. The occupancy of the three other subregions differ, with the lower left subregion having about 90% occupancy, the upper right subregion having about 50% occupancy, and the upper left subregion having about 10% occupancy. The spatial arrangement of sites and vacancies is random in FIG. 17, although patterned or non-random spatial distributions of sites and vacancies can be provided in other configurations. A subregion may contain one or more sites (e.g., sites 1701, 1702, and 1703) that are occupied in at least a subset of all subregions of the region of the calibration target. Preferably, each subregion may contain one or more sites (e.g., sites 1701, 1702, and 1703) that are occupied in at least a subset of all subregions of the region of the calibration target. Preferably, each subregion may contain one or more sites (e.g., sites 1701, 1702, and 1703) that are occupied in each individual subregions of the region of the calibration target. Redundancy of spatial locations of signals (or absence of signal) between subregions may facilitate methods such as image registration and/or landmarking by providing reference addresses that should align when images collected on detector having a properly parameterized detector model are overlaid.

It may be preferable to provide a calibration target containing a subregion or a subarray thereof having a signal occupancy (as determined by a percentage of spatially-resolvable addresses containing a detectable signal over the entire area of the subregion or subarray) of at least about 0.001%, 0.01%, 0.1%, 0.5%, 1%, 5%, 10%, 15%, 20%, 25%, 30%, 35%, 40%, 45%, 50%, 55%, 60%, 65%, 70%, 75%, 80%, 85%, 90%, 95%, 99%, 99.9%, 99.99%, 99.999%, or more than 99.999%. Alternatively or additionally, a subregion or a subarray thereof of a calibration target may have a signal occupancy of no more than about 99.999%, 99.99%, 99.9%, 99%, 95%, 90%, 85%, 80%, 75%, 70%, 65%, 60%, 55%, 50%, 45%, 40%, 35%, 30%, 25%, 20%, 15%, 10%, 5%, 1%, 0.5%, 0.1%, 0.01%, 0.001%, or less than 0.001%. In some cases, it may be advantageous to provide a calibration target with a first subregion or first subarray having a signal occupancy of at least about 50% (e.g., at least about 55%, 60%, 65%, 70%, 75%, 80%, 85%, 90%, 95%, 99%, 99.9%, 99.99%, 99.999%, or more than 99.999%) and a second subregion or second subarray having a signal occupancy of no more than about 20% (e.g., no more than about 15%, 10%, 5%, 1%, 0.5%, 0.1%, 0.01%, 0.001%, or less than 0.001%).

Signal occupancy of an array of sites containing a plurality of analytes may vary depending upon an assay method being performed. In some cases, analytes may be attached to sites of an array of sites by an anchoring group, in which each anchoring group comprises an optically-detectable moiety (e.g., a fluorophore, a luminophore, etc.). Accordingly, each site of an array of sites containing an analyte attached to an anchoring group may produce a resolvable signal. In other cases, binding reagents may be bound to a subset of analytes of a plurality of analytes, in which each individual binding reagent comprises an optically-detectable moiety (e.g., a fluorophore, a luminophore, etc.). Accordingly, each site of an array of sites containing a bound binding reagent may produce a resolvable signal. A subregion or a subarray thereof of an array of sites containing a plurality of analytes may have a signal occupancy (as determined by a percentage of spatially-resolvable addresses containing a detectable signal over the entire area of the subregion or subarray) of at least about 0.001%, 0.01%, 0.1%, 0.5%, 1%, 5%, 10%, 15%, 20%, 25%, 30%, 35%, 40%, 45%, 50%, 55%, 60%, 65%, 70%, 75%, 80%, 85%, 90%, 95%, 99%, 99.9%, 99.99%, 99.999%, or more than 99.999%. Alternatively or additionally, a subregion or a subarray thereof of an array of sites containing a plurality of analytes may have a signal occupancy of no more than about 99.999%, 99.99%, 99.9%, 99%, 95%, 90%, 85%, 80%, 75%, 70%, 65%, 60%, 55%, 50%, 45%, 40%, 35%, 30%, 25%, 20%, 15%, 10%, 5%, 1%, 0.5%, 0.1%, 0.01%, 0.001%, or less than 0.001%.

It may be preferable to provide a calibration target comprising a plurality of subregions, such as at least about 2, 3, 4, 5, 10, 20, 50, 100, 200, 500, 1000, or more than 1000 subregions. Alternatively or additionally, it may be preferable to provide a calibration target comprising no more than about 1000, 500, 200, 100, 50, 20, 10, 5, 4, 3, or less than 3 subregions.

It may be preferable to provide a calibration target having a subarray, in which the subarray has a signal occupancy that is comparable to an expected signal occupancy of an array of analytes or a subarray thereof during a detection event of the array of analytes. For example, when binding reagents are bound to only a portion of analytes of an array of analytes, the array of analytes or subarrays thereof may have a signal occupancy of less than about 20% (e.g., less than about 15%, 10%, 5%, or 1%). Accordingly, it may be preferable to calibrate a detector of an optical detection system with a calibration target containing a subarray having a signal occupancy of less than about 20%.

Figure 19A:
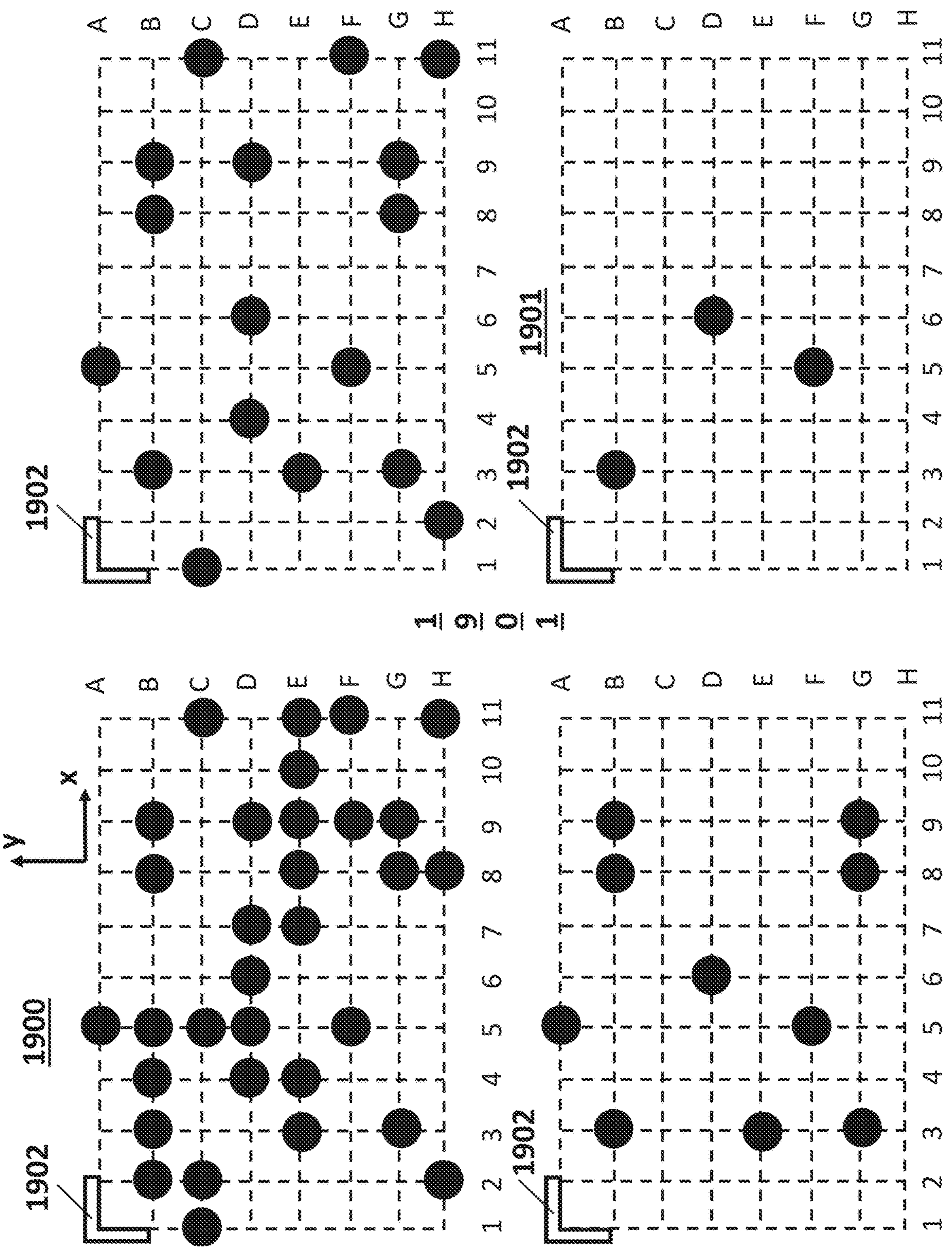
FIG. 19A shows a spatial arrangement of a subregion of a calibration target, in which subregion comprises four subarrays, with each subarray having a different signal occupancy, and in which the spatial arrangement of occupied sites in each subarray is present in the next-highest occupancy subarray, in accordance with some embodiments.

FIG. 19A depicts a useful configuration of a calibration target on a solid support 1900 that may be useful for determining a detector model or a parameter thereof for detection events that may have a broad range of possible signal occupancies. The calibration target depicted contains four subarrays, with each subarray having a substantially identical area (i.e., length times width of the subarray). Each subarray contains 88 optically-resolvable addresses, in which some addresses contains sites (i.e., black dots representing a presence of an optically-detectable moiety at the address), and other addresses containing vacancies (an absence of an optically-detectable moiety at the address). In the depicted configuration, each subarray has a random spatial arrangement of sites and vacancies (i.e., no predictable or repeating sequence of sites or vacancies), however patterned or regular spatial arrangements may be useful too. Each of the four subarrays has a different signal occupancy, with the lower right subarray having a signal occupancy of about 3.4% (3 of 88 addresses containing an optically-detectable moiety) and the upper left subarray having a signal occupancy of about 36.4% (32 of 88 addresses containing an optically-detectable moiety). Each individual subarray has a reference location 1902 that provides a common frame of reference for determining the location of sites or vacancies with respect to the reference location 1902. The subarrays are separated spatially by interstitial regions 1901 which do not contain any optically-detectable moieties.

Figure 19B:
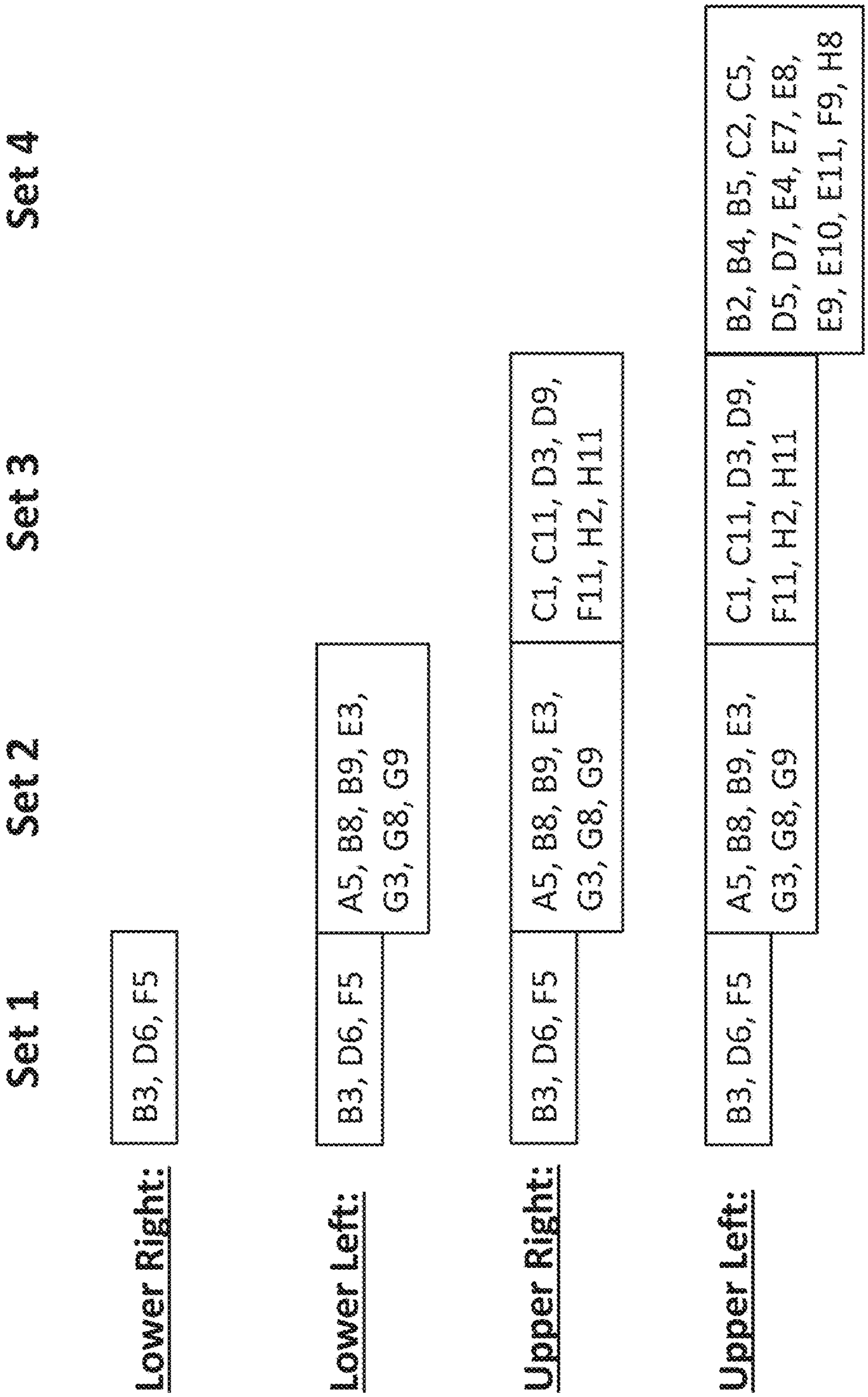
FIG. 19B illustrates subsets of sites present in each subarray of FIG. 19A.

FIG. 19B depicts an additional aspect of the spatial arrangement of the sites of the subarray. In the depicted configuration of the calibration target, each successively higher-signal occupancy subarray contains the same spatial arrangement of sites as the next lower-signal occupancy array with additional sites added to its spatial arrangement and fewer vacancies. For example, the lower left subarray contains the same 3 sites as the lower right subarray, plus an additional 7 sites. Likewise, the upper right subarray contains the same 10 sites as the lower right subarray, plus an additional 7 sites. FIG. 19B depicts sets of sites that are common to all subarrays, as well as sets of sites that are not common to each subarray. For example, set 1 contains three sites (addresses B3, D6, and E5). This set is common to each subarray. Set 2 contains seven sites (addresses A5, B8, B9, E3, G3, G8, and G9). This set is common to each subarray except the lowest occupancy subarray.

The exemplary configuration of a calibration target depicted in FIG. 19A may be useful for determining if a detector model has been properly calibrated for detection at low signal occupancies. If an image of the lower right subarray is registered with an image of any of the other subarrays signals should be detected at addresses common to each subarray with respect to reference locations 1902 (i.e., signals should be detected at addresses corresponding to B3, D6, and E5 in each subarray image). In other words, an overlay of the spatial data of an image of the lower right subarray onto an image of any of the other subarrays, when aligned to the common reference location 1902 of the respective subarrays, should have overlapping signals at the addresses B3, D6, and E5 when the detector model produces proper spatial correction of optical signal data. Likewise, the lower left subarray would have overlapping signal information with each subarray of higher signal occupancy, and so forth.

In another aspect, provided herein is a method, comprising: a) providing to an optical detection system comprising a detector an array of sites, in which each individual site of the array of sites comprises an individual optically-detectable moiety, in which each individual site of the array of sites is optically resolvable from each other site of the array of sites, in which a first subregion of the array of sites has a signal occupancy of at least 50%, and in which a second subregion of the array of sites has a signal occupancy of no more than 10%, b) detecting a first spatial arrangement of signals from optically-detectable moieties of the first subregion of the array of sites, c) based upon the first spatial arrangement of signals from the first subregion of the array of sites, determining a first value of a parameter of a detector model of the detector, d) detecting a second spatial arrangement of signals from optically-detectable moieties of the second subregion of the array of sites, e) based upon the second spatial arrangement of signals from the second subregion of the array of sites, determining a second value of the parameter of the detector model of the detector; and f) determining a consensus value of the parameter of the detector model based upon the first value of the parameter and the second value of the parameter.

In some cases, a method may further comprise detecting one or more additional spatial arrangements of signals from optically-detectable moieties of one or more additional subregions of the array of sites. In particular cases, a signal occupancy of a subregion of the one or more additional subregions of the array of sites differs from the signal occupancy of each other individual subregion of the one or more additional subregions of the array of sites. In particular cases, a signal occupancy of a subregion of the one or more additional subregions of the array of sites differs from the signal occupancy of the first subregion of the array of sites and the second subregion of the array of sites. A method may further comprise, for each individual spatial arrangement of signals of each individual subregion of the one or more subregions of the array of sites, determining a value of the parameter of the detector model.

A consensus value of a parameter of a detector model may be determined by any suitable statistical method. In some cases, a value of a parameter of a detector model may be determined N times (e.g., by detecting N subregions of an array of sites where N can be at least about 2, 3, 4, 5, 10, 20, 30, 50, 100, or more than 100), in which the consensus value of the parameter is the average of the N measurements. In particular cases, the consensus value of the parameter can be a weighted average of N measurements. For example, a value of the parameter determined from a subregion with low signal occupancy (e.g., no more than 20% signal occupancy) may be weighted more than a value of the parameter from a subregion with a higher signal occupancy. Alternatively, a value of the parameter determined from a subregion with low signal occupancy (e.g., no more than 20% signal occupancy) may be weighted less than a value of the parameter from a subregion with a higher signal occupancy. In some cases, the consensus value of a parameter of a detector model can be a medial value of N measurements.

A method may comprise the steps of: i) detecting a first spatial arrangement of signals from optically-detectable moieties of a first subregion of an array of sites; and ii) detecting a second spatial arrangement of signals from optically-detectable moieties of a second subregion of an array of sites. In some cases, the second spatial arrangement of signals may be a subset of the first spatial arrangement of signals. A method may further comprise: i) detecting a first reference location of the first subregion of the array of sites, and detecting a second reference location of the second subregion of the array of sites, ii) aligning the first reference location of the first subregion of the array of sites to the second reference location of the second subregion of the array of sites, and iii) determining presence or absence of overlap between the second spatial arrangement of signals and the subset of the signals of the first spatial arrangement of signals. In some cases, determining presence or absence of overlap between the second spatial arrangement of signals and the subset of the signals of the first spatial arrangement of signals may comprise registering a site of the first spatial arrangement of signals to a site of the second spatial arrangement of signals. If the first spatial arrangement of signals and the second spatial arrangement of signals have been spatially corrected by a detector model, there should be a presence of overlap between the second spatial arrangement of signals and the subset of the signals of the first spatial arrangement of signals (i.e., distances and directions between reference locations and sites of the subset of signals should be the same for both the first spatial arrangement and the second spatial arrangement). In other cases, a method may further comprise, for an absence of overlap between the second spatial arrangement of signals and the subset of the signals of the first spatial arrangement of signals, repeating steps of a method of determining a parameter of a detector model, as set forth herein.

An optical detection system may comprise a first detector and a second detector, in which the first detector is configured to detect a first type of signal (e.g., a first wavelength or range of wavelengths of light) and the second detector is configured to detect a second type of signal (e.g., a second wavelength or range of wavelengths of light). Accordingly, a method may comprise determining a first detector model or a parameter thereof for the first detector, and determining a second detector model or a parameter thereof for the second detector. It may be advantageous to provide a calibration target comprising an array of sites, in which the array of sites comprises a first subset of sites and a second subset of sites, in which the first subset of sites comprises a first type of optically-detectable moiety that produces a first signal, in which the second subset of sites comprises a second type of optically-detectable moiety that produces a second signal, and in which the first signal is distinguishable from the second signal. In some cases, a calibration target may comprise a subregion or a subarray thereof, in which subregion comprises the first subset of sites and the second subset of sites, and in which the first subset of sites and the second subset of sites have a same spatial arrangement. For example, a calibration target may be formed by depositing a first fluorophore and a second fluorophore at each occupied site of the array of sites of the calibration target. In some cases, a calibration target may comprise a subregion or a subarray thereof, in which subregion comprises the first subset of sites and the second subset of sites, and in which the first subset of sites and the second subset of sites have differing spatial arrangements. A first subset of sites and a second subset of sites may have at least one overlapping site of an array of sites (i.e., a site containing a first optically-detectable moiety and a distinguishable second optically-detectable moiety). A first subset of sites and a second subset of sites may have no overlapping sites of an array of sites (i.e., any occupied site contains either a first optically-detectable moiety or a distinguishable second optically-detectable moiety).

In some cases, a method of camera calibration may comprise the steps of: i) detecting on a detector a first plurality of detectable signals from detectable moieties from a first subregion of a solid support; ii) based upon the first plurality of detectable signals, determining one or more parameters of a first detector model of the detector; iii) detecting on the detector a second plurality of detectable signals from detectable moieties from a second subregion of the solid support; iv) based upon the second plurality of detectable signals, determining one or more parameters of a second detector model of the detector; and v) determining a consensus detector model from the first detector model and the second detector model, in which the consensus detector model comprises a statistical combining of the one or more parameters of the first detector model and the second detector model. The method may further comprise weighting in additional detector models determined on additional subregions. A parameter of a consensus detector model may be statistically combined by any suitable statistical method, such as an average or median value or the parameter. Statistical combining of detector models may be useful for averaging out variation due to manufacturing variability of a calibration target or other signal source utilized for camera calibration.

A calibration target may facilitate validation for a method of performing an array-based process set forth herein, such as image registration, landmarking, error detection, or pattern analysis. For validating a method of error detection, it may be useful to provide a calibration target comprising a first subregion and a second subregion, in which the first subregion and the second subregion each individually contain a site containing an optically-detectable moiety at a same relative spatial location within the respective subregion, in which an image of the first subregion and the second region will contain a signal from the optically-detectable moiety at the same relative spatial location with the subregions, and in which the spatial location of the site for each individual subregion varies with respect to a third spatial dimension (e.g., a dimension orthogonal to a surface of a solid support).

A method of image registration of may comprise one or more steps of: i) detecting on a detector a first image of a first subregion of a calibration target, as set forth herein, wherein the first subregion comprises a reference location (e.g., a second site, a vacancy, an edge or corner of the first subregion, a fiducial marker, an interstitial region, etc.) and a site containing an optically-detectable moiety, wherein the site has a spatial location with respect to the reference location; ii) spatially-correcting the first image utilizing a detector model of the detector; iii) detecting on the detector a second image of a second subregion of the calibration target, as set forth herein, wherein the second subregion comprises the reference location; iv) spatially-correcting the second image utilizing the detector model of the detector; and v) identifying at the spatial location with respect to the reference location of the second image a signal from a detectable moiety, thereby identifying the site in the second subregion. In some cases, the field-of-view of the first image may comprise the first subregion and a portion of the second subregion. In other cases, the field-of-view of the first image may not comprise a portion of the second subregion.

A method of landmarking may comprise one or more steps of: i) detecting on a detector a first image of a first subregion of a calibration target, as set forth herein, wherein the first subregion comprises a reference location (e.g., a site, a vacancy, an edge or corner of the first subregion, a fiducial marker, an interstitial region, etc.), wherein the reference location has a first spatial coordinate with respect to an edge of a field-of-view of the first image; ii) spatially-correcting the first image utilizing a detector model of the detector; iii) after detecting the first image, translating (e.g., via actuation of a translation stage or other motion-translation system) the calibration target with respect to the detector; iv) detecting on the detector a second image of a second subregion of the calibration target, as set forth herein, wherein the second subregion comprises the reference location; v) spatially-correcting the second image utilizing the detector model of the detector; vi) identifying with respect to the edge of the field-of-view of the second image a second spatial coordinate of the reference location; and vii) identifying a difference between the first spatial coordinate and the second spatial coordinate. In some cases, there may be substantially no difference between the first spatial coordinate and the second spatial coordinate (e.g., proper or predictable translation of the calibration target from a first setpoint to a second setpoint). In other cases, there may be a measurable distance or offset between the first spatial coordinate and the second spatial coordinate (e.g., improper translation of the calibration target from the first setpoint to the second setpoint).

A method of error detection may comprise one or more steps of: i) detecting on a detector a first image of a first subregion of a calibration target, as set forth herein, wherein the first subregion comprises a reference location (e.g., a second site, a vacancy, an edge or corner of the first subregion, a fiducial marker, an interstitial region, etc.) and a site containing an optically-detectable moiety, wherein the site has a spatial location with respect to the reference location; ii) spatially-correcting the first image utilizing a detector model of the detector; iii) after detecting the first image, altering an orientation of the calibration target with respect to the detector (e.g., altering a tilt of the calibration target by actuating a tilting device, altering an autofocus device of an optical detection system); iv) detecting on the detector a second image of a second subregion of the calibration target, as set forth herein, wherein the second subregion comprises the reference location; iv) spatially-correcting the second image utilizing the detector model of the detector; and v) identifying at the spatial location with respect to the reference location of the second image a signal from a detectable moiety, thereby identifying the site in the second subregion. In some cases, altering the orientation of the calibration target with respect to the detector may further comprise: vi) receiving information (e.g., a priori spatial or topographical mapping of the first subregion and the second subregion) regarding a spatial difference between the first subregion and the second subregion, and based upon the information, altering the orientation of the calibration target with respect to the detector.

In some cases, a spatial arrangement of each calibration region of a calibration target may be determined before providing the calibration target to a detection device. In some cases, a priori information regarding a spatial arrangement of a calibration target may be provided to a detection device to facilitate a method of calibrating a detection device (e.g., determining one or more parameters of a detector model of the detection device).

A calibration target or a subregion thereof may be formed on a solid support by any suitable method. In some cases, optically-detectable moieties (e.g., fluorescently-labeled anchoring groups, fluorescently-labeled analytes, fluorescently-labeled polymer particles, quantum dots, etc.) may be deposited at sites that are configured to attach to the optically-detectable moieties. In other cases, a calibration target may be formed on a solid support by a suitable lithographic method. For example, sites may be formed in a suitable spatial arrangement, as set forth herein, by lithography of a positive photoresist, followed by deposition of fluorescently-labeled moieties at the sites prior to removal of the remaining photoresist from the solid support. In another example, a fluorescently labeled negative photoresist may be formed by photolithography to provide a spatial arrangement of fluorescent sites, followed by removal of any non-illuminated photoresist, thereby providing the spatial arrangement of sites containing the fluorescently labeled negative photoresist. In a further example, a photoresist layer may be patterned on the surface of a substrate to create areas free of photoresist where surface-coupling moieties designed to bind to a fluorescent moiety may be selectively deposited (e.g., silanes on glass or silicon dioxide). The photoresist layer may then be removed (for example by a stripping or lift-off process in a sonicated solvent bath), leaving selective binding sites on the substrate surface. In yet a further example, the substrate surface is coated with a surface layer (hexamethyldisilazane), thereby preventing the binding of fluorescent moieties but allowing the adhesion of photoresist. A photoresist layer can be deposited on this first surface layer and patterned. The pattern of the photoresist layer can then be replicated on the first layer, creating areas where the surface of the substrate is free of the surface layer. A second surface layer that binds to fluorescent moieties can then be deposited in these areas and the photoresist layer can be removed (for example by a stripping or lift-off process in a sonicated solvent bath), leaving areas that respectively repel or bind the fluorescent moieties.

A detection device may be calibrated utilizing an array, as set forth herein, before, during, or after a process that utilizes the array. A detection device may be calibrated by a method, as set forth herein, at least once per array-based process. A detection device may be calibrated by a method, as set forth herein, more than once per array-based process (e.g., after every M cycles or steps of the array-based process). A detection device may be calibrated by a method, as set forth herein, once per multiple array-based processes (e.g., after every M array-based processes). In some cases, a detection device may be calibrated due to an environmental change of the detection device or array. For example, temperature change within the environment of a detection device may change certain physical characteristics of the detection device (e.g., orientation relative to an array, lens distortion, etc.). Accordingly, a detector model may need to be recalibrated if a temperature change exceeds at least about 0.1° C. (e.g., at least about 0.5° C., 1° C., 1.5° C., 2° C., 3° C., 4° C., 5° C., or more than 5° C.).

In some cases, a detection device may be adjusted after performing a method, as set forth herein. For example, a detection device may be re-oriented with respect to an array, or an array may be re-oriented with respect to a detection device. In another example, a detection device may be adjusted to alter a detection characteristic such as focal length, magnification, numerical aperture, or optical offset. After adjusting a detection device, the detection device may be re-calibrated by a method set forth herein. In some cases, a detection device or a component thereof may be replaced after performing a method, as set forth herein.

In another aspect, provided herein is a system, comprising: a) an array comprising a plurality of sites, in which individual sites of the plurality of sites are each optically resolvable, and in which sites of the plurality of sites comprise signal sources, b) a detection device configured to acquire signals from the signal sources at sites of the plurality of sites, thereby forming an image comprising detection events, and c) a computer processor programmed to: (i) identify within a field of view having N sides a pattern of detection events of the image, in which each individual side of the N sides is contacted by a detection event of the pattern of detection events, and (ii) output a parameter of a direct linear transform detector model based upon the pattern of detection events.

A system may comprise a computer processor that is configured to implement a method of detector calibration, as set forth herein. In some cases, one or more parameters (e.g., intrinsic parameters, extrinsic parameters, optical distortion model parameters) of a detector model (e.g., a direct linear transform model) may be stored in a computer processor or stored in a computer-readable medium that is accessible to the computer processor. Accordingly, a computer processor may be programmed to determine one or more unknown detector model parameters based upon the stored parameters. For example, a set of intrinsic parameters and optical distortion model parameters may be stored on a computer processor, and the processor may be programmed to output a set of extrinsic parameters based upon a method set forth herein.

In some cases, a computer processor may comprise an intrinsic parameter of the direct linear transform model. Accordingly, the computer processor can be further programmed to, based upon the intrinsic parameter and the pattern of detection events, determine the parameter of a direct linear transform detector model, in which the parameter comprises an extrinsic parameter. In some cases, a computer processor may comprise an extrinsic parameter of the direct linear transform model. Accordingly, the computer processor can be further programmed to, based upon the extrinsic parameter and the pattern of detection events, determine the parameter of a direct linear transform detector model, in which the parameter comprises an intrinsic parameter. In some cases, a computer processor may further comprise an optical distortion model. In some cases, a computer processor may comprise an intrinsic parameter and an extrinsic parameter of a direct linear transform model. Accordingly, the computer processor can be further programmed to, based upon the extrinsic parameter, the intrinsic parameter, and the pattern of detection events, determine the parameter of a direct linear transform detector model, in which the parameter comprises an optical distortion model parameter.

In some cases, a computer processor can be programmed to simultaneously determine an intrinsic parameter and an extrinsic parameter, and optionally an optical distortion model parameter of the direct linear transform model based upon the pattern of detection events. A computer processor may be programmed to determine the intrinsic parameter and the extrinsic parameter of the direct linear transform model by a non-linear solver or any other suitable method of solution. In particular cases, the computer processor can be programmed to perform a bundle adjustment method.

Methods of characterizing an array of analytes, such as those set forth below in the section titled "Polypeptide Assays," may comprise a step of calibrating a detector by a method set forth herein. In some cases, a method of characterizing an array of analytes may comprise calibrating a detector by a method set forth herein before performing an optical interrogation of the array of analytes. For example, an analyte detection system may comprise an optical detector, in which the optical detector is calibrated before an auto-focus function of the optical detector is utilized. In some cases, a method of characterizing an array of analytes may comprise calibrating a detector by a method set forth herein while performing an optical interrogation of the array of analytes. For example, an optical detector model of an optical detector may be periodically re-calibrated to account for temperature fluctuations occurring during use of the optical detector. In some cases, a method of characterizing an array of analytes may comprise calibrating a detector by a method set forth herein after performing an optical interrogation of the array of analytes. For example, an optical detector may be calibrated after an analyte detection process, thereby providing a calibrated optical detector for a subsequent performance of the analyte detection process.

Calibration of a detector may facilitate various optical processes that may occur during an array-based analyte characterization method. Non-limiting examples of optical processes that may be facilitated by detector calibration may include: i) auto-focusing; ii) image registration; iii) landmarking; iv) error detection; and v) pattern analysis. A method may comprise a step of determining one or more parameters of a detector model by a method set forth herein before performing an optical process during an array-based analyte characterization method.

In another aspect, provided herein is a method, comprising: a) providing to an optical detection system comprising a detector a solid support, in which the solid support comprises: i) a calibration target comprising a first array of sites, in which each individual site of the first array of sites comprises an individual optically-detectable moiety, in which each individual site of the first array of sites is optically resolvable from each other site of the first array of sites, in which a first subregion of the first array of sites has a signal occupancy of at least 50%, and in which a second subregion of the first array of sites has a signal occupancy of no more than 10%, and ii) a second array of sites, in which each individual site of the second array of sites is optically resolvable from each other site of the second array of sites, in which each individual site of the second array of sites comprises one and only one individual analyte of a plurality of analytes immobilized to the second array of sites, b) determining from the calibration target a detector model of the detector, c) after determining the detector model of the detector, detecting on the detector a spatial arrangement of signals of a subregion of the second array of sites, d) based upon the detector model of the detector, spatially correcting the spatial arrangement of signals of the subregion of the second array of sites, and e) determining a focal quality parameter of the spatially corrected spatial arrangement of signals of the subregion of the second array of sites.

Figure 14A:
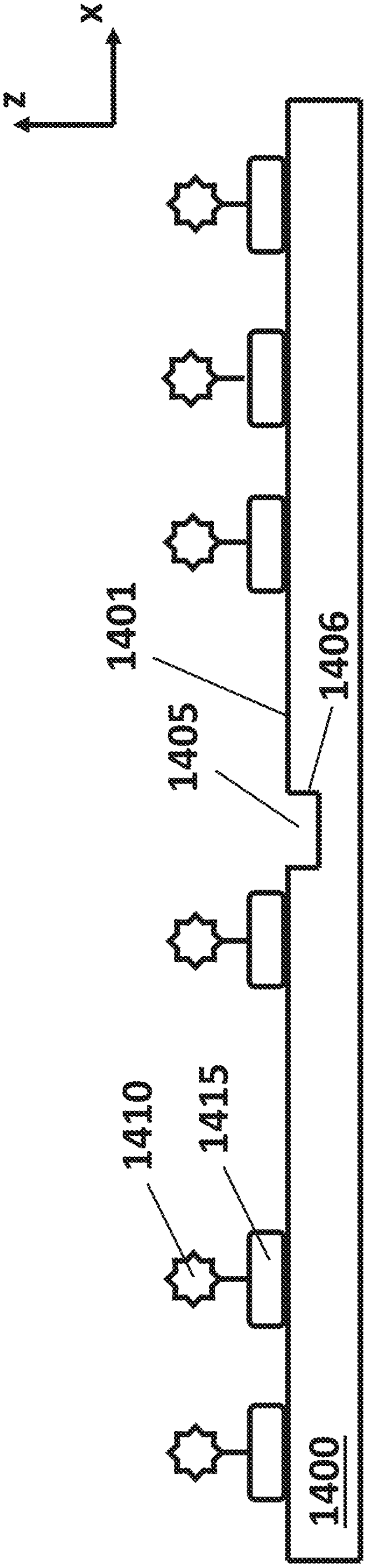
FIGS. 14A and 14B display configurations of solid support containing spatial references, in accordance with some embodiments.
Figure 14B:
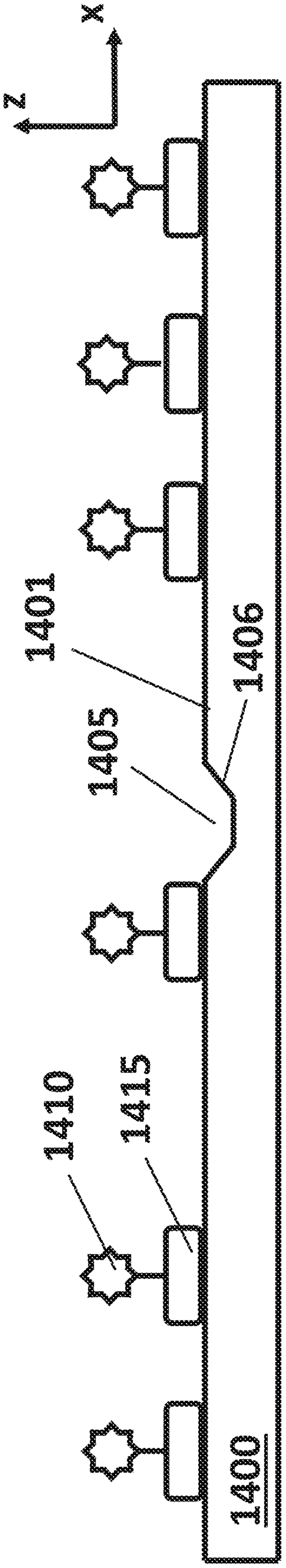

One or more parameters of a detection model may be determined before utilizing an auto-focusing apparatus of an optical detection system. An array may be provided to an optical detection system, in which the array contains a region that is configured to perform a method of detector calibration, as set forth herein, and at least one feature that is configured to adjust an autofocusing apparatus of the optical detection system. A useful feature for autofocus adjustment may comprise a formed or etched fiducial feature. A formed or etched fiducial feature may be inset into a surface of an array, or may be raised above the surface of the array. A feature for autofocus adjustment may comprise at least one edge having an angle of orientation of at least about 600 (e.g., at least about 75°, 80°, 85°, 90°, or more than 90°) with respect to a substantially planar surface of an array upon which the feature is disposed. Such a feature may provide sufficient spatial contrast to facilitate adjustment of an autofocusing apparatus. FIGS. 14A-14B depict differing array configuration containing an inset feature 1405 disposed on a solid support 1400. FIG. 14A depicts the inset feature 1405 comprising an edge 1406 that has an angle of orientation that is substantially orthogonal to the substantially planar surface 1401 of the solid support 1400. The angle of orientation between the edge 1406 and the array surface 1401 may provide sufficient spatial contrast to facilitate an autofocusing process. The solid support 1400 further comprises a plurality of sites, in which sites are disposed on at least one side of the inset feature 1405. Sites of the plurality of sites are occupied by a particle 1415 that is coupled to a detectable label 1410. The sites occupied by particles 1415 coupled to detectable labels 1410 may have a random or non-random spatial distribution. FIG. 14B depicts the inset feature 1405 comprising an edge 1406 that has an angle of orientation that is less than orthogonal to the substantially planar surface 1401 of the solid support 1400. The angle of orientation between the edge 1406 and the array surface 1401 may not provide sufficient spatial contrast to facilitate an autofocusing process.

In some cases, a feature that is configured to adjust an autofocusing apparatus of an optical detection system can comprise a region that is configured to perform a method of detector calibration. A region that is configured to perform a method of detector calibration may comprise at least 3 optically resolvable sites that each individually contain a detectable label or particle. In some cases, at least 3 optically resolvable sites that each individually contain a detectable label or particle may be utilized to perform a method of detector calibration, as set forth herein, and may further be utilized to perform an autofocusing process.

A feature that that is configured to adjust an autofocusing apparatus of an optical detection system may radiate light to a detector of an optical detection system. In some cases, the feature may be illuminated with light, and the feature may radiate (e.g., reflect light, refract light) light back to the detector of the optical detection system. In some cases, the feature may comprise a detectable label or moiety that emits light (e.g., a fluorescent molecule or material) that can be detected by the detector of the optical detection system.

A method of autofocusing a detector of an optical detection system may comprise one or more steps of: i) providing an array comprising a region that is configured to perform a method of detector calibration, as set forth herein, and at least one feature that is configured to adjust an autofocusing apparatus of the optical detection system; ii) determining one or more parameters of a detector model for a detector of an optical detection system utilizing the region of the array; iii) after determining the one or more parameters of the detector model, forming an image of the feature of the array, wherein the image comprises optical signals collected from the feature of the array; iv) based upon focus of the image, altering a distance between the array and the detector and/or an objective lens of the optical detection system; and v) repeating steps iii) and iv) until an optimum focus of the feature is determined.

One or more parameters of a detection model may be determined before or while registering images obtained by a detector of an optical detection system. A method of image registration may comprise one or more steps of: i) providing an array comprising a region that is configured to perform a method of detector calibration, as set forth herein; ii) determining one or more parameters of a detector model for a detector of an optical detection system utilizing the region of the array; iii) forming a first image of the array, wherein the first image comprises optical signals collected from a first set of sites of the array; iv) forming a second image of the array, wherein the second image comprises optical signals collected from a second set of sites of the array; v) based upon the detector model, spatially correcting the location of detected signals of the first image and the second image; and vi) after spatially correcting the first image and the second image, identifying a first site from the first set of sites and a second site from the second set of sites, wherein the first site and the second site are located at the same site of the array. Optionally, a method of image registration may comprise forming the first image and/or the second image before determining the one or more parameters of the detector model.

In some cases, an optical detection system may comprise two or more detectors, in which a detector model is determined for each individual detector. For example, a first detector may be configured to detect signals of a first wavelength, and a second detector may be configured to detect signals of a second wavelength. Accordingly, a method of image registration may comprise: i) forming a first image on a first detector, wherein the first image comprises optical signals collected from a first set of sites of the array; ii) forming a second image on a second detector, wherein the second image comprises optical signals collected from a second set of sites of the array; iii) based upon a detector model of the first detector, spatially correcting the location of detected signals of the first image; iv) based upon a detector model of the second detector, spatially correcting the location of detected signals of the second image; and v) after spatially correcting the first image and the second image, identifying a first site from the first set of sites and a second site from the second set of sites, wherein the first site and the second site are located at the same site of the array.

Methods of registering images on arrays of analytes are described in US20230314324A1, which is herein incorporated by reference in its entirety. In a useful configuration, an array of analytes may further comprise fiducial elements (e.g., fluorescent beads or particles) that have a random spatial distribution on the array of analytes. The random spatial distribution of fiducial elements on the array of analytes may contain unique patterns of fiducial elements that facilitate identification of specific array regions containing the unique patterns. A fiducial element or a plurality thereof may provide a useful reference location for image registration. Spatial locations of signals collected from sites containing analytes with respect to a unique pattern of fiducial elements may facilitate registration of the sites between two different images containing the unique pattern of fiducial elements.

One or more parameters of a detection model may be determined before identifying a spatial reference point or landmark on an array of analytes. A method of spatial referencing or landmarking may comprise one or more steps of: i) providing an array comprising a region that is configured to perform a method of detector calibration, as set forth herein, and a spatial reference feature (e.g., an inset or protruding fiducial feature); ii) determining one or more parameters of a detector model for a detector of an optical detection system utilizing the region of the array; iii) forming an image of the array containing the spatial reference feature; iv) based upon the detector model, spatially correcting the image of the array, thereby forming a corrected image; v) based upon the corrected image, determining a spatial correction pathway; and vi) altering a position of the array with respect to the detector along the spatial correction pathway.

Figure 15A:
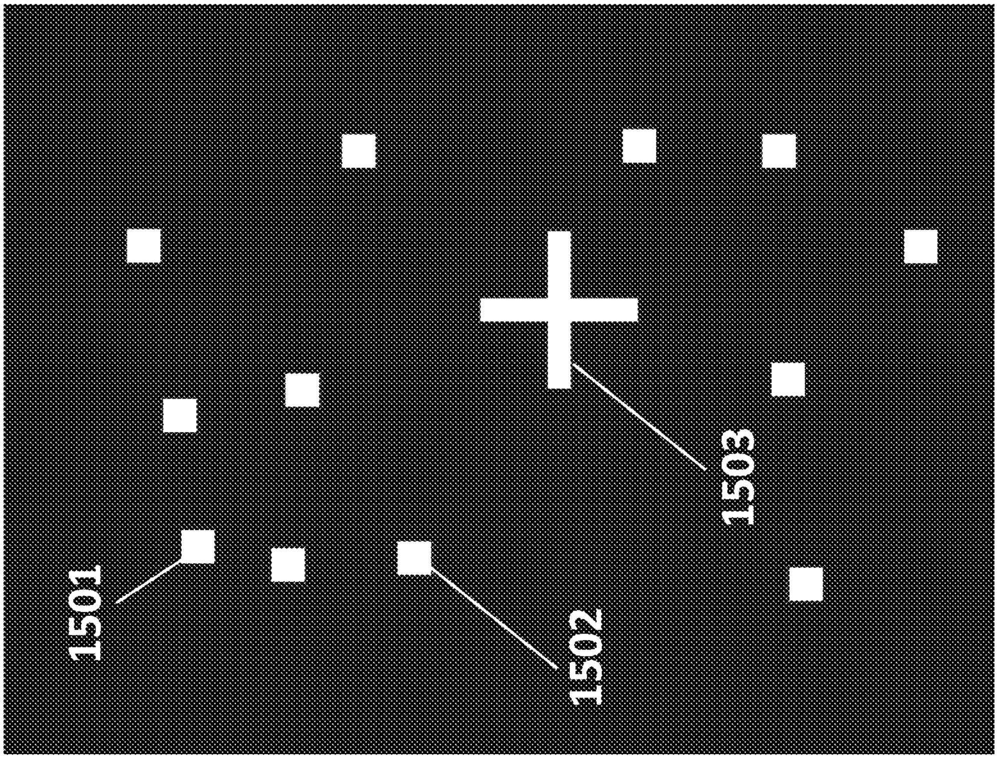
FIGS. 15A, 15B, 15C, and 15D show fields-of-view of a region of a solid support during a method of spatial referencing, in accordance with some embodiments.
Figure 15B:
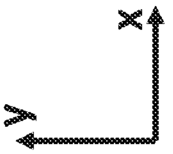
Figure 15B:
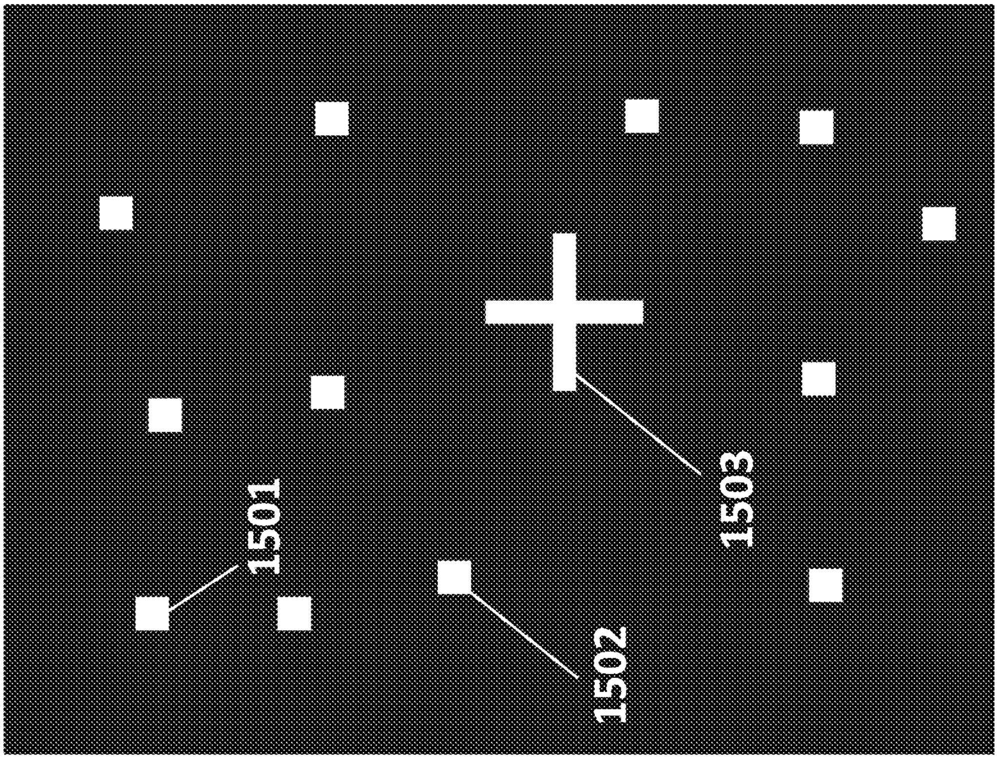

FIGS. 15A-15D illustrate aspects of landmarking or spatial correction of array detection. FIG. 15A depicts a simulated two-dimensional image of detected signals from an array collected by a detector. Detected signals include signals detected from array sites (e.g., 1501, 1502) and signals detected from a spatial reference feature 1503. The image depicted in FIG. 15A may contain spatial error or aberration due to properties of the optical detection system (e.g., chromatic or spherical aberration of an objective lens). A method of camera calibration, as set forth herein, may be utilized for the detector that captures the image of FIG. 15A. FIG. 15B depicts the image of FIG. 15A with spatial correction applied to the image. Spatial locations of signals have been translated from their originally-imaged location to a substantially true location based upon the determined detector model. For example, the location of the spatial reference 1503 is substantially unchanged due to minimal optical aberration of the detector. Signal 1501 is translated upward and toward the left in the corrected image due to increased optical aberration toward the edges of the image field-of-view.

Figure 15C:
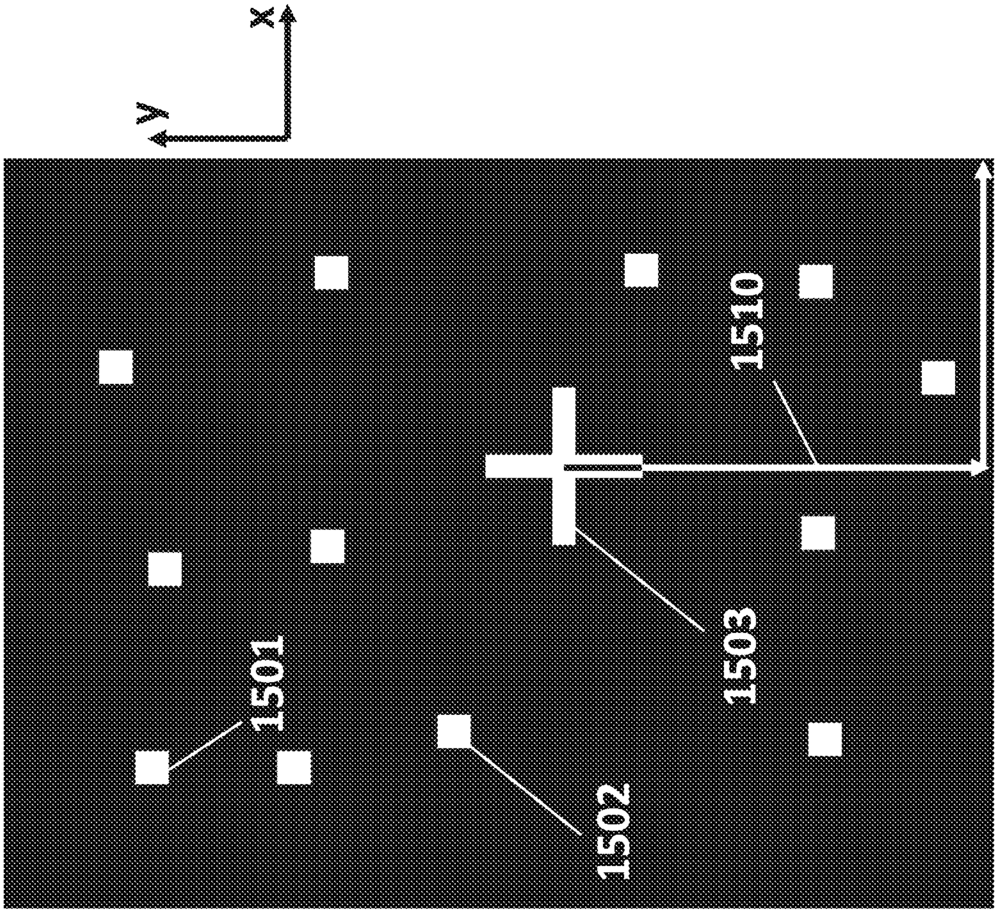
Figure 15D:
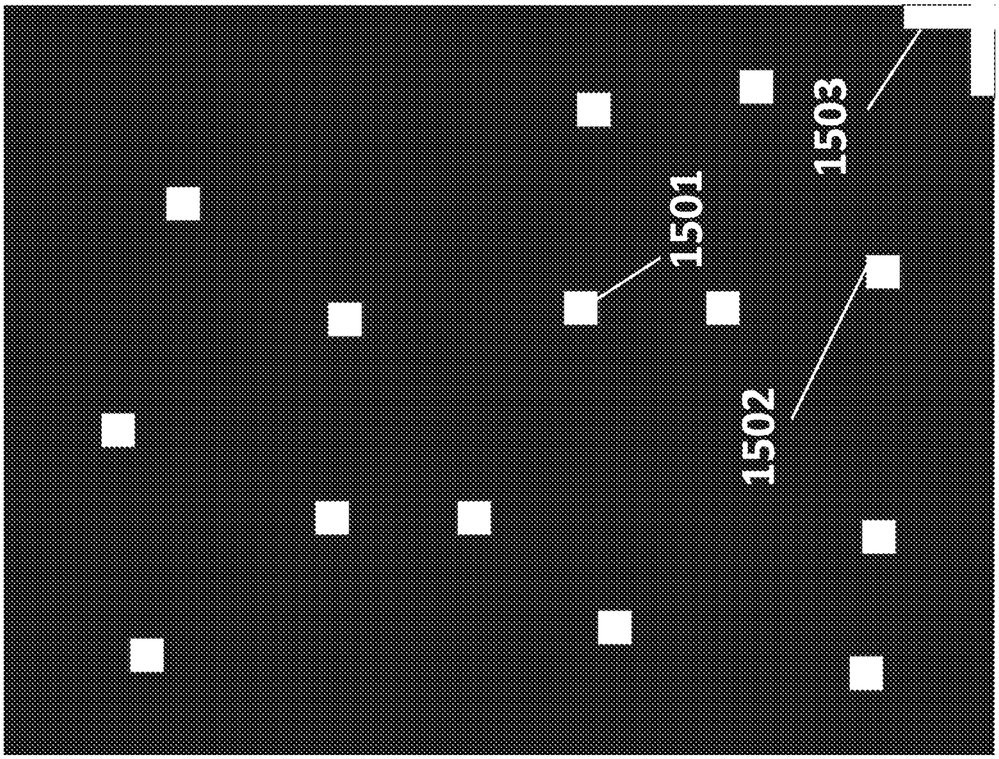

FIG. 15C depicts the corrected image of FIG. 15B with a spatial correction pathway annotated on the image. The spatial correction pathway indicates a spatial translation in the x-axis direction and a spatial translation in the y-axis direction necessary to translate the spatial reference 1503 to a desired position relative to the detector, such as the lower right corner as shown in FIG. 15C. Alternatively, a spatial correction pathway could locate the spatial reference 1503 at a centerpoint of an image, or outside a field-of-view captured in an image. FIG. 15D depicts a subsequent image captured after the array is translated with respect to the detector according to the spatial correction pathway. The spatial reference 1503 is now located at the lower right corner of the image. The image depicted in FIG. 15D may be spatially corrected based upon the detector model to ensure that the detector has captured the intended field-of-view with respect to the spatial reference 1503.

Figure 13:
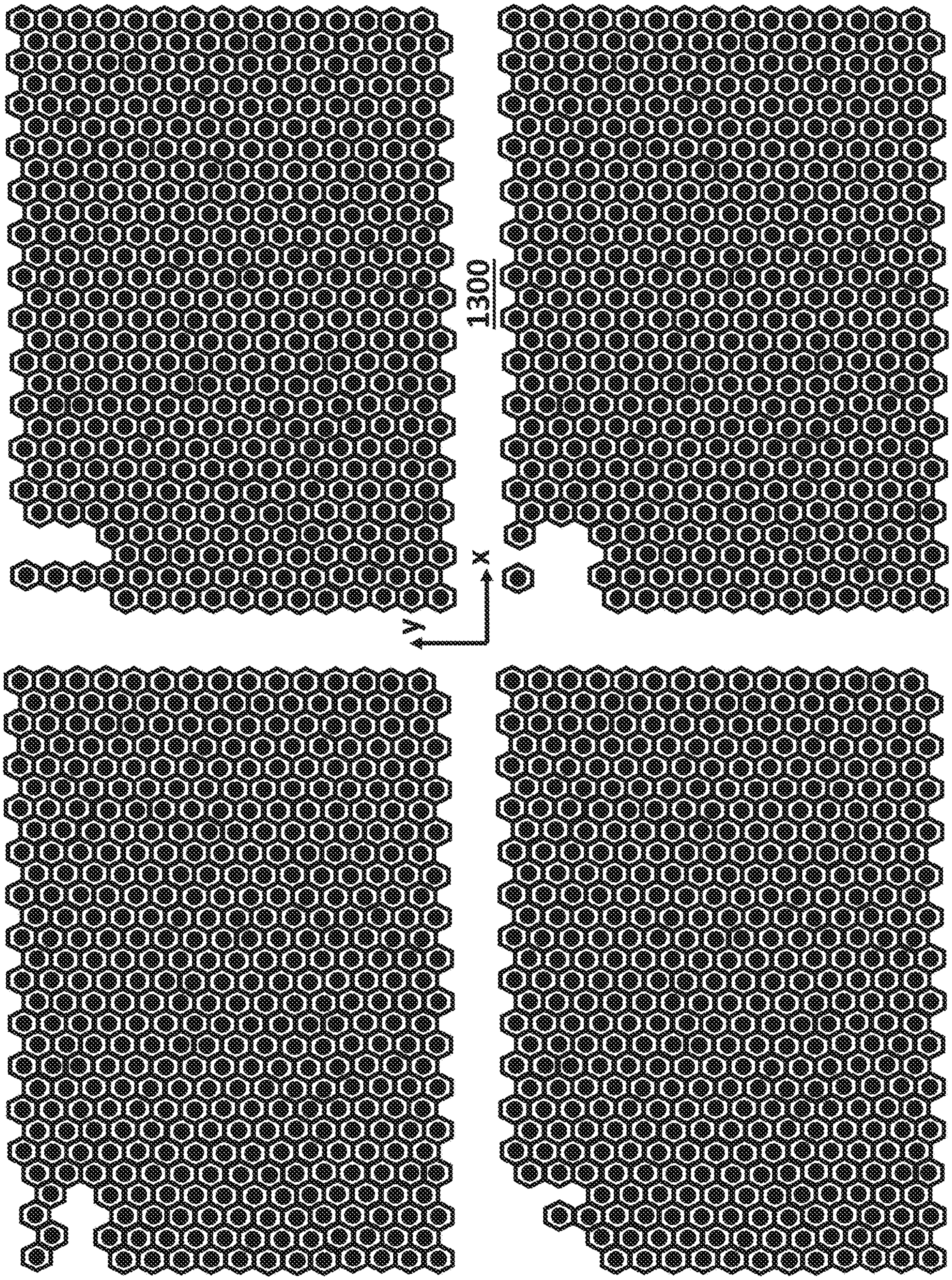
FIG. 13 depicts a region of a calibration target containing subregions with unique spatial configurations, in accordance with some embodiments.

FIG. 13 depicts a top-down view of a configuration of a region of an array that may be useful for providing spatial references. The depicted region comprises four subarrays of sites, with each subarray having a plurality of sites arranged in a hexagonal grid pattern. Each individual subarray contains a subregion at the upper left corner of the subarray containing a unique spatial arrangement of sites and vacancies. Accordingly, each individual subarray may be identifiable by detecting the spatial arrangement of sites and vacancies in the corner of the subarray, for example by a method of spatial referencing or landmarking set forth herein.

One or more parameters of a detection model may be determined before performing a method of error correction. A method of error correction may comprise adjusting an orientation of an array to account for a topographical variation of the solid support of the array. An array may have a surface topography (i.e., an orthogonal distance between a surface of the solid support of the array and a detector) that varies due to warping or manufacturing variation of the surface of a solid support, flexure or bending of the solid support, or expansion or contraction of the solid support due to spatial and/or temporal temperature variations.

A method of error correction may comprise one or more steps of: i) providing an array comprising a region that is configured to perform a method of detector calibration, as set forth herein; ii) determining one or more parameters of a detector model for a detector of an optical detection system utilizing the region of the array; iii) forming a first image of the array; iv) determining from the first image a focal quality parameter; v) based upon the focal quality parameter, altering an orientation of the array; vi) after altering the orientation of the array, forming a second image of the array; and vii) determining from the second image the focal quality parameter. In some cases, steps v)-vii) may be repeated until a threshold or optimum focal quality parameter has been measured. Altering the orientation of an array may comprise altering a tilt of an array or a solid support thereof (e.g., increasing a tilt of the array, decreasing a tilt of the array) or altering a distance between a surface of the array and the detector (e.g., an orthogonal distance between the surface of the array and a surface of the detector).

A method of error correction can include a step of determining a three-dimensional model of a surface of an array. A method may comprise the steps of: i) providing an array, as set forth herein, to a detection device comprising one or more detectors (e.g., two detectors, three detectors, four detectors, etc.), ii) individually calibrating each of the one or more detectors according to a method set forth herein, iii) performing one or more detection events of the surface of the array, iv) for at least one detection event of the one or more detection events, performing a method of error correction, as set forth herein, thereby determining a surface morphology for each region of the array surface detected in a detection event, and v) based upon the determined surface morphologies of the array surface, forming a three-dimensional model of the surface of the array. After determining a three-dimensional model of an array surface, a method may further comprise: i) aligning a region of the array surface to a detector of the detection device, ii) locating the region of the array surface in the three-dimensional model of the array surface, iii) based upon the three-dimensional model of the surface of the array, altering an orientation of the array, and iv) after altering the orientation of the array, performing a detection event of the region of the array surface on the detection device.

A method of autofocusing or error correction may comprise a step of determining a focal quality parameter. Methods of determining focal quality parameters are known in the art, including phase detection and/or contrast detection. For the array-based methods described herein, it may be useful to determine a focal-quality parameter based upon one or more signals detected from one or more addresses of the array. In some cases, a method of autofocusing or error correction may comprise an iterative process of: i) determining from a first image of an array or a region thereof a focal quality parameter; ii) based upon the focal quality parameter, altering a spatial configuration of an optical detection system (e.g., translating an objective lens or detector, translating a solid support containing the array, altering a tilt of the solid support, etc.); iii) forming a second image of the array of a region thereof, and iv) iteratively repeating steps i)-iv) until a threshold or optimum focal quality parameter is achieved.

For example, focal quality may be determined by a determining a detected size of signals detected on an array. The detected size of signals may be calculated based on a focal quality parameter such as Full Width at Half Maximum (FWHM) if the signals are substantially Gaussian point light sources. If signals in the middle of a spatially-corrected image (based upon a detector model) have a FWHM size of 3 pixels but signals on the edges of the image have a FWHM size of 4.5 pixels, the increased signal size may suggest that the edge spots are either closer or farther away from the camera and thus the flow cell is tilted or non-planar.

In another example, focal quality may be determined utilizing reprojection errors of a plurality of signals detected in an image of an array or a region thereof. Reprojection errors may be calculated from an image containing a plurality of optically-resolvable signals. Preferably, the image may be spatially-corrected by a method set forth herein based upon a detector model, and each individual signal of the plurality of optically-resolvable signals may be registered by a method set forth herein. Based upon the two-dimensional location of each individual signal in the image, the real-world (x, y) position of each spot can be determined. Each signal may be modeled as a three-dimensional point, locking the values of x and y but leaving the z-axis position undetermined, in which a least squares solver can solve for the most likely z-axis position of each individual signal. A focal quality parameter that such a solver could minimize is a sum of squared reprojection errors (e.g., the distance between the assumed 3D real-world point, projected through a camera model into a 2D point, and the detected 2D point in the image). The reprojection error may be computed for each individual optically-resolvable signal, or a subset thereof. After the least squares problem is solved, every optically-resolvable signal now has its z-axis position solved, and a tilt or morphology of the flow cell can be computed by finding a shape of best fit between the points (e.g., determining a plane or curved surface passing through two or more three-dimensional locations of corresponding optically-resolvable signals).

In some cases, a method may further comprise forming a topographical map of a solid support containing an array. Accordingly, subsequent cycles of imaging of the array may comprise automatically altering a tilt, x-axis, y-axis, or z-axis orientation of a solid support, or altering a position of an objective lens or detector relative to the solid support based upon the position of the solid support with respect to the detector and the known morphology of the solid support based upon the topographical map formed by a method of error correction set forth herein.

One or more parameters of a detection model may be determined before performing a method of pattern analysis. Pattern analysis can refer to aspects of spatial data analysis collected from an array, as set forth herein, during an assay or other interrogation of analytes of the array. In some cases, pattern analysis may comprise spatial data analysis of optical signals detected at sites containing analytes. In some cases, pattern analysis may comprise spatial data analysis of optical signals detected due to the localization of binding reagents at sites containing analytes. In some cases, pattern analysis may comprise spatial data analysis of optical signals detected due to the labeling of analytes with optically detectable labels at sites containing analytes. Accordingly, pattern analysis may comprise acquiring one or more images, in which each individual image of the one or more images comprises a plurality of spatially-resolvable signals, and in which the one or more images are acquired on a detector having a detector model determined by a method set forth herein.

A method of pattern analysis may comprise one or more steps of: i) providing an array comprising a region that is configured to perform a method of detector calibration, as set forth herein; ii) determining one or more parameters of a detector model for a detector of an optical detection system utilizing the region of the array; iii) forming an image of the array containing a plurality of optically-resolvable signals, in which each individual optically-resolvable signal of the plurality of optically-resolvable signal is detected at a unique location of the image; iv) based upon the detector model, spatially correcting the image of the array, thereby forming a corrected image; and v) identifying at locations of the corrected image presence or absence of an optically-resolvable signal. In some cases, a method may comprise a method of image registration, as set forth herein. In some cases, a method may comprise one or more additional cycles comprising steps iii)-v) (e.g., at least about 2, 5, 10, 25, 50, 75, 100, 125, 150, 200, 250, 300, 500, 1000, or more than 1000 cycles comprising steps iii)-v). In particular cases, individual cycles of a method may comprise the steps of: vi) contacting a plurality of binding reagents to the array; and vii) coupling binding reagents of the plurality of binding reagents to analytes of the array.

Polypeptide Assays

The present disclosure provides compositions, apparatus and methods that can be useful for characterizing sample components, such as proteins, nucleic acids, cells or other species, by obtaining multiple separate and non-identical measurements of the sample components. In particular configurations, the individual measurements may not, by themselves, be sufficiently accurate or specific to make the characterization, but an aggregation of the multiple non-identical measurements can allow the characterization to be made with a high degree of accuracy, specificity and confidence. For example, the multiple separate measurements can include subjecting the sample to reagents that are promiscuous with regard to recognizing multiple components of the sample. Accordingly, a first measurement carried out using a first promiscuous reagent may perceive a first subset of sample components without distinguishing one component from another. A second measurement carried out using a second promiscuous reagent may perceive a second subset of sample components, again, without distinguishing one component from another. However, a comparison of the first and second measurements can distinguish: (i) a sample component that is uniquely present in the first subset but not the second; (ii) a sample component that is uniquely present in the second subset but not the first; (iii) a sample component that is uniquely present in both the first and second subsets; or (iv) a sample component that is uniquely absent in the first and second subsets. The number of promiscuous reagents used, the number of separate measurements acquired, and degree of reagent promiscuity (e.g. the diversity of components recognized by the reagent) can be adjusted to suit the component diversity expected for a particular sample.

The present disclosure provides assays that are useful for detecting one or more analytes. Exemplary assays are set forth herein in the context of detecting proteins. Those skilled in the art will recognize that methods, compositions and apparatus set forth herein can be adapted for use with other analytes such as nucleic acids, polysaccharides, metabolites, vitamins, hormones, enzyme co-factors and others set forth herein or known in the art. Particular configurations of the methods, apparatus and compositions set forth herein can be made and used, for example, as set forth in U.S. Pat. No. 10,473,654 or US Pat. App. Pub. Nos. 2020/0318101 A1 or 2020/0286584 A1, each of which is incorporated herein by reference. Exemplary methods, systems and compositions are set forth in further detail below.

A composition, apparatus or method set forth herein can be used to characterize an analyte, or moiety thereof, with respect to any of a variety of characteristics or features including, for example, presence, absence, quantity (e.g. amount or concentration), chemical reactivity, molecular structure, structural integrity (e.g. full length or fragmented), maturation state (e.g. presence or absence of pre- or pro-sequence in a protein), location (e.g. in an analytical system, subcellular compartment, cell or natural environment), association with another analyte or moiety, binding affinity for another analyte or moiety, biological activity, chemical activity or the like. An analyte can be characterized with regard to a relatively generic characteristic such as the presence or absence of a common structural feature (e.g. amino acid sequence length, overall charge or overall pKa for a protein) or common moiety (e.g. a short primary sequence motif or post-translational modification for a protein). An analyte can be characterized with regard to a relatively specific characteristic such as a unique amino acid sequence (e.g. for the full length of the protein or a motif), an RNA or DNA sequence that encodes a protein (e.g. for the full length of the protein or a motif), or an enzymatic or other activity that identifies a protein. A characterization can be sufficiently specific to identify an analyte, for example, at a level that is considered adequate or unambiguous by those skilled in the art.

In particular configurations, a protein can be detected using one or more affinity agents having known or measurable binding affinity for the protein. For example, an affinity agent can bind a protein to form a complex and a signal produced by the complex can be detected. A protein that is detected by binding to a known affinity agent can be identified based on the known or predicted binding characteristics of the affinity agent. For example, an affinity agent that is known to selectively bind a candidate protein suspected of being in a sample, without substantially binding to other proteins in the sample, can be used to identify the candidate protein in the sample merely by observing the binding event. This one-to-one correlation of affinity agent to candidate protein can be used for identification of one or more proteins. However, as the protein complexity (i.e. the number and variety of different proteins) in a sample increases, or as the number of different candidate proteins to be identified increases, the time and resources to produce a commensurate variety of affinity agents having one-to-one specificity for the proteins approaches limits of practicality.

Methods set forth herein, can be advantageously employed to overcome these constraints. In particular configurations, the methods can be used to identify a number of different candidate proteins that exceeds the number of affinity agents used. For example, the number of candidate proteins identified can be at least 5×, 10×, 25×, 50×, 100× or more than the number of affinity agents used. This can be achieved, for example, by (1) using promiscuous affinity agents that bind to multiple different candidate proteins suspected of being present in a given sample, and (2) subjecting the protein sample to a set of promiscuous affinity agents that, taken as a whole, are expected to bind each candidate protein in a different combination, such that each candidate protein is expected to be encoded by a unique profile of binding and non-binding events. Promiscuity of an affinity agent is a characteristic that can be understood relative to a given population of proteins. Promiscuity can arise due to the affinity agent recognizing an epitope that is known to be present in a plurality of different candidate proteins suspected of being present in the given population of unknown proteins. For example, epitopes having relatively short amino acid lengths such as dimers, trimers, or tetramers can be expected to occur in a substantial number of different proteins in the human proteome. Alternatively or additionally, a promiscuous affinity agent can recognize different epitopes (e.g. epitopes differing from each other with regard to amino acid composition or sequence), the different epitopes being present in a plurality of different candidate proteins. For example, a promiscuous affinity agent that is designed or selected for its affinity toward a first trimer epitope may bind to a second epitope that has a different sequence of amino acids when compared to the first epitope.

Although performing a single binding reaction between a promiscuous affinity agent and a complex protein sample may yield ambiguous results regarding the identity of the different proteins to which it binds, the ambiguity can be resolved when the results are combined with other identifying information about those proteins. The identifying information can include characteristics of the protein such as length (i.e. number of amino acids), hydrophobicity, molecular weight, charge to mass ratio, isoelectric point, chromatographic fractionation behavior, enzymatic activity, presence or absence of post translational modifications or the like. The identifying information can include results of binding with other promiscuous affinity agents. For example, a plurality of different promiscuous affinity agents can be contacted with a complex population of proteins, wherein the plurality is configured to produce a different binding profile for each candidate protein suspected of being present in the population. In this example, each of the affinity agents can be distinguishable from the other affinity agents, for example, due to unique labeling (e.g. different affinity agents having different luminophore labels), unique spatial location (e.g. different affinity agents being located at different addresses in an array), and/or unique time of use (e.g. different affinity agents being delivered in series to a population of proteins). Accordingly, the plurality of promiscuous affinity agents produces a binding profile for each individual protein that can be decoded to identify a unique combination of epitopes present in the individual protein, and this can in turn be used to identify the individual protein as a particular candidate protein having the same or similar unique combination of epitopes. The binding profile can include observed binding events as well as observed non-binding events and this information can be evaluated in view of the expectation that particular candidate proteins produce a similar binding profile, for example, based on presence and absence of particular epitopes in the candidate proteins.

In some configurations, distinct and reproducible binding profiles may be observed for one or more unknown proteins in a sample. However, in many cases one or more binding events produces inconclusive or even aberrant results and this, in turn, can yield ambiguous binding profiles. For example, observation of binding outcome for a single-molecule binding event can be particularly prone to ambiguities due to stochasticity in the behavior of single molecules when observed using certain detection hardware. The present disclosure provides methods that provide accurate protein identification despite ambiguities and imperfections that can arise in many contexts. In some configurations, methods for identifying, quantitating or otherwise characterizing one or more proteins in a sample utilize a binding model that evaluates the likelihood or probability that one or more candidate proteins that are suspected of being present in the sample will have produced an empirically observed binding profile. The binding model can include information regarding expected binding outcomes (e.g. binding or non-binding) for binding of one or more affinity reagent with one or more candidate proteins. The information can include an a priori characteristic of a candidate protein, such as presence or absence of a particular epitope in the candidate protein or length of the candidate protein. Alternatively or additionally, the information can include empirically determined characteristics such as propensity or likelihood that the candidate protein will bind to a particular affinity reagent. Accordingly, a binding model can include information regarding the propensity or likelihood of a given candidate protein generating a false positive or false negative binding result in the presence of a particular affinity reagent, and such information can optionally be included for a plurality of affinity reagents.

Methods set forth herein can be used to evaluate the degree of compatibility of one or more empirical binding profiles with results computed for various candidate proteins using a binding model. For example, to identify an unknown protein in a sample of many proteins, an empirical binding profile for the protein can be compared to results computed by the binding model for many or all candidate proteins suspected of being in the sample. In some configurations of the methods set forth herein, identity for the unknown protein is determined based on a likelihood of the unknown protein being a particular candidate protein given the empirical binding pattern or based on the probability of a particular candidate protein generating the empirical binding pattern. Optionally a score can be determined from the measurements that are acquired for the unknown protein with respect to many or all candidate proteins suspected of being in the sample. A digital or binary score that indicates one of two discrete states can be determined. In particular configurations, the score can be non-digital or non-binary. For example, the score can be a value selected from a continuum of values such that an identity is made based on the score being above or below a threshold value. Moreover, a score can be a single value or a collection of values. Particularly useful methods for identifying proteins using promiscuous reagents, serial binding measurements and/or decoding with binding models are set forth, for example, in U.S. Pat. No. 10,473,654 US Pat. App. Pub. No. 2020/0318101 A1 or Egertson et al., BioRxiv (2021), DOI: 10.1101/2021.10.11.463967, each of which is incorporated herein by reference.

The present disclosure provides compositions, apparatus and methods for detecting one or more proteins. A protein can be detected using one or more affinity agents having binding affinity for the protein. The affinity agent and the protein can bind each other to form a complex and, during or after formation, the complex can be detected. The complex can be detected directly, for example, due to a label that is present on the affinity agent or protein. In some configurations, the complex need not be directly detected, for example, in formats where the complex is formed and then the affinity agent, protein, or a label component that was present in the complex is detected.

Many protein detection methods, such as enzyme linked immunosorbent assay (ELISA), achieve high-confidence characterization of one or more protein in a sample by exploiting high specificity binding of antibodies, aptamers or other binding agents to the protein(s) and detecting the binding event while ignoring all other proteins in the sample. ELISA is generally carried out at low plex scale (e.g. from one to a hundred different proteins detected in parallel or in succession) but can be used at higher plexity. ELISA methods can be carried out by detecting immobilized binding agents and/or proteins in multiwell plates, on arrays, or on particles in microfluidic devices. Exemplary plate-based methods include, for example, the MULTI-ARRAY technology commercialized by MesoScale Diagnostics (Rockville, Maryland) or Simple Plex technology commercialized by Protein Simple (San Jose, CA). Exemplary, array-based methods include, but are not limited to those utilizing Simoa® Planar Array Technology or Simoa® Bead Technology, commercialized by Quanterix (Billerica, MA). Further exemplary array-based methods are set forth in U.S. Pat. Nos. 9,678,068; 9,395,359; 8,415,171; 8,236,574; or 8,222,047, each of which is incorporated herein by reference. Exemplary microfluidic detection methods include those commercialized by Luminex (Austin, Texas) under the trade name xMAP® technology or used on platforms identified as MAGPIX®, LUMINEX® 100/200 or FEXMAP 3D®.

Other detection methods that can also be used, for example at low plex scale, include procedures that employ SOMAmer reagents and SOMAscan assays commercialized by Soma Logic (Boulder, CO). In one configuration, a sample is contacted with aptamers that are capable of binding proteins with specificity for the amino acid sequence of the proteins. The resulting aptamer-protein complexes can be separated from other sample components, for example, by attaching the complexes to beads (or other solid support) that are removed from other sample components. The aptamers can then be isolated and, because the aptamers are nucleic acids, the aptamers can be detected using any of a variety of methods known in the art for detecting nucleic acids, including for example, hybridization to nucleic acid arrays, PCR-based detection, or nucleic acid sequencing. Exemplary methods and compositions are set forth in U.S. Pat. Nos. 7,855,054; 7,964,356; 8,404,830; 8,945,830; 8,975,026; 8,975,388; 9,163,056; 9,938,314; 9,404,919; 9,926,566; 10,221,421; 10,239,908; 10,316,321 10,221,207 or 10,392,621, each of which is incorporated herein by reference.

In some detection assays, a protein can be cyclically modified and the modified products from individual cycles can be detected. In some configurations, a protein can be sequenced by a sequential process in which each cycle includes steps of detecting the protein and removing one or more terminal amino acids from the protein. Optionally, one or more of the steps can include adding a label to the protein, for example, at the amino terminal amino acid or at the carboxy terminal amino acid. In particular configurations, a method of detecting a protein can include steps of (i) exposing a terminal amino acid on the protein; (ii) detecting a change in signal from the protein; and (iii) identifying the type of amino acid that was removed based on the change detected in step (ii). The terminal amino acid can be exposed, for example, by removal of one or more amino acids from the amino terminus or carboxyl terminus of the protein. Steps (i) through (iii) can be repeated to produce a series of signal changes that is indicative of the sequence for the protein.

In a first configuration of a cyclical protein detection method, one or more types of amino acids in the protein can be attached to a label that uniquely identifies the type of amino acid. In this configuration, the change in signal that identifies the amino acid can be loss of signal from the respective label. For example, lysines can be attached to a distinguishable label such that loss of the label indicates removal of a lysine. Alternatively or additionally, other amino acid types can be attached to other labels that are mutually distinguishable from lysine and from each other. For example, lysines can be attached to a first label and cysteines can be attached to a second label, the first and second labels being distinguishable from each other. Exemplary compositions and techniques that can be used to remove amino acids from a protein and detect signal changes are those set forth in Swaminathan et al., Nature Biotech. 36:1076-1082 (2018); or U.S. Pat. No. 9,625,469 or 10,545,153, each of which is incorporated herein by reference. Methods and apparatus under development by Erisyon, Inc. (Austin, TX) may also be useful for detecting proteins.

In a second configuration of a cyclical protein detection method, a terminal amino acid of a protein can be recognized by an affinity agent that is specific for the terminal amino acid or specific for a label moiety that is present on the terminal amino acid. The affinity agent can be detected on the array, for example, due to a label on the affinity agent. Optionally, the label is a nucleic acid barcode sequence that is added to a primer nucleic acid upon formation of a complex. For example, a barcode can be added to the primer via ligation of an oligonucleotide having the barcode sequence or polymerase extension directed by a template that encodes the barcode sequence. The formation of the complex and identity of the terminal amino acid can be determined by decoding the barcode sequence. Multiple cycles can produce a series of barcodes that can be detected, for example, using a nucleic acid sequencing technique. Exemplary affinity agents and detection methods are set forth in US Pat. App. Pub. No. 2019/0145982 A1; 2020/0348308 A1; or 2020/0348307 A1, each of which is incorporated herein by reference. Methods and apparatus under development by Encodia, Inc. (San Diego, CA) may also be useful for detecting proteins.

Cyclical removal of terminal amino acids from a protein can be carried out using an Edman-type sequencing reaction in which a phenyl isothiocyanate reacts with a N-terminal amino group under mildly alkaline conditions (e.g. about pH 8) to form a cyclical phenylthiocarbamoyl Edman complex derivative. The phenyl isothiocyanate may be substituted or unsubstituted with one or more functional groups, linker groups, or linker groups containing functional groups. An Edman-type sequencing reaction can include variations to reagents and conditions that yield a detectable removal of amino acids from a protein terminus, thereby facilitating determination of the amino acid sequence for a protein or portion thereof. For example, the phenyl group can be replaced with at least one aromatic, heteroaromatic or aliphatic group which may participate in an Edman-type sequencing reaction, non-limiting examples including: pyridine, pyrimidine, pyrazine, pyridazoline, fused aromatic groups such as naphthalene and quinoline), methyl or other alkyl groups or alkyl group derivatives (e.g., alkenyl, alkynyl, cyclo-alkyl). Under certain conditions, for example, acidic conditions of about pH 2, derivatized terminal amino acids may be cleaved, for example, as a thiazolinone derivative. The thiazolinone amino acid derivative under acidic conditions may form a more stable phenylthiohydantoin (PTH) or similar amino acid derivative which can be detected. This procedure can be repeated iteratively for residual protein to identify the subsequent N-terminal amino acid. Many variations of Edman-type degradation have been described and may be used including, for example, a one-step removal of an N-terminal amino acid using alkaline conditions (Chang, J. Y., FEBS LETTS., 1978, 91(1), 63-68). In some cases, Edman-type reactions may be thwarted by N-terminal modifications which may be selectively removed, for example, N-terminal acetylation or formylation (e.g., see Gheorghe M. T., Bergman T. (1995) in Methods in Protein Structure Analysis, Chapter 8: Deacetylation and internal cleavage of Proteins for N-terminal Sequence Analysis. Springer, Boston, MA. https://doi.org/10.1007/978-1-4899-1031-8_8).

Non-limiting examples of functional groups for substituted phenyl isothiocyanate may include ligands (e.g. biotin and biotin analogs) for known receptors, labels such as luminophores, or reactive groups such as click functionalities (e.g. compositions having an azide or acetylene moiety). The functional group may be a DNA, RNA, peptide or small molecule barcode or other tag which may be further processed and/or detected.

The removal of an amino terminal amino acid using Edman-type processes can utilize at least two main steps, the first step includes reacting an isothiocyanate or equivalent with protein N-terminal residues to form a relatively stable Edman complex, for example, a phenylthiocarbamoyl complex. The second step can include removing the derivatized N-terminal amino acid, for example, via heating. The protein, now having been shortened by one amino acid, may be detected, for example, by contacting the protein with a labeled affinity agent that is complementary to the amino terminus and examining the protein for binding to the agent, or by detecting loss of a label that was attached to the removed amino acid.

Edman-type processes can be carried out in a multiplex format to detect, characterize or identify a plurality of proteins. A method of detecting a protein can include steps of (i) exposing a terminal amino acid on a protein at an address of an array; (ii) binding an affinity agent to the terminal amino acid, where the affinity agent includes a nucleic acid tag, and where a primer nucleic acid is present at the address; (iii) extending the primer nucleic acid, thereby producing an extended primer having a copy of the tag; and (iv) detecting the tag of the extended primer. The terminal amino acid can be exposed, for example, by removal of one or more amino acids from the amino terminus or carboxyl terminus of the protein. Steps (i) through (iv) can be repeated to produce a series of tags that is indicative of the sequence for the protein. The method can be applied to a plurality of proteins on the array and in parallel. Whatever the plexity, the extending of the primer can be carried out, for example, by polymerase-based extension of the primer, using the nucleic acid tag as a template. Alternatively, the extending of the primer can be carried out, for example, by ligase- or chemical-based ligation of the primer to a nucleic acid that is hybridized to the nucleic acid tag. The nucleic acid tag can be detected via hybridization to nucleic acid probes (e.g. in an array), amplification-based detections (e.g. PCR-based detection, or rolling circle amplification-based detection) or nuclei acid sequencing (e.g. cyclical reversible terminator methods, nanopore methods, or single molecule, real time detection methods). Exemplary methods that can be used for detecting proteins using nucleic acid tags are set forth in US Pat. App. Pub. No. 2019/0145982 A1; 2020/0348308 A1; or 2020/0348307 A1, each of which is incorporated herein by reference.

A protein can optionally be detected based on its enzymatic or biological activity. For example, a protein can be contacted with a reactant that is converted to a detectable product by an enzymatic activity of the protein. In other assay formats, a first protein having a known enzymatic function can be contacted with a second protein to determine if the second protein changes the enzymatic function of the first protein. As such, the first protein serves as a reporter system for detection of the second protein. Exemplary changes that can be observed include, but are not limited to, activation of the enzymatic function, inhibition of the enzymatic function, attenuation of the enzymatic function, degradation of the first protein or competition for a reactant or cofactor used by the first protein. Proteins can also be detected based on their binding interactions with other molecules such as proteins, nucleic acids, nucleotides, metabolites, hormones, vitamins, small molecules that participate in biological signal transduction pathways, biological receptors or the like. For example, a protein that participates in a signal transduction pathway can be identified as a particular candidate protein by detecting binding to a second protein that is known to be a binding partner for the candidate protein in the pathway.

The presence or absence of post-translational modifications (PTM) can be detected using a composition, apparatus or method set forth herein. A PTM can be detected using an affinity agent that recognizes the PTM or based on a chemical property of the PTM. Exemplary PTMs that can be detected, identified or characterized include, but are not limited to, myristoylation, palmitoylation, isoprenylation, prenylation, farnesylation, geranylgeranylation, lipoylation, flavin moiety attachment, Heme C attachment, phosphopantetheinylation, retinylidene Schiff base formation, dipthamide formation, ethanolamine phosphoglycerol attachment, hypusine, beta-Lysine addition, acylation, acetylation, deacetylation, formylation, alkylation, methylation, C-terminal amidation, arginylation, polyglutamylation, polyglyclyation, butyrylation, gamma-carboxylation, glycosylation, glycation, polysialylation, malonylation, hydroxylation, iodination, nucleotide addition, phosphoate ester formation, phosphoramidate formation, phosphorylation, adenylylation, uridylylation, propionylation, pyrolglutamate formation, S-glutathionylation, S-nitrosylation, S-sulfenylation, S-sulfinylation, S-sulfonylation, succinylation, sulfation, glycation, carbamylation, carbonylation, isopeptide bond formation, biotinylation, carbamylation, oxidation, reduction, pegylation, ISGylation, SUMOylation, ubiquitination, neddylation, pupylation, citrullination, deamidation, elminylation, disulfide bridge formation, proteolytic cleavage, isoaspartate formation, racemization, and protein splicing.

PTMs may occur at particular amino acid residues of a protein. For example, the phosphate moiety of a particular proteoform can be present on a serine, threonine, tyrosine, histidine, cysteine, lysine, aspartate or glutamate residue of the protein. In other examples, an acetyl moiety can be present on the N-terminus or on a lysine; a serine or threonine residue can have an O-linked glycosyl moiety; an asparagine residue can have an N-linked glycosyl moiety; a proline, lysine, asparagine, aspartate or histidine amino acid can be hydroxylated; an arginine or lysine residue can be methylated; or the N-terminal methionine or at a lysine amino acid can be ubiquitinated.

In some configurations of the apparatus and methods set forth herein, one or more proteins can be detected on a solid support. For example, protein(s) can be coupled to a support, the support can be contacted with detection agents (e.g. affinity agents) in solution, the agents can interact with the protein(s), thereby producing a detectable signal, and then the signal can be detected to determine the presence of the protein(s). In multiplexed versions of this approach, different proteins can be coupled to different addresses in an array, and the probing and detection steps can occur in parallel. In another example, affinity agents can be coupled to a solid support, the support can be contacted with proteins in solution, the proteins can interact with the affinity agents, thereby producing a detectable signal, and then the signal can be detected to determine presence, quantity or characteristics of the proteins. This approach can also be multiplexed by coupling different affinity agents to different addresses of an array.

Proteins, affinity agents or other objects of interest can be coupled to a solid support via covalent or non-covalent bonds. For example, a linker can be used to covalently couple a protein or other object of interest to an array. A particularly useful linker is a structured nucleic acid particle such as a nucleic acid nanoball (e.g. a concatemeric amplicon produced by rolling circle replication of a circular nucleic acid template) or a nucleic acid origami. For example, a plurality of proteins can be conjugated to a plurality of structured nucleic acid particles, such that each protein-conjugated particle forms an address in the array. Exemplary linkers for coupling proteins, or other objects of interest, to an array or other solid support are set forth in US Pat. App. Pub. No. 2021/0101930 A1, which is incorporated herein by reference.

A protein can be detected based on proximity of two or more affinity agents. For example, the two affinity agents can include two components each: a receptor component and a nucleic acid component. When the affinity agents bind in proximity to each other, for example, due to ligands for the respective receptors being on a single protein, or due to the ligands being present on two proteins that associate with each other, the nucleic acids can interact to cause a modification that is indicative of the two ligands being in proximity. Optionally, the modification can be polymerase catalyzed extension of one of the nucleic acids using the other nucleic acid as a template. As another option, one of the nucleic acids can form a template that acts as splint to position other nucleic acids for ligation to an oligonucleotide. Exemplary methods are commercialized by Olink Proteomics AB (Uppsala Sweden) or set forth in U.S. Pat. Nos. 7,306,904; 7,351,528; 8,013,134; 8,268,554 or 9,777,315, each of which is incorporated herein by reference.

A method or apparatus of the present disclosure can optionally be configured for optical detection (e.g. luminescence detection). Analytes or other entities can be detected, and optionally distinguished from each other, based on measurable characteristics such as the wavelength of radiation that excites a luminophore, the wavelength of radiation emitted by a luminophore, the intensity of radiation emitted by a luminophore (e.g. at particular detection wavelength (s)), luminescence lifetime (e.g. the time that a luminophore remains in an excited state) or luminescence polarity. Other optical characteristics that can be detected, and optionally used to distinguish analytes, include, for example, absorbance of radiation, resonance Raman, radiation scattering, or the like. A luminophore can be an intrinsic moiety of a protein or other analyte to be detected, or the luminophore can be an exogenous moiety that has been synthetically added to a protein or other analyte.

A method or apparatus of the present disclosure can use a light sensing device that is appropriate for detecting a characteristic set forth herein or known in the art. Particularly useful components of a light sensing device can include, but are not limited to, optical sub-systems or components used in nucleic acid sequencing systems. Examples of useful sub systems and components thereof are set forth in US Pat. App. Pub. No. 2010/0111768 A1 or U.S. Pat. Nos. 7,329,860; 8,951,781 or 9,193,996, each of which is incorporated herein by reference. Other useful light sensing devices and components thereof are described in U.S. Pat. Nos. 5,888,737; 6,175,002; 5,695,934; 6,140,489; or 5,863,722; or US Pat. Pub. Nos. 2007/007991 A1, 2009/0247414 A1, or 2010/0111768; or WO2007/123744, each of which is incorporated herein by reference. Light sensing devices and components that can be used to detect luminophores based on luminescence lifetime are described, for example, in U.S. Pat. Nos. 9,678,012; 9,921,157; 10,605,730; 10,712,274; 10,775,305; or 10,895,534, each of which is incorporated herein by reference.

Luminescence lifetime can be detected using an integrated circuit having a photodetection region configured to receive incident photons and produce a plurality of charge carriers in response to the incident photons. The integrated circuit can include at least one charge carrier storage region and a charge carrier segregation structure configured to selectively direct charge carriers of the plurality of charge carriers directly into the charge carrier storage region based upon times at which the charge carriers are produced. See, for example, U.S. Pat. Nos. 9,606,058, 10,775,305, and 10,845,308, each of which is incorporated herein by reference. Optical sources that produce short optical pulses can be used for luminescence lifetime measurements. For example, a light source, such as a semiconductor laser or LED, can be driven with a bipolar waveform to generate optical pulses with FWHM durations as short as approximately 85 ps having suppressed tail emission. See, for example, in U.S. Pat. No. 10,605,730, which is incorporated herein by reference.

For configurations that use optical detection (e.g. luminescent detection), one or more analytes (e.g. proteins) may be immobilized on a surface, and this surface may be scanned with a microscope to detect any signal from the immobilized analytes. The microscope itself may include a digital camera or other luminescence detector configured to record, store, and analyze the data collected during the scan. A luminescence detector of the present disclosure can be configured for epiluminescent detection, total internal reflection (TIR) detection, waveguide assisted excitation, or the like.

A light sensing device may be based upon any suitable technology, and may be, for example, a charged coupled device (CCD) sensor that generates pixilated image data based upon photons impacting locations in the device. It will be understood that any of a variety of other light sensing devices may also be used including, but not limited to, a detector array configured for time delay integration (TDI) operation, a complementary metal oxide semiconductor (CMOS) detector, an avalanche photodiode (APD) detector, a Geiger-mode photon counter, a photomultiplier tube (PMT), charge injection device (CID) sensors, JOT image sensor (Quanta), or any other suitable detector. Light sensing devices can optionally be coupled with one or more excitation sources, for example, lasers, light emitting diodes (LEDs), arc lamps or other energy sources known in the art.

An optical detection system can be configured for single molecule detection. For example, waveguides or optical confinements can be used to deliver excitation radiation to locations of a solid support where analytes are located. Zero-mode waveguides can be particularly useful, examples of which are set forth in U.S. Pat. Nos. 7,181,122, 7,302,146, or 7,313,308, each of which is incorporated herein by reference. Analytes can be confined to surface features, for example, to facilitate single molecule resolution. For example, analytes can be distributed into wells having nanometer dimensions such as those set forth in U.S. Pat. No. 7,122,482 or 8,765,359, or US Pat. App. Pub. No 2013/0116153 A1, each of which is incorporated herein by reference. The wells can be configured for selective excitation, for example, as set forth in U.S. Pat. No. 8,798,414 or 9,347,829, each of which is incorporated herein by reference. Analytes can be distributed to nanometer-scale posts, such as high aspect ratio posts which can optionally be dielectric pillars that extend through a metallic layer to improve detection of an analyte coupled to the pillar. See, for example, U.S. Pat. Nos. 8,148,264, 9,410,887 or 9,987,609, each of which is incorporated herein by reference. Further examples of nanostructures that can be used to detect analytes are those that change state in response to the concentration of analytes such that the analytes can be quantitated as set forth in WO 2020/176793 A1, which is incorporated herein by reference.

An apparatus or method set forth herein need not be configured for optical detection. For example, an electronic detector can be used for detection of protons or charged labels (see, for example, US Pat. App. Pub. Nos. 2009/0026082 A1; 2009/0127589 A1; 2010/0137143 A1; or 2010/0282617 A1, each of which is incorporated herein by reference in its entirety). A field effect transistor (FET) can be used to detect analytes or other entities, for example, based on proximity of a field disrupting moiety to the FET. The field disrupting moiety can be due to an extrinsic label coupled to an analyte or affinity agent, or the moiety can be intrinsic to the analyte or affinity agent being used. Surface plasmon resonance can be used to detect binding of analytes or affinity agents at or near a surface. Exemplary sensors and methods for coupling molecules to sensors are set forth in US Pat. App. Pub. Nos. 2017/0240962 A1; 2018/0051316 A1; 2018/0112265 A1; 2018/0155773 A1 or 2018/0305727 A1; or U.S. Pat. Nos. 9,164,053; 9,829,456; 10,036,064, each of which is incorporated herein by reference.

In some configurations of the compositions, apparatus and methods set forth herein, one or more proteins can be present on a solid support, where the proteins can optionally be detected. For example, a protein can be coupled to a solid support, the solid support can be contacted with a detection agent (e.g. affinity agent) in solution, the affinity agent can interact with the protein, thereby producing a detectable signal, and then the signal can be detected to determine the presence, absence, quantity, a characteristic or identity of the protein. In multiplexed versions of this approach, different proteins can be coupled to different addresses in an array, and the detection steps can occur in parallel, such that proteins at each address are detected, quantified, characterized or identified. In another example, detection agents can be coupled to a solid support, the support can be contacted with proteins in solution, the proteins can interact with the detection agents, thereby producing a detectable signal, and then the signal can be detected to determine the presence of the proteins. This approach can also be multiplexed by coupling different probes to different addresses of an array.

In multiplexed configurations, different proteins can be coupled to different unique identifiers (e.g. addresses in an array), and the proteins can be manipulated and detected in parallel. For example, a fluid containing one or more different affinity agents can be delivered to an array such that the proteins of the array are in simultaneous contact with the affinity agent(s). Moreover, a plurality of addresses can be observed in parallel allowing for rapid detection of binding events. A plurality of different proteins can have a complexity of at least 5, 10, 100, $1\times10^3$, $1\times10^4$, $1\times10^1$ or more different native-length protein primary sequences. Alternatively or additionally, a proteome, proteome subfraction or other protein sample that is analyzed in a method set forth herein can have a complexity that is at most $1\times10^1$, $1\times10^4$, $1\times10^3$, 100, 10, 5 or fewer different native-length protein primary sequences. The total number of proteins of a sample that is detected, characterized or identified can differ from the number of different primary sequences in the sample, for example, due to the presence of multiple copies of at least some protein species. Moreover, the total number of proteins of a sample that is detected, characterized or identified can differ from the number of candidate proteins suspected of being in the sample, for example, due to the presence of multiple copies of at least some protein species, absence of some proteins in a source for the sample, or loss of some proteins prior to analysis.

A protein can be coupled to a unique identifier using any of a variety of means. The coupling can be covalent or non-covalent. Exemplary covalent attachments include chemical linkers such as those achieved using click chemistry or other linkages known in the art or described in U.S. patent application Ser. No. 17/062,405, which is incorporated herein by reference. Non-covalent attachment can be mediated by receptor-ligand interactions (e.g. (strept)avidin-biotin, antibody-antigen, or complementary nucleic acid strands), for example, wherein the receptor is attached to the unique identifier and the ligand is attached to the protein or vice versa. In particular configurations, a protein is coupled to a solid support (e.g. an address in an array) via a structured nucleic acid particle (SNAP). A protein can be coupled to a SNAP and the SNAP can interact with a solid support, for example, by non-covalent interactions of the DNA with the support and/or via covalent linkage of the SNAP to the support. Nucleic acid origami or nucleic acid nanoballs are particularly useful. The use of SNAPs and other moieties to couple proteins to unique identifiers such as tags or addresses in an array are set forth in U.S. patent application Ser. Nos. 17/062,405 and 63/159,500, each of which is incorporated herein by reference.

The methods, compositions and apparatus of the present disclosure are particularly well suited for use with proteins. Although proteins are exemplified throughout the present disclosure, it will be understood that other analytes can be similarly used. Exemplary analytes include, but are not limited to, biomolecules, polysaccharides, nucleic acids, lipids, metabolites, hormones, vitamins, enzyme cofactors, therapeutic agents, candidate therapeutic agents or combinations thereof. An analyte can be a non-biological atom or molecule, such as a synthetic polymer, metal, metal oxide, ceramic, semiconductor, mineral, or a combination thereof.

One or more proteins that are used in a method, composition or apparatus herein, can be derived from a natural or synthetic source. Exemplary sources include, but are not limited to biological tissues, fluids, cells or subcellular compartments (e.g. organelles). For example, a sample can be derived from a tissue biopsy, biological fluid (e.g. blood, sweat, tears, plasma, extracellular fluid, urine, mucus, saliva, semen, vaginal fluid, synovial fluid, lymph, cerebrospinal fluid, peritoneal fluid, pleural fluid, amniotic fluid, intracellular fluid, extracellular fluid, etc.), fecal sample, hair sample, cultured cell, culture media, fixed tissue sample (e.g. fresh frozen or formalin-fixed paraffin-embedded) or product of a protein synthesis reaction. A protein source may include any sample where a protein is a native or expected constituent. For example, a primary source for a cancer biomarker protein may be a tumor biopsy sample or bodily fluid. Other sources include environmental samples or forensic samples.

Exemplary organisms from which proteins or other analytes can be derived include, for example, a mammal such as a rodent, mouse, rat, rabbit, guinea pig, ungulate, horse, sheep, pig, goat, cow, cat, dog, primate, non-human primate or human; a plant such as *Arabidopsis thaliana*, tobacco, corn, sorghum, oat, wheat, rice, canola, or soybean; an algae such as *Chlamydomonas reinhardtii*; a nematode such as *Caenorhabditis elegans*; an insect such as *Drosophila melanogaster*, mosquito, fruit fly, honey bee or spider; a fish such as zebrafish; a reptile; an amphibian such as a frog or *Xenopus laevis*; a *Dictyostelium discoideum*; a fungi such as *Pneumocystis carinii, Takifugu rubripes*, yeast, *Saccharomyces cerevisiae* or *Schizosaccharomyces pombe*; or a *Plasmodium falciparum*. Proteins can also be derived from a prokaryote such as a bacterium, *Escherichia coli*, staphylococci or *Mycoplasma pneumoniae*; an archae; a virus such as Hepatitis C virus, influenza virus, coronavirus, or human immunodeficiency virus; or a viroid. Proteins can be derived from a homogeneous culture or population of the above organisms or alternatively from a collection of several different organisms, for example, in a community or ecosystem.

In some cases, a protein or other biomolecule can be derived from an organism that is collected from a host organism. For example, a protein may be derived from a parasitic, pathogenic, symbiotic, or latent organism collected from a host organism. A protein can be derived from an organism, tissue, cell or biological fluid that is known or suspected of being linked with a disease state or disorder (e.g., cancer). Alternatively, a protein can be derived from an organism, tissue, cell or biological fluid that is known or suspected of not being linked to a particular disease state or disorder. For example, the proteins isolated from such a source can be used as a control for comparison to results acquired from a source that is known or suspected of being linked to the particular disease state or disorder. A sample may include a microbiome or substantial portion of a microbiome. In some cases, one or more proteins used in a method, composition or apparatus set forth herein may be obtained from a single source and no more than the single source. The single source can be, for example, a single organism (e.g. an individual human), single tissue, single cell, single organelle (e.g. endoplasmic reticulum, Golgi apparatus or nucleus), or single protein-containing particle (e.g., a viral particle or vesicle).

A method, composition or apparatus of the present disclosure can use or include a plurality of proteins having any of a variety of compositions such as a plurality of proteins composed of a proteome or fraction thereof. For example, a plurality of proteins can include solution-phase proteins, such as proteins in a biological sample or fraction thereof, or a plurality of proteins can include proteins that are immobilized, such as proteins coupled to a particle or solid support. By way of further example, a plurality of proteins can include proteins that are detected, analyzed or identified in connection with a method, composition or apparatus of the present disclosure. The content of a plurality of proteins can be understood according to any of a variety of characteristics such as those set forth below or elsewhere herein.

A plurality of proteins can be characterized in terms of total protein mass. The total mass of protein in a liter of plasma has been estimated to be 70 g and the total mass of protein in a human cell has been estimated to be between 100 pg and 500 pg depending upon cells type. See Wisniewski et al. Molecular & Cellular Proteomics 13:10.1074/mcp.M113.037309, 3497-3506 (2014), which is incorporated herein by reference. A plurality of proteins used or included in a method, composition or apparatus set forth herein can include at least 1 pg, 10 pg, 100 pg, 1 ng, 10 ng, 100 ng, 1 μg, 10 μg, 100 μg, 1 mg, 10 mg, 100 mg or more protein by mass. Alternatively or additionally, a plurality of proteins may contain at most 100 mg, 10 mg, 1 mg, 100 μg, 10 μg, 1 μg, 100 ng, 10 ng, 1 ng, 100 pg, 10 pg, 1 pg or less protein by mass.

A plurality of proteins can be characterized in terms of percent mass relative to a given source such as a biological source (e.g. cell, tissue, or biological fluid such as blood). For example, a plurality of proteins may contain at least 60%, 75%, 90%, 95%, 99%, 99.9% or more of the total protein mass present in the source from which the plurality of proteins was derived. Alternatively or additionally, a plurality of proteins may contain at most 99.9%, 99%, 95%, 90%, 75%, 60% or less of the total protein mass present in the source from which the plurality of proteins was derived.

A plurality of proteins can be characterized in terms of total number of protein molecules. The total number of protein molecules in a *Saccharomyces cerevisiae* cell has been estimated to be about 42 million protein molecules. See Ho et al., Cell Systems (2018), DOI: 10.1016/j.cels.2017.12.004, which is incorporated herein by reference. A plurality of proteins used or included in a method, composition or apparatus set forth herein can include at least 1 protein molecule, 10 protein molecules, 100 protein molecules, $1\times10^4$ protein molecules, $1\times10^6$ protein molecules, $1\times10^8$ protein molecules, $1\times10^{10}$ protein molecules, 1 mole ($6.02214076\times10^{23}$ molecules) of protein, 10 moles of protein molecules, 100 moles of protein molecules or more. Alternatively or additionally, a plurality of proteins may contain at most 100 moles of protein molecules, 10 moles of protein molecules, 1 mole of protein molecules, $1\times10^{10}$ protein molecules, $1\times10^8$ protein molecules, $1\times10^6$ protein molecules, $1\times10^4$ protein molecules, 100 protein molecules, 10 protein molecules, 1 protein molecule or less.

A plurality of proteins can be characterized in terms of the variety of full-length primary protein structures in the plurality. For example, the variety of full-length primary protein structures in a plurality of proteins can be equated with the number of different protein-encoding genes in the source for the plurality of proteins. Whether or not the proteins are derived from a known genome or from any genome at all, the variety of full-length primary protein structures can be counted independent of presence or absence of post translational modifications in the proteins. A human proteome is estimated to have about 20,000 different protein-encoding genes such that a plurality of proteins derived from a human can include up to about 20,000 different primary protein structures. See Aebersold et al., *Nat. Chem. Biol.* 14:206-214 (2018), which is incorporated herein by reference. Other genomes and proteomes in nature are known to be larger or smaller. A plurality of proteins used or included in a method, composition or apparatus set forth herein can have a complexity of at least 2, 5, 10, 100, $1\times10^3$, $1\times10^4$, $2\times10^4$, $3\times10^4$ or more different full-length primary protein structures. Alternatively or additionally, a plurality of proteins can have a complexity that is at most $3\times10^4$, $2\times10^4$, $1\times10^4$, $1\times10^3$, 100, 10, 5, 2 or fewer different full-length primary protein structures.

In relative terms, a plurality of proteins used or included in a method, composition or apparatus set forth herein may contain at least one representative for at least 60%, 75%, 90%, 95%, 99%, 99.9% or more of the proteins encoded by the genome of a source from which the sample was derived. Alternatively or additionally, a plurality of proteins may contain a representative for at most 99.9%, 99%, 95%, 90%, 75%, 60% or less of the proteins encoded by the genome of a source from which the sample was derived.

A plurality of proteins can be characterized in terms of the variety of primary protein structures in the plurality including transcribed splice variants. The human proteome has been estimated to include about 70,000 different primary protein structures when splice variants ae included. See Aebersold et al., Nat. Chem. Biol. 14:206-214 (2018), which is incorporated herein by reference. Moreover, the number of the partial-length primary protein structures can increase due to fragmentation that occurs in a sample. A plurality of proteins used or included in a method, composition or apparatus set forth herein can have a complexity of at least 2, 5, 10, 100, $1\times10^3$, $1\times10^4$, $7\times10^4$, $1\times10^1$, $1\times10^6$ or more different primary protein structures. Alternatively or additionally, a plurality of proteins can have a complexity that is at most $1\times10^6$, $1\times10^5$, $7\times10^4$, $1\times10^4$, $1\times10^3$, 100, 10, 5, 2 or fewer different primary protein structures.

A plurality of proteins can be characterized in terms of the variety of protein structures in the plurality including different primary structures and different proteoforms among the primary structures. Different molecular forms of proteins expressed from a given gene are considered to be different proteoforms. Protoeforms can differ, for example, due to differences in primary structure (e.g. shorter or longer amino acid sequences), different arrangement of domains (e.g. transcriptional splice variants), or different post translational modifications (e.g. presence or absence of phosphoryl, glycosyl, acetyl, or ubiquitin moieties). The human proteome is estimated to include hundreds of thousands of proteins when counting the different primary structures and proteoforms. See Aebersold et al., Nat. Chem. Biol. 14:206-214 (2018), which is incorporated herein by reference. A plurality of proteins used or included in a method, composition or apparatus set forth herein can have a complexity of at least 2, 5, 10, 100, $1\times10^3$, $1\times10^4$, $1\times10^5$, $1\times10^6$, $5\times10^6$, $1\times10^7$ or more different protein structures. Alternatively or additionally, a plurality of proteins can have a complexity that is at most $1\times10^7$, $5\times10^6$, $1\times10^6$, $1\times10^1$, $1\times10^4$, $1\times10^3$, 100, 10, 5, 2 or fewer different protein structures.

A plurality of proteins can be characterized in terms of the dynamic range for the different protein structures in the sample. The dynamic range can be a measure of the range of abundance for all different protein structures in a plurality of proteins, the range of abundance for all different primary protein structures in a plurality of proteins, the range of abundance for all different full-length primary protein structures in a plurality of proteins, the range of abundance for all different full-length gene products in a plurality of proteins, the range of abundance for all different proteoforms expressed from a given gene, or the range of abundance for any other set of different proteins set forth herein. The dynamic range for all proteins in human plasma is estimated to span more than 10 orders of magnitude from albumin, the most abundant protein, to the rarest proteins that have been measured clinically. See Anderson and Anderson Mol Cell Proteomics 1:845-67 (2002), which is incorporated herein by reference. The dynamic range for plurality of proteins set forth herein can be a factor of at least 10, 100, $1\times10^3$, $1\times10^4$, $1\times10^6$, $1\times10^8$, $1\times10^{10}$, or more. Alternatively or additionally, the dynamic range for plurality of proteins set forth herein can be a factor of at most $1\times10^{10}$, $1\times10^8$, $1\times10^6$, $1\times10^4$, $1\times10^3$, 100, 10 or less.

A method set forth herein can be carried out in a fluid phase or on a solid phase. For fluid phase configurations, a fluid containing one or more proteins can be mixed with another fluid containing one or more affinity agents. For solid phase configurations one or more proteins or affinity agents can be coupled to a solid support. One or more components that will participate in a binding event can be contained in a fluid and the fluid can be delivered to a solid support, the solid support being coupled to one or more other component that will participate in the binding event.

A method of the present disclosure can be carried out at single analyte resolution.

Alternatively to single-analyte resolution, a method can be carried out at ensemble-resolution or bulk-resolution. Bulk-resolution configurations acquire a composite signal from a plurality of different analytes or affinity agents in a vessel or on a surface. For example, a composite signal can be acquired from a population of different protein-affinity agent complexes in a well or cuvette, or on a solid support surface, such that individual complexes are not resolved from each other. Ensemble-resolution configurations acquire a composite signal from a first collection of proteins or affinity agents in a sample, such that the composite signal is distinguishable from signals generated by a second collection of proteins or affinity agents in the sample. For example, the ensembles can be located at different addresses in an array. Accordingly, the composite signal obtained from each address will be an average of signals from the ensemble, yet signals from different addresses can be distinguished from each other.

A composition, apparatus or method set forth herein can be configured to contact one or more proteins (e.g. an array of different proteins) with a plurality of different affinity agents. For example, a plurality of affinity agents (whether configured separately or as a pool) may include at least 2, 5, 10, 25, 50, 100, 250, 500 or more types of affinity agents, each type of affinity agent differing from the other types with respect to the epitope(s) recognized. Alternatively or additionally, a plurality of affinity agents may include at most 500, 250, 100, 50, 25, 10, 5, or 2 types of affinity agents, each type of affinity agent differing from the other types with respect to the epitope(s) recognized. Different types of affinity agents in a pool can be uniquely labeled such that the different types can be distinguished from each other. In some configurations, at least two, and up to all, of the different types of affinity agents in a pool may be indistinguishably labeled with respect to each other. Alternatively or additionally to the use of unique labels, different types of affinity agents can be delivered and detected serially when evaluating one or more proteins (e.g. in an array).

A method of the present disclosure can be performed in a multiplex format. In multiplexed configurations, different proteins can be coupled to different unique identifiers (e.g. the proteins can be coupled to different addresses in an array). Multiplexed proteins can be manipulated and detected in parallel. For example, a fluid containing one or more different affinity agents can be delivered to a protein array such that the proteins of the array are in simultaneous contact with the affinity agent(s). Moreover, a plurality of addresses can be observed in parallel allowing for rapid detection of binding events. A plurality of different proteins can have a complexity of at least 5, 10, 100, $1\times10^3$, $1\times10^4$, $2\times10^4$, $3\times10^4$ or more different native-length protein primary sequences. Alternatively or additionally, a proteome or proteome subfraction that is analyzed in a method set forth herein can have a complexity that is at most $3\times10^4$, $2\times10^4$, $1\times10^4$, $1\times10^3$, 100, 10, 5 or fewer different native-length protein primary sequences. The plurality of proteins can constitute a proteome or subfraction of a proteome. The total number of proteins that is detected, characterized or identified can differ from the number of different primary sequences in the sample from which the proteins are derived, for example, due to the presence of multiple copies of at least some protein species. Moreover, the total number of proteins that are detected, characterized or identified can differ from the number of candidate proteins suspected of being present, for example, due to the presence of multiple copies of at least some protein species, absence of some proteins in a source for the proteins, or loss of some proteins prior to analysis.

A particularly useful multiplex format uses an array of proteins and/or affinity agents. A polypeptide, anchoring group, polypeptide composite or other analyte can be coupled to a unique identifier, such as an address in an array, using any of a variety of means. The coupling can be covalent or non-covalent. Exemplary covalent attachments include chemical linkers such as those achieved using click chemistry or other linkages known in the art or described in US Pat. App. Pub. No. 2021/0101930 A1, which is incorporated herein by reference. Non-covalent attachment can be mediated by receptor-ligand interactions (e.g. (strept) avidin-biotin, antibody-antigen, or complementary nucleic acid strands), for example, in which the receptor is attached to the unique identifier and the ligand is attached to the protein or vice versa. In particular configurations, a protein is coupled to a solid support (e.g. an address in an array) via a structured nucleic acid particle (SNAP). A protein can be coupled to a SNAP and the SNAP can interact with a solid support, for example, by non-covalent interactions of the DNA with the support and/or via covalent linkage of the SNAP to the support. Nucleic acid origami or nucleic acid nanoballs are particularly useful. The use of SNAPs and other moieties to couple proteins to unique identifiers such as tags or addresses in an array are set forth in US Pat. App. Pub. No. 2021/0101930 A1, which is incorporated herein by reference.

A solid support or a surface thereof may be configured to display an analyte or a plurality of analytes. A solid support may contain one or more patterned, formed, or prepared surfaces that contain at least one address for displaying an analyte. In some cases, a solid support may contain one or more patterned, formed, or prepared surfaces that contain a plurality of addresses, with each address configured to display one or more analytes. Accordingly, an array as set forth herein may comprise a plurality of analytes coupled to a solid support or a surface thereof. In some configurations, a solid support or a surface thereof may be patterned or formed to produce an ordered or patterned array of addresses. The deposition of analytes on the ordered or patterned array of addresses may be controlled by interactions between the solid support and the analytes such as, for example, electrostatic interactions, magnetic interactions, hydrophobic interactions, hydrophilic interactions, covalent interactions, or non-covalent interactions. Accordingly, the coupling of an analyte at each address of an array may produce an ordered or patterned array of analytes whose average spacing between analytes is determined based upon the tolerance of the ordering or patterning of the solid support and the size of an analyte-binding region for each address. An ordered or patterned array of analytes may be characterized as having a regular geometry, such as a rectangular, triangular, polygonal, or annular grid. In other configurations, a solid support or a surface thereof may be non-patterned or non-ordered. The deposition of analytes on the non-ordered or non-patterned array of addresses may be controlled by interactions between the solid support and the analytes, or inter-analyte interactions such as, for example, steric repulsion, electrostatic repulsion, electrostatic attraction, magnetic repulsion, magnetic attraction, covalent interactions, or non-covalent interactions.

A solid support or a surface thereof may contain one or more structures or features. A structure or feature may comprise an elevation, profile, shape, geometry, or configuration that deviates from an average elevation, profile, shape, geometry, or configuration of a solid support or surface thereof. A structure or feature may be a raised structure or feature, such as a ridge, post, pillar, or pad, if the structure or feature extends above the average elevation of a surface of a solid support. A structure or feature may be a depressed structure, such as a channel, well, pore, or hole, if the structure or feature extends below the average elevation of a surface of a solid support. A structure or feature may be an intrinsic structure or feature of a substrate (i.e., arising due to the physical or chemical properties of the substrate, or a physical or chemical mechanism of formation), such as surface roughness structures, crystal structures, or porosity. A structure or feature may be formed by a method of processing a solid support. In some configurations, a solid support or a surface may be processed by a lithographic method to form one or more structures or features. A solid support or a surface thereof may be formed by a suitable lithographic method, including, but not limited to photolithography, Dip-Pen nanolithography, nanoimprint lithography, nanosphere lithography, nanoball lithography, nanopillar arrays, nanowire lithography, immersion lithography, neutral particle lithography, plasmonic lithography, scanning probe lithography, thermochemical lithography, thermal scanning probe lithography, local oxidation nanolithography, molecular self-assembly, stencil lithography, laser interference lithography, soft lithography, magnetolithography, stereolithography, deep ultraviolet lithography, x-ray lithography, ion projection lithography, proton-beam lithography, or electron-beam lithography.

A solid support or surface may comprise a plurality of structures or features. A plurality of structures or features may comprise an ordered or patterned array of structures or features. A plurality of structures or features may comprise a non-ordered, non-patterned, or random array of structures or features. A structure or feature may have an average characteristic dimension (e.g., length, width, height, diameter, circumference, etc.) of at least about 1 nanometer (nm), 5 nm, 10 nm, 20 nm, 30 nm, 40 nm, 50 nm, 75 nm, 100 nm, 150 nm, 200 nm, 250 nm, 300 nm, 400 nm, 500 nm, 750 nm, 1000 nm, or more than 1000 nm. Alternatively or additionally, a structure or feature may have an average characteristic dimension of no more than about 1000 nm, 750 nm, 500 nm, 400 nm, 300 nm, 250 nm, 200 nm, 150 nm, 100 nm, 75 nm, 50 nm, 40 nm, 30 nm, 20 nm, 10 nm, 5 nm, 1 nm, or less than 1 nm. An array of structures or features may have an average pitch, in which the pitch is measured as the average separation between respective centerpoints of neighboring structures or features. An array may have an average pitch of at least about 1 nm, 5 nm, 10 nm, 20 nm, 30 nm, 40 nm, 50 nm, 75 nm, 100 nm, 150 nm, 200 nm, 250 nm, 300 nm, 400 nm, 500 nm, 750 nm, 1 micron (μm), 2 μm, 5 μm, 10 μm, 50 μm, 100 μm, or more than 100 μm. Alternatively or additionally, an array may have an average pitch of no more than about 100 μm, 50 μm, 10 μm, 5 μm, 1 μm, 750 nm, 500 nm, 400 nm, 300 nm, 250 nm, 200 nm, 150 nm, 100 nm, 75 nm, 50 nm, 40 nm, 30 nm, 20 nm, 10 nm, 5 nm, 1 nm, or less than 1 nm.

A solid support or a surface thereof may include a base substrate material and, optionally, one or more additional materials that are contacted or adhered with the substrate material. A solid support may comprise one or more additional materials that are deposited, coated, or inlayed onto the substrate material. Additional materials may be added to the substrate material to alter the properties of the substrate material. For example, materials may be added to alter the surface chemistry (e.g., hydrophobicity, hydrophilicity, non-specific binding, electrostatic properties), alter the optical properties (e.g., reflective properties, refractive properties), alter the electrical or magnetic properties (e.g., dielectric materials, conducting materials, electrically-insulating materials), or alter the heat transfer characteristics of the substrate material. Additional materials contacted or adhered with a substrate material may be ordered or patterned onto the substrate material to, for example, locate the additional material at addresses or locate the additional material at interstitial regions between addresses. Exemplary additional materials may include metals (e.g., gold, silver, copper, etc.), metal oxides (e.g., titanium oxide, silicon dioxide, alumina, iron oxides, etc.), metal nitrides (e.g., silicon nitride, aluminum nitride, boron nitride, gallium nitride, etc.), metal carbides (e.g., tungsten carbide, titanium carbide, iron carbide, etc.), metal sulfides (e.g., iron sulfide, silver sulfide, etc.), and organic moieties (e.g., polyethylene glycol (PEG), dextrans, chemically-reactive functional groups, etc.).

A method of the present disclosure can include the step of coupling one or more analytes to a solid support or a surface thereof prior to performing a detection step set forth herein. The coupling of one or more analytes to a solid support surface may include covalent or non-covalent coupling of the one or more analytes to the solid support. Covalent coupling of an analyte to a solid support can include direct covalent coupling of an analyte to a solid support (e.g., formation of coordination bonds) or indirect covalent coupling between a reactive functional group of the analyte and a reactive functional group that is coupled to the solid support (e.g., a CLICK-type reaction). Non-covalent coupling can include the formation of any non-covalent interaction between an analyte and a solid support, including electrostatic or magnetic interactions, or non-covalent bonding interactions (e.g., ionic bonds, van der Waals interactions, hydrogen bonding, etc.). The skilled person will readily recognize that the particular analyte and the choice of solid support can affect the selection of a coupling chemistry for the compositions and methods set forth herein.

Accordingly, a coupling chemistry may be selected based upon the criterium that it provides a sufficiently stable coupling of an analyte to a solid support for a time scale that meets or exceeds the time scale of a method as set forth herein. For example, a polypeptide identification method can require a coupling of the analyte to the solid support for a sufficient amount of time to permit a series of empirical measurements of the analyte to occur. An analyte may be continuously coupled to a solid support for an observable length of time such as, for example, at least about 1 minute, 1 hour (hr), 3 hrs, 6 hrs, 12 hrs, 1 day, 1.5 days, 2 days, 3 days, 1 week (wk), 2 wks, 3 wks, 1 month, or more. The coupling of an analyte to a solid support can occur with a solution-phase chemistry that promotes the deposition of the analyte on the solid support. Coupling of an analyte to a solid support may occur under solution conditions that are optimized for any conceivable solution property, including solution composition, species concentrations, pH, ionic strength, solution temperature, etc. Solution composition can be varied by chemical species, such as buffer type, salts, acids, bases, and surfactants. In some configurations, species such as salts and surfactants may be selected to facilitate the formation of interactions between an analyte and a solid support. Covalent coupling methods for coupling an analyte to a solid support may include species such as catalyst, initiators, and promoters to facilitate particular reactive chemistries.

Coupling of an analyte to a solid support may be facilitated by a mediating group. A mediating group may modify the properties of the analyte to facilitate the coupling. Useful mediating groups have been set forth herein (e.g., structured nucleic acid particles). In some configurations, a mediating group can be coupled to an analyte prior to coupling the analyte to a solid support. Accordingly, the mediating group may be chosen to increase the strength, control, or specificity of the coupling of the analyte to the solid support. In other configurations, a mediating group can be coupled to a solid support prior to coupling an analyte to the solid support. Accordingly, the mediating group may be chosen to provide a more favorable coupling chemistry than can be provided by the solid support alone.

EXAMPLES

Example 1. Pattern Identification for a Hexagonal Array

Two arrays with array sites formed in a hexagonal pattern are provided. Each array site contains a plurality of surface-coupled oligonucleotides that are configured to bind entities to the array site. During lithographic processing of the arrays, the array sites for both arrays are characterized as having an average pitch of 1 micron (μm) with a standard deviation of ±0.05 μm, as measured centerpoint to centerpoint. Accordingly, real-world site position is known for the two arrays. The arrays are contacted with fluorescently-labeled polymer nanoparticles. The concentration of polymer nanoparticles contacted to the second array is three times the concentration of polymer nanoparticles contacted to the first array. The polymer nanoparticles have been functionalized with oligonucleotides that are complementary to the surface-coupled oligonucleotides of the arrays. After contacting the polymer nanoparticles to the two arrays, polymer nanoparticles are deposited at array sites in a random spatial distribution.

The first array and the second array are imaged using a fluorescent microscope. Optically resolvable detection events for each array are quantified from images of each array to determine an occupancy rate of array sites by polymer nanoparticles. The first array is determined to have an array site occupancy rate of 18.18%. The second array is determined to have an array site occupancy rate of 54.55%. Based upon the array site occupancies of the two arrays, it is determined that the second array has a sufficient quantity of signal sources to facilitate a camera calibration method for the camera of the fluorescent microscope.

Figure 11B:
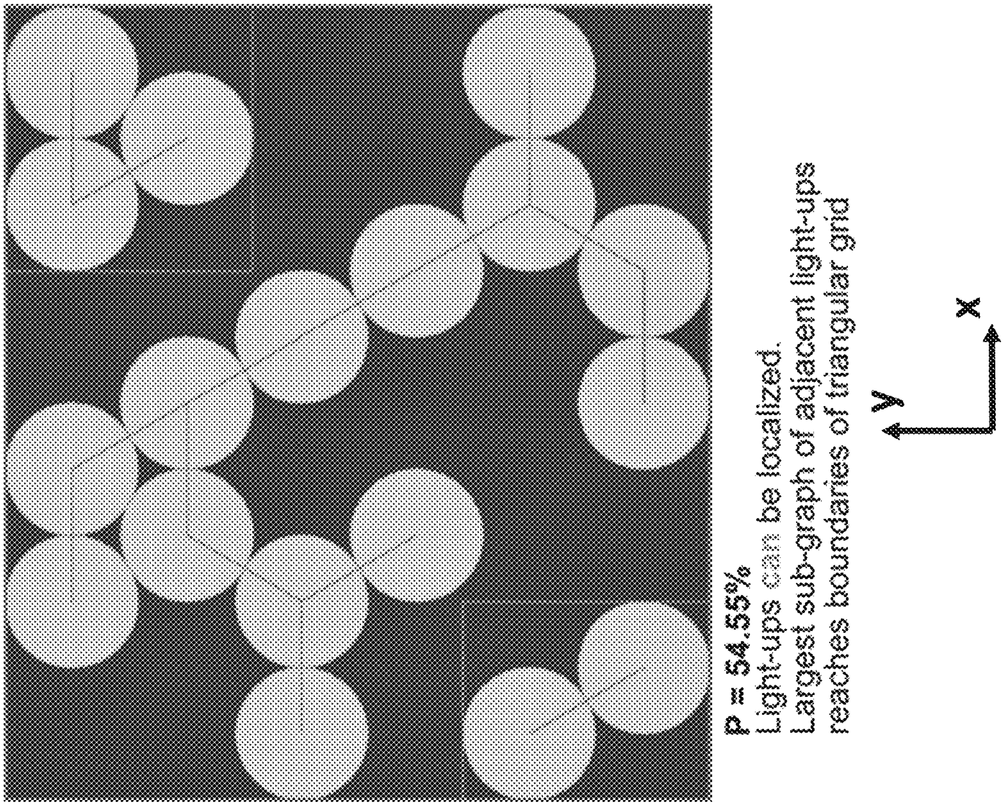
FIGS. 11A and 11B show images of detection events and identification of graphs through contiguous array sites, in accordance with some embodiments.
Figure 11A:
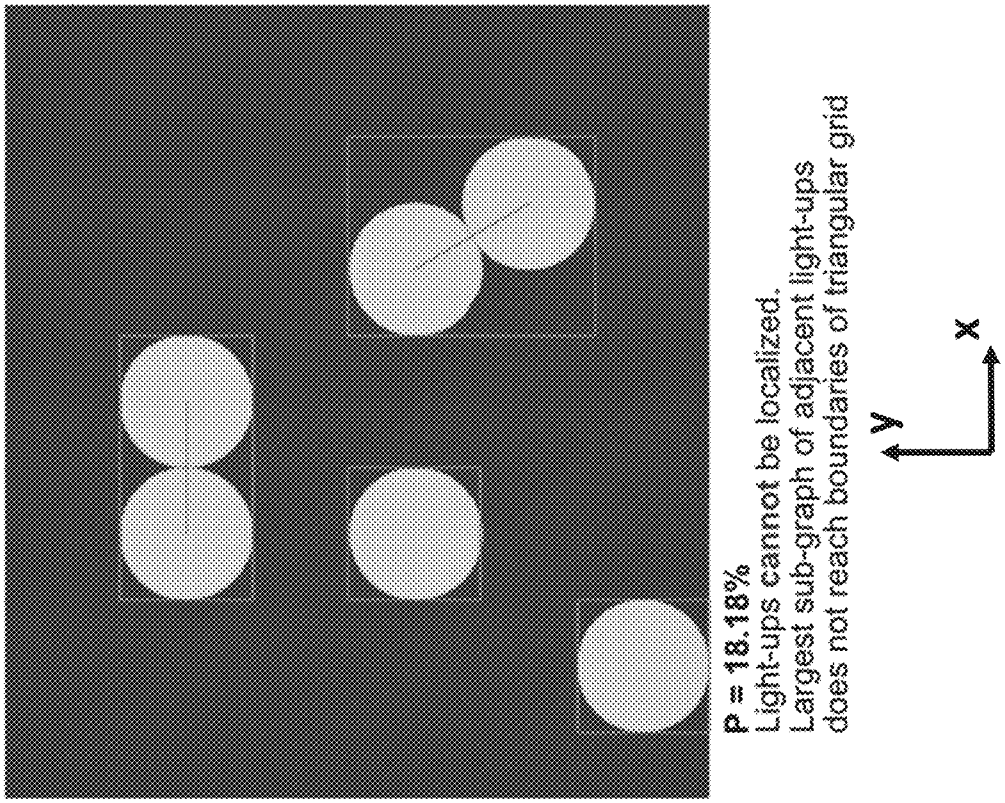

Images of the first and second array are provided to an image analysis algorithm. Based on the hexagonal patterning of the array sites, the images are gridded with a triangular grid patterning by the image analysis software. FIGS. 11A and 11B depict exemplary images of detection events on the first array and second array, respectively. The image analysis software identifies pathways through contiguous detection events along the triangular gridlines. Based on the image of FIG. 11A, there is an insufficient quantity of detection events to identify a pathway through contiguous detection events that contacts all four sides of the field-of-view of the image. Based on the image of FIG. 11B, the image analysis software is able to identify a pathway through contiguous detection events that contacts all four sides of the field-of-view of the image.

The image of FIG. 11B and the empirical data on array site geometry is provided to the image analysis software. The image analysis software is also provided intrinsic detection parameters (e.g., focal length, skew, optical axis offsets) and a lens distortion model for the fluorescence microscope. Based upon the provided data, a direct linear transform model including optical distortion is solved for the fluorescence microscope. A matrix comprising extrinsic parameters for the detection system is derived by a method of minimizing reprojection error.

Example 2. Pattern Identification for a Non-Ideal Array

An image from a camera device of fluorescent signals from signal sources at array sites of an array is provided to an image analysis process. Due to minor variations in array site locations and/or minor variations in signal source locations at array sites, a degree of variation is observed for the locations of detection events captured in the image. Accordingly, some detection events at field-of-view boundaries are observed to partially overlap the field-of-view boundaries and other detection events are observed to be slightly separated from the field-of-view boundaries (i.e., not contacted to a boundary). Offsets of some detection events are observed to have subpixel offsets up to 1 full pixel with respect to an x-axis or y-axis direction.

The image analysis process assumes that these errors are substantially distributed according to a statistical distribution. The software is trained to assume multiple different statistical models (e.g., normal distribution, bimodal distribution, etc.). A camera model is solved for utilizing a least-squares solver that includes the statistical model of positional error. The least-squares solver solves the camera model according to a minimization of the summed reprojection error in camera calibration (i.e., the Euclidean distance between 1) a camera model's projection of a 3D world point into 2D image, and 2) the location in the 2D image where that 3D point was actually detected). The image analysis software iterates through differing statistical models to identify the solver solution that has the smallest reprojection error. For each attempted statistical model, two or more iterations are solved, and outliers with high reprojection error are discarded. Average reprojection error across multiple iterations is computed for each statistical model, and camera calibration model based upon the statistical model of site position error with the lowest average reprojection error is chosen as the camera calibration model for successive camera imaging processes on the camera device.

Notwithstanding the appended claims, the disclosure set forth herein is also defined by the following clauses:

1) A method, comprising:
   a) providing an array comprising a plurality of sites, wherein individual sites of the plurality of sites are each optically resolvable, and wherein sites of the plurality of sites comprise signal sources;
   b) detecting on a detection device signals from the signal sources at sites of the plurality of sites, thereby forming an image comprising detection events;
   c) identifying within a field of view having N sides a pattern of detection events of the image, wherein each individual side of the N sides is contacted by a detection event of the pattern of detection events; and
   d) based upon the pattern of detection events, determining a parameter of a direct linear transform detector model.
2) The method of clause 1, wherein the plurality of sites has an ordered spatial distribution.
3) The method of clause 2, wherein the ordered spatial distribution comprises a geometric grid.
4) The method of clause 3, wherein the geometric grid comprises a rectangular grid, a hexagonal grid, or a circular grid.
5) The method of any one of clauses 1-4, wherein the plurality of sites comprises an average pitch of at least 500 nanometers.
6) The method of any one of clauses 1-5, wherein the plurality of sites comprises an average site dimension of at least 50 nanometers.
7) The method of any one of clauses 1-6, wherein the signal source comprises a fluorescent particle.

8) The method of clause 7, wherein the signal source comprises a nanoparticle.

9) The method of clause 8, wherein the nanoparticle comprises a nucleic acid nanoparticle, a polymer nanoparticle, a semiconductor nanoparticle, or a combination thereof.

10) The method of clause 8, wherein the nanoparticle comprises a biomolecule.

11) The method of clause 10, wherein the biomolecule comprises a sample analyte.

12) The method of any one of clause 7-11, wherein the signal source further comprises an affinity agent.

13) The method of any one of clauses 1-12, wherein the sites comprising signal sources have a random spatial distribution.

14) The method of any one of clause 1-13, wherein individual sites of the sites comprising signal sources are each substantially devoid of a sample analyte.

15) The method of any one of clauses 1-13, wherein each individual site of the sites comprising signal sources comprises a sample analyte.

16) The method of clause 15, wherein a signal source is non-covalently coupled to the sample analyte.

17) The method of clause 15, wherein a signal source is covalently coupled to the sample analyte.

17) The method of any one of clauses 1-16, wherein the detection device comprises a magnification component.

18) The method of clause 17, wherein the magnification device comprises an atomic force microscope, an optical microscope, or an electron microscope.

19) The method of any one of clauses 1-18, wherein the detection device comprises a pixel-based sensor, wherein the pixel-based sensor comprises a plurality of pixels.

20) The method of clause 19, wherein detecting the image on the detection device comprises one or more steps of: i) aligning a pixel of the plurality of pixels with a site of the plurality of sites, and ii) collecting with the pixel a signal from the site.

21) The method of clause 20, wherein aligning the pixel with the site comprises aligning a pixel set with the site.

22) The method of clause 21, wherein the pixel set comprises a 1×2, 1×3, 1×4, 1×5, 2×2, 2×3, 2×4, 2×5, 3×3, 3×4, 3×5, 4×4, 4×5, or 5×5 set of pixels.

23) The method of clause 21 or 22, wherein collecting with the pixel the signal from the site comprises collecting the signal with the pixel set.

24) The method of any one of clauses 1-23, wherein the image contains at least 50 detection events.

25) The method of clause 24, wherein the image contains at least 100 detection events.

26) The method of clause 25, wherein the image contains at least 1000 detection events.

27) The method of any one of clauses 1-26, wherein N is at least 3.

28) The method of clause 27, wherein N is at least 4.

29) The method of clause 28, wherein N is no more than 4.

30) The method of any one of clauses 1-29, wherein an area of the field of view is substantially similar to an area of the image.

31) The method of any one of clauses 1-29, wherein an area of the field of view is smaller than an area of the image.

32) The method of clauses 30 or 31, wherein the field of view contains at least 50 signals.

33) The method of clause 32, wherein the field of view contains at least 100 signals.

34) The method of clause 33, wherein the field of view contains at least 1000 signals.

35) The method of any one of clauses 1-34, wherein the pattern of detection events has a random spatial distribution.

36) The method of any one of clauses 1-34, wherein the pattern of detection events has a non-random spatial distribution.

37) The method of any one of clauses 1-36, wherein the field of view comprises a vacancy at an array site.

38) The method of clause 37, wherein the field of view comprises a plurality of vacancies at array sites.

39) The method of clause 38, wherein a first vacancy of the plurality of vacancies and a second vacancy of the plurality of vacancies are spatially contiguous.

40) The method of clause 38, wherein a first vacancy of the plurality of vacancies and a second vacancy of the plurality of vacancies are spatially non-contiguous.

41) The method of any one of clause 1-40, wherein identifying within the field of view having N sides the pattern of detection events of the image further comprises realigning the field of view over differing sets of detection events until the pattern of detection events is identified.

42) The method of any one of clauses 1-41, wherein identifying within the field of view having N sides the pattern of detection events of the image further comprises identifying a region of the image comprising a detection event occupancy rate of at least 40%.

43) The method of clause 42, wherein identifying within the field of view having N sides the pattern of detection events of the image further comprises identifying a region of the image comprising a detection event occupancy rate of at least 50%.

44) The method of any one of clauses 1-43, wherein identifying within the field of view having N sides the pattern of detection events of the image further comprises providing the image to a processor configured to perform an image analysis process.

45) The method of clause 44, further comprising identifying with the image analysis process the pattern of detection events.

46) The method of any one of clauses 1-45, further comprising selecting the field of view from a plurality of fields of view detected in step (b).

47) The method of clause 46, wherein individual fields of view of the plurality of fields of view each vary with respect to one or more of field size, number of sides (N), aspect ratio, and degree of symmetry.

48) The method of any one of clauses 1-47, wherein a detection event that contacts a side of the N sides is entirely contained within the field of view.

49) The method of any one of clauses 1-47, wherein a detection event that contacts a side of the N sides is partially contained within the field of view.

50) The method of any one of clauses 1-49, wherein the parameter of the detector model comprises an intrinsic parameter.

51) The method of any one of clauses 1-50, wherein the parameter of the detector model comprises an extrinsic parameter.

52) The method of any one of clauses 1-51, wherein determining the parameter of the detector model comprises solving a direct linear transform model.

53) The method of clause 52, wherein the direct linear transform model comprises an optical distortion model.

54) The method of clause 52, wherein the direct linear transform model does not comprise an optical distortion model.

55) The method of any one of clauses 1-54, wherein determining the parameter of the detector model further comprises providing a unique address for each individual site of the plurality of sites.

56) The method of clause 55, wherein providing the unique address for each individual site of the plurality of sites comprises detecting, with the detection device, presence or absence of a signal from a signal source at each unique address for each individual site of the plurality of sites.

57) The method of clause 55 or 56, wherein providing the unique address for each individual site of the plurality of sites comprises inferring an address of a site based upon a spatial pattern of the plurality of sites.

58) The method of any one of clauses 1-57, wherein the pattern of detection events is spatially contiguous.

59) The method of any one of clauses 1-57, wherein the pattern of detection events is spatially non-contiguous.

60) The method of any one of clauses 1-59, wherein the signal sources comprise a first plurality of signal sources and a second plurality of signal sources, wherein a first emission wavelength of the first plurality of signal sources differs from a second emission wavelength of the second plurality of signal sources.

61) The method of clause 60, wherein the detecting comprises the steps of: i) detecting on the detection device signals of the first plurality of signal sources, thereby forming a first image comprising a first plurality of detection events, ii) detecting on the detection device signals of the second plurality of signal sources, thereby forming a second image comprising a second plurality of detection events, and iii) combining the detection events of the first image and the detection events of the second image to form the image comprising detection events.

62) The method of clause 61, wherein combining the detection events of the first image and the detection events of the second image further comprises aligning the first image and the second image with respect to a common reference address.

63) The method of any one of clauses 1-62, wherein the detection device comprises a first detection channel and a second detection channel.

64) The method of clause 63, wherein the first detection channel comprises a first detector and the second detection channel comprises a first detector.

65) The method of clause 63, wherein the first detection channel and the second detection channel direct signals through respective optical components to the same detector.

66) The method of any one of clauses 63-65, wherein the detecting comprises: i) detecting a first plurality of signals from the signal sources via the first detection channel, thereby forming a first image, and ii) detecting a second plurality of signals from the signal sources via the second detection channel, thereby forming a second image.

67) The method of clause 66, wherein determining the parameter of the detector model comprises: i) based upon the first image, determining a first parameter for a detector model of the first detection channel, and ii) based upon the second image, determining a second parameter for a detector model of the second detection channel.

68) The method of clause 66 or 67, wherein the first plurality of signals and the second plurality of signals is substantially similar with respect to a spatial distribution of the signals.

69) The method of clause 66 or 67, wherein the first plurality of signals sources has a first spatial distribution and the second plurality of signal sources has a second spatial distribution, wherein the first spatial distribution differs from the second spatial distribution.

70) The method of clause 69, wherein signal sources of the first plurality of signal sources have a first emission wavelength, wherein signal sources of the second plurality of signal sources have a second emission wavelength, and wherein the first emission wavelength differs from the second emission wavelength.

71) A method of calibrating a detection device, comprising:

a) providing to a first detection device an array comprising a plurality of sites, wherein each individual site of the plurality of sites is optically resolvable, and wherein sites of the plurality of sites comprise signal sources;

b) identifying on the array a pattern of signals from the signal sources with the first detection device;

c) based upon the pattern of signals from the signal sources, determining a parameter of a first detector model;

d) after determining the parameter of the first detector model, identifying on the array the pattern of signals from the signal sources on a second detection device; and e) based upon the pattern of signals from the signal sources, determining a parameter of a second detector model.

72) The method of clause 71, wherein the first detector model differs from the second detector model with respect to an intrinsic parameter.

73) The method of clause 71 or 72, wherein the first detector model differs from the second detector model with respect to an extrinsic parameter.

74) The method of any one of clauses 71-73, wherein the first detector model differs from the second detector model with respect to an optical distortion model.

75. A system, comprising:

a) an array comprising a plurality of sites, wherein individual sites of the plurality of sites are each optically resolvable, and wherein sites of the plurality of sites comprise signal sources;

b) a detection device configured to acquire signals from the signal sources at sites of the plurality of sites, thereby forming an image comprising detection events; and c) a computer processor programmed to (i) identify within a field of view having N sides a pattern of detection events of the image, wherein each individual side of the N sides is contacted by a detection event of the pattern of detection events; and (ii) output a parameter of a direct linear transform detector model based upon the pattern of detection events.

76. The system of clause 75, wherein the computer processor comprises an intrinsic parameter of the direct linear transform model.

77. The system of clause 76, wherein the computer processor is further programmed to, based upon the intrinsic parameter and the pattern of detection events, determine the parameter of a direct linear transform detector model, wherein the parameter comprises an extrinsic parameter.
78. The system of clause 75, wherein the computer processor comprises an extrinsic parameter of the direct linear transform model.
79. The system of clause 78, wherein the computer processor is further programmed to, based upon the extrinsic parameter and the pattern of detection events, determine the parameter of a direct linear transform detector model, wherein the parameter comprises an intrinsic parameter.
80. The system of any one of clauses 76-79, wherein the computer processor further comprises an optical distortion model.
81. The system of clause 75, wherein the computer processor comprises an intrinsic parameter and an extrinsic parameter of a direct linear transform model.
82. The system of clause 81, wherein the computer processor is further programmed to, based upon the extrinsic parameter, the intrinsic parameter, and the pattern of detection events, determine the parameter of a direct linear transform detector model, wherein the parameter comprises an optical distortion model parameter.
83. The system of any one of clauses 75-82, wherein the computer processor is programmed to simultaneously determine an intrinsic parameter and an extrinsic parameter of the direct linear transform model based upon the pattern of detection events.
84. The system of clause 83, wherein the computer processor is programmed to determine the intrinsic parameter and the extrinsic parameter of the direct linear transform model by a non-linear solver.
85. The system of clause 84, wherein the computer processor is programmed to perform a bundle adjustment method.

What is claimed is:

1. A method, comprising:

a) providing to an optical detection system comprising a detector:
   i) a first array of sites, wherein each individual site of the first array of sites comprises an individual optically-detectable moiety, wherein each individual site of the first array of sites is optically resolvable from each other site of the first array of sites, wherein a first subregion of the first array of sites has a signal occupancy of at least 50%, and wherein a second subregion of the first array of sites has a signal occupancy of no more than 10%; and
   ii) a second array of sites, wherein each individual site of the second array of sites is optically resolvable from each other site of the second array of sites, wherein each individual site of the second array of sites comprises one and only one individual analyte of a plurality of analytes immobilized to the second array of sites;
b) detecting a first spatial arrangement of signals from optically-detectable moieties of the first subregion of the first array of sites;
c) based upon the first spatial arrangement of signals from the first subregion of the first array of sites, determining a parameter of a detector model of the detector;
d) after determining the parameter of the detector model, detecting a second spatial arrangement of signals from a first subregion of the second array of sites, and detecting a third spatial arrangement of signals from a second subregion of the second array of sites; and
e) registering a signal of the second spatial arrangement of signals to a signal of the third spatial arrangement of signals, wherein the signal of the second spatial arrangement of signals and the signal of the third spatial arrangement of signals are emitted at a same site of the second array of sites.

2. The method of claim 1, wherein the first subregion of the first array of sites comprises a first subarray of the first array of sites.

3. The method of claim 2, wherein the first subarray has a signal occupancy of at least 50%.

4. The method of claim 1, wherein the second subregion of the first array of sites comprises a second subarray of the first array of sites.

5. The method of claim 4, wherein the second subarray has a signal occupancy of no more than 10%.

6. The method of claim 1, wherein the first subregion of the second array of sites comprises a first subarray of the second array of sites.

7. The method of claim 6, wherein the first subarray of the second array of sites has a signal occupancy of no more than 20%.

8. The method of claim 1, wherein providing the first array of sites and providing the second array of sites comprises providing to the optical detection system a solid support, wherein the solid support comprises the first array of sites and the second array of sites.

9. The method of claim 1, wherein providing the first array of sites and providing the second array of sites comprises providing to the optical detection system a first solid support comprising the first array of sites, and providing to the optical detection system a second solid support comprising the second array of sites.

10. The method of claim 1, further comprising detecting a fourth spatial arrangement of signals from optically-detectable moieties of the second subregion of the first array of sites.

11. The method of claim 10, wherein signals of the fourth spatial arrangement of signals are a subset of the signals of the first spatial arrangement of signals.

12. The method of claim 1, further comprising coupling binding reagents of a plurality of binding reagents to analytes of a subset of analytes.

13. The method of claim 12, wherein coupling binding reagents of a plurality of binding reagents to analytes of the subset of analytes comprises coupling binding reagents to no more than 20% of analytes of the plurality of analytes.

14. The method of claim 13, wherein detecting the second spatial arrangement of signals from the first subregion of the second array of sites or detecting the third spatial arrangement of signals from the second subregion of the second array of sites comprises detecting signals from binding reagents of the plurality of binding reagents.

15. The method of claim 1, wherein registering the signal of the second spatial arrangement of signals to the signal of the third spatial arrangement of signals comprises identifying a reference location of the second spatial arrangement of signals and identifying the reference location of the third spatial arrangement of signals.

16. The method of claim 15, further comprising identifying an orientation between the reference location and the signal of the second spatial arrangement of signals.

17. The method of claim 16, further comprising identifying a signal of the third spatial arrangement of signals having the same orientation relative to the reference location of the third spatial arrangement of signals.

18. The method of claim 15, wherein identifying the reference location of the second spatial arrangement of signals and identifying the reference location of the third spatial arrangement of signals comprises identifying a plurality of reference locations of the second spatial arrangement of signals and identifying a plurality of reference locations of the third spatial arrangement of signals.

19. The method of claim 18, wherein a reference location of the plurality of reference locations comprises a fiducial element.

20. The method of claim 19, wherein each individual reference location of the plurality of reference locations comprises an individual fiducial element.

* * * * *